United States Patent [19]
Morley

[11] 3,959,776
[45] May 25, 1976

[54] PROGRAMMABLE PRINTER

[75] Inventor: Richard E. Morley, Mason, N.H.

[73] Assignee: Modicon Corporation, Andover, Mass.

[22] Filed: Feb. 19, 1974

[21] Appl. No.: 443,329

[52] U.S. Cl. .......................................... 340/172.5
[51] Int. Cl.² ..................... G06F 7/12; G06F 9/16
[58] Field of Search ............................... 340/172.5

[56] References Cited
UNITED STATES PATENTS

| | | | |
|---|---|---|---|
| 3,579,192 | 5/1971 | Rasche et al. | 340/172.5 |
| 3,753,246 | 8/1973 | Kiffmeyer et al. | 340/172.5 |
| 3,831,150 | 8/1974 | Haynes | 340/172.5 |
| 3,838,396 | 9/1974 | Martin | 340/172.5 |

*Primary Examiner*—David H. Malzahn
*Attorney, Agent, or Firm*—Mattern, Ware, Davis & Stoltz

[57] ABSTRACT

A programmable printer is provided which is capable of printing alphanumeric internally pre-stored data or data information and alphanumeric externally supplied data or data information either separately or in combination with each other. The alphanumeric printout of the printer may be inverted in a manner to allow its visual reading in what would otherwise be an "upside-down" configuration. The programmable printer incorporates a microprocessor for the proper addressing, interpretation and manipulation of input commands, timing information, paper-sensing information, external data information, and internal stored data information, so as to generate output information that seeks the desired data information, whether external or internal, and that drives a printer logic interface and output status lines and print drive interface so as to print the desired information and to monitor the status of the printer. The printer also includes an alphanumeric print mechanism incorporating twenty-one character columns per line of printout, a timing pulse generating means, a paper sensing means, and a lid detector switch; a printer logic interface that provides electrical isolation between the print mechanism and the microprocessor and provides the actuating power to operate the print mechanism's hammers as well as means for amplifying and shaping the timing pulses and paper sensing pulses from the print mechanism; a command interface that provides electrical isolation between the command information and the microprocessor as well as providing for the proper selection, shaping and timing of the command information; a data interface that provides electrical isolation between the external data information and the microprocessor as well as providing for the proper selection, shaping and timing of external or internal data information; a programmable "read only" memory for the storage of various messages; a set of output status lines for the transmission of information to the outside world and for the indication of various conditions of the printer; and a print drive interface that provides for the electrical isolation, shaping and amplification of the output status lines information and the print drive information.

75 Claims, 34 Drawing Figures

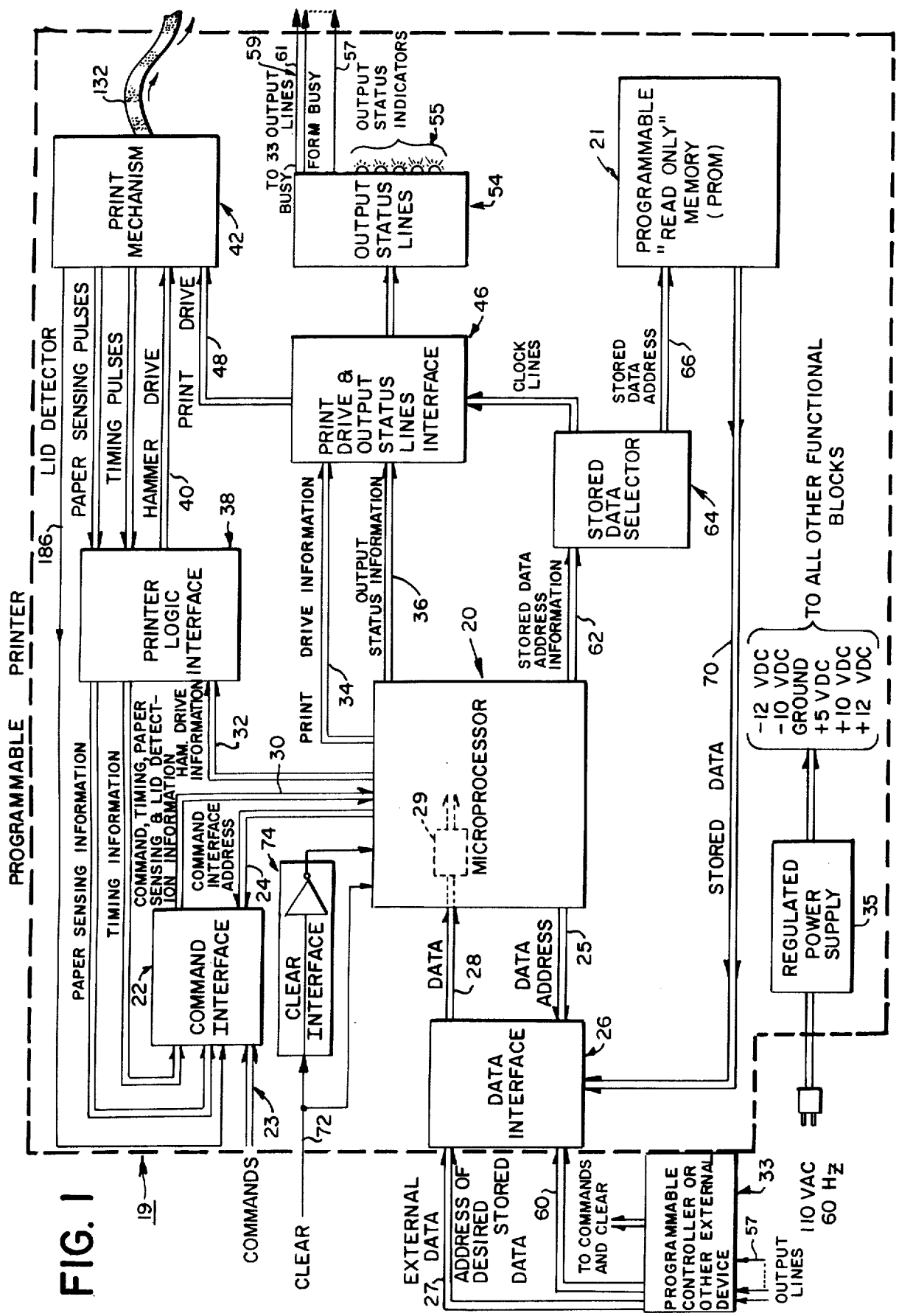

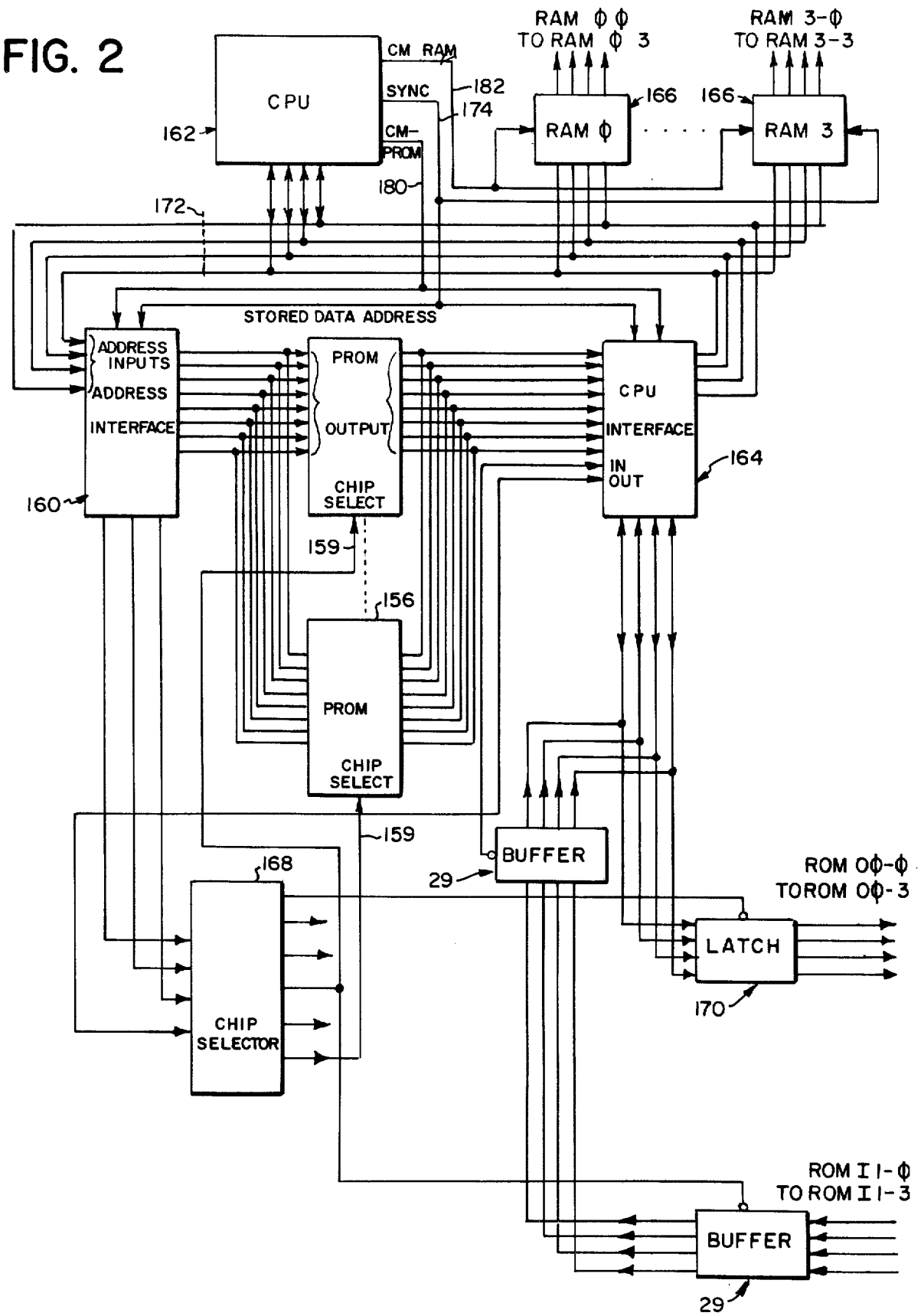

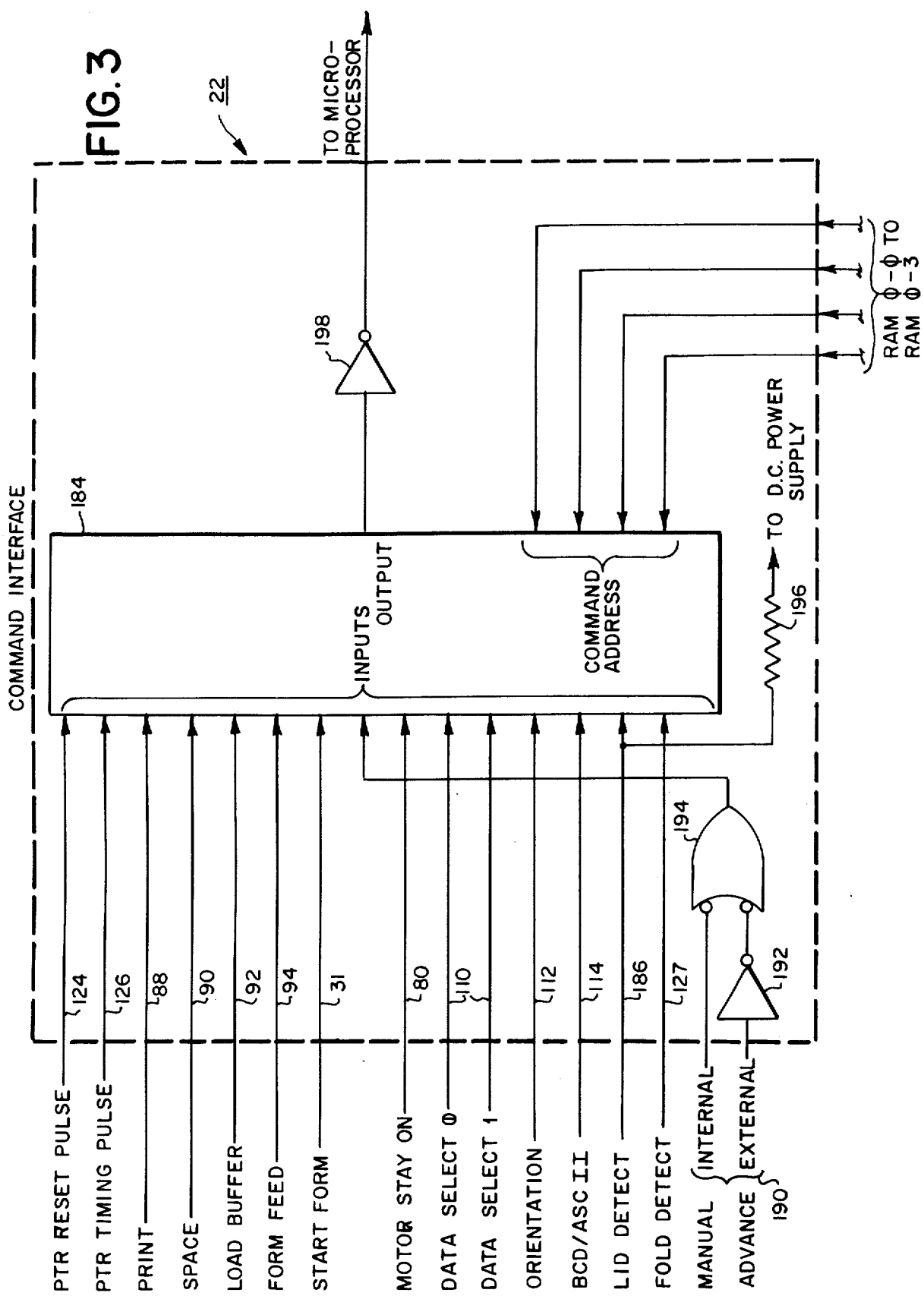

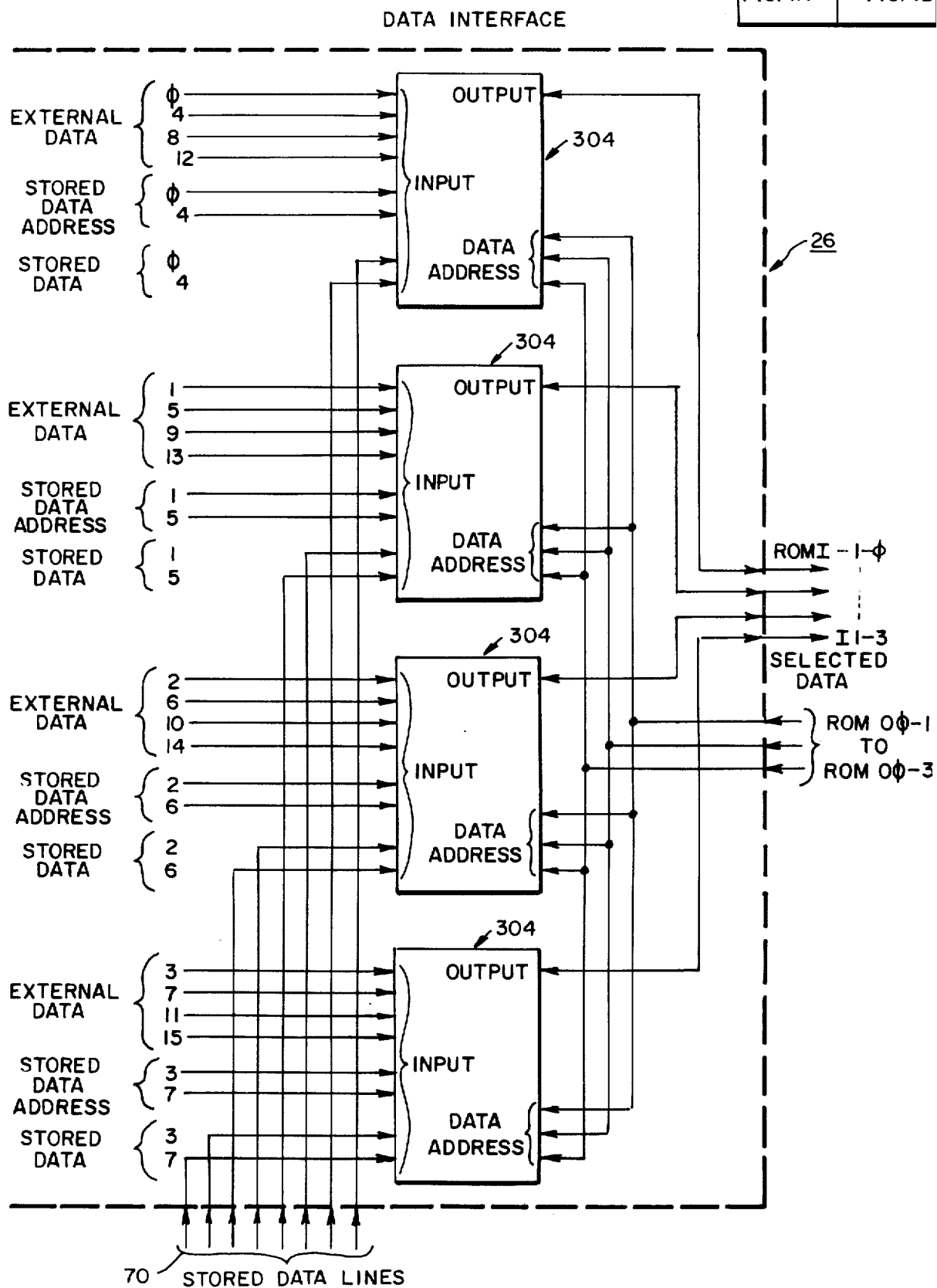

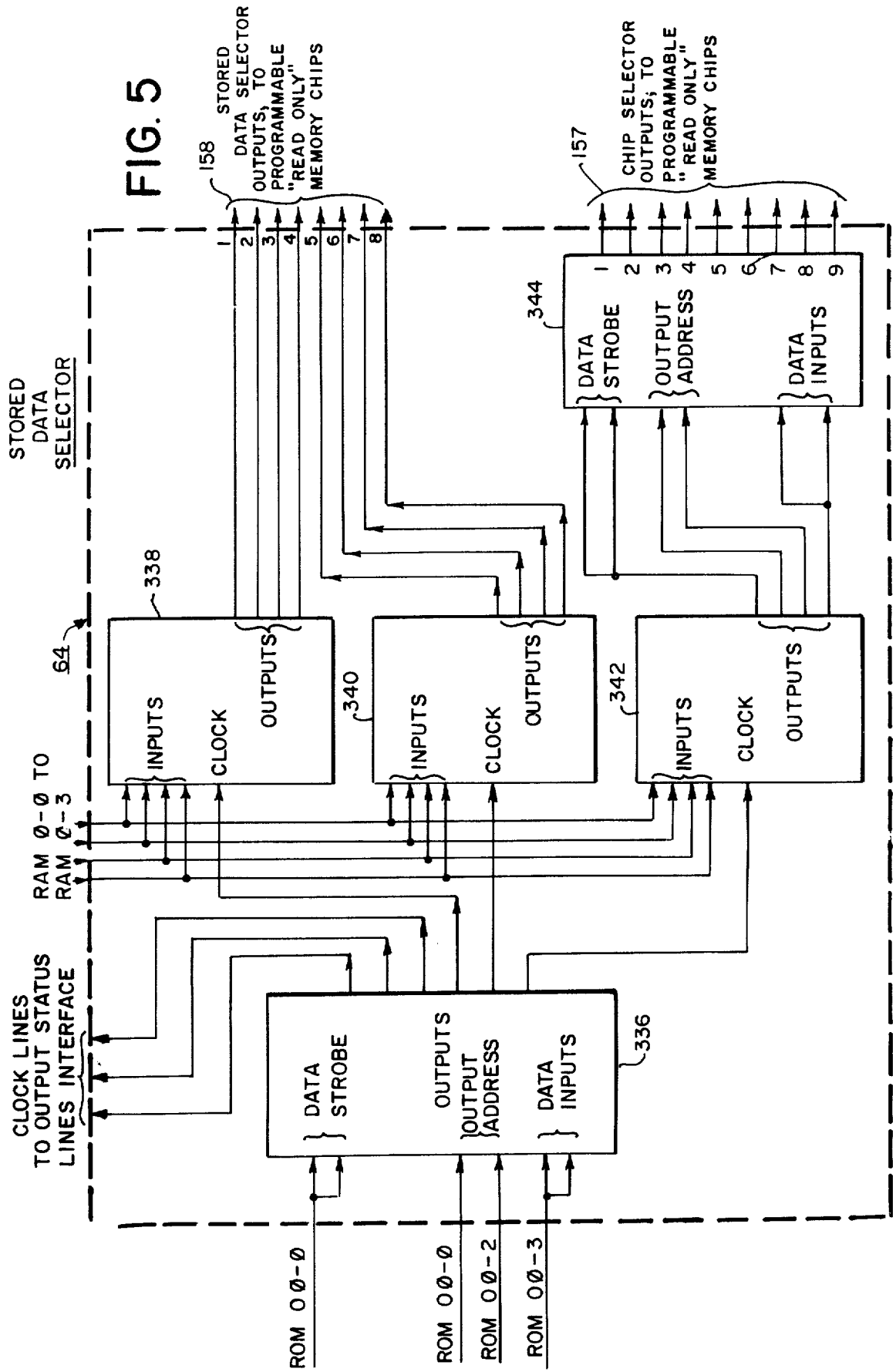

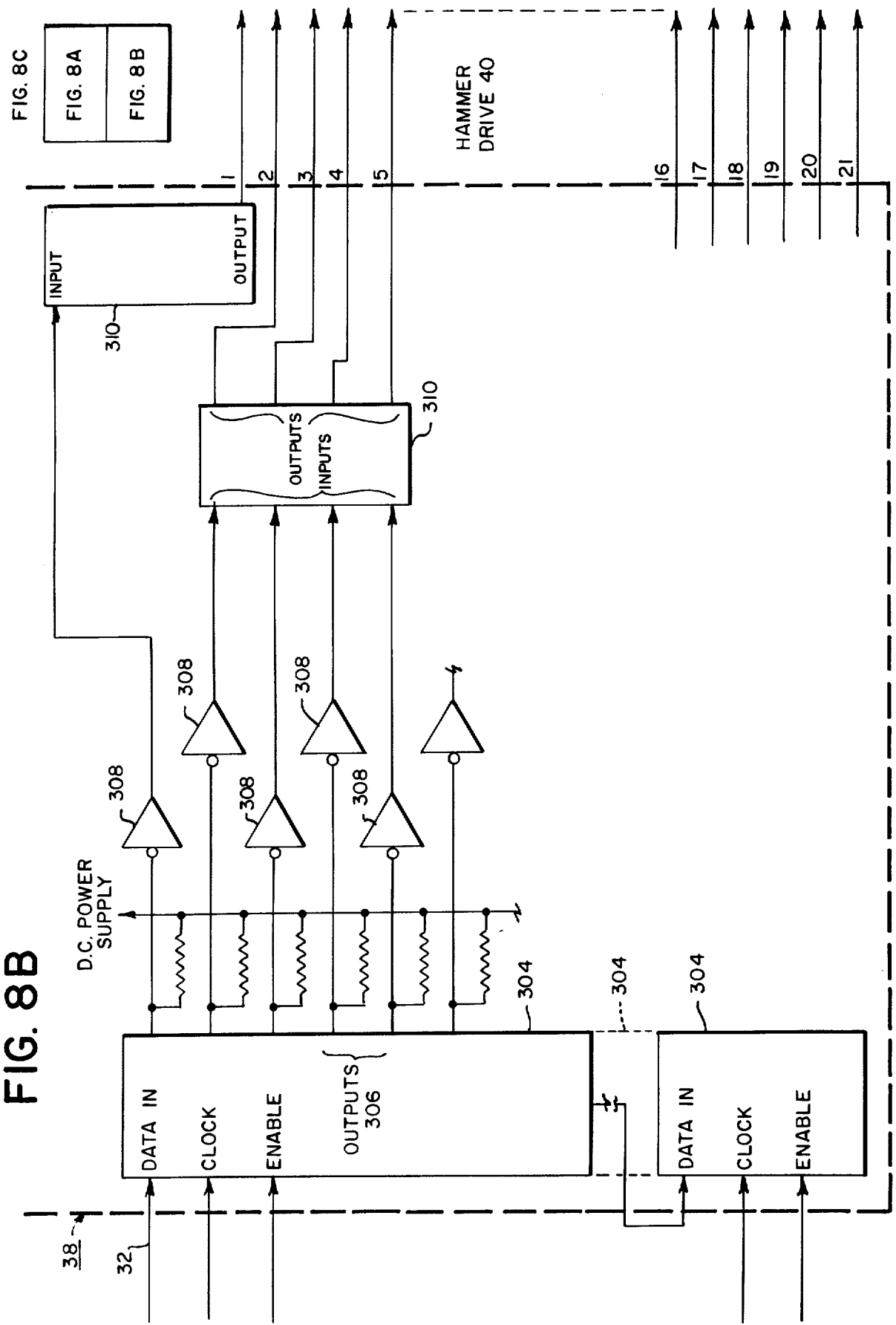

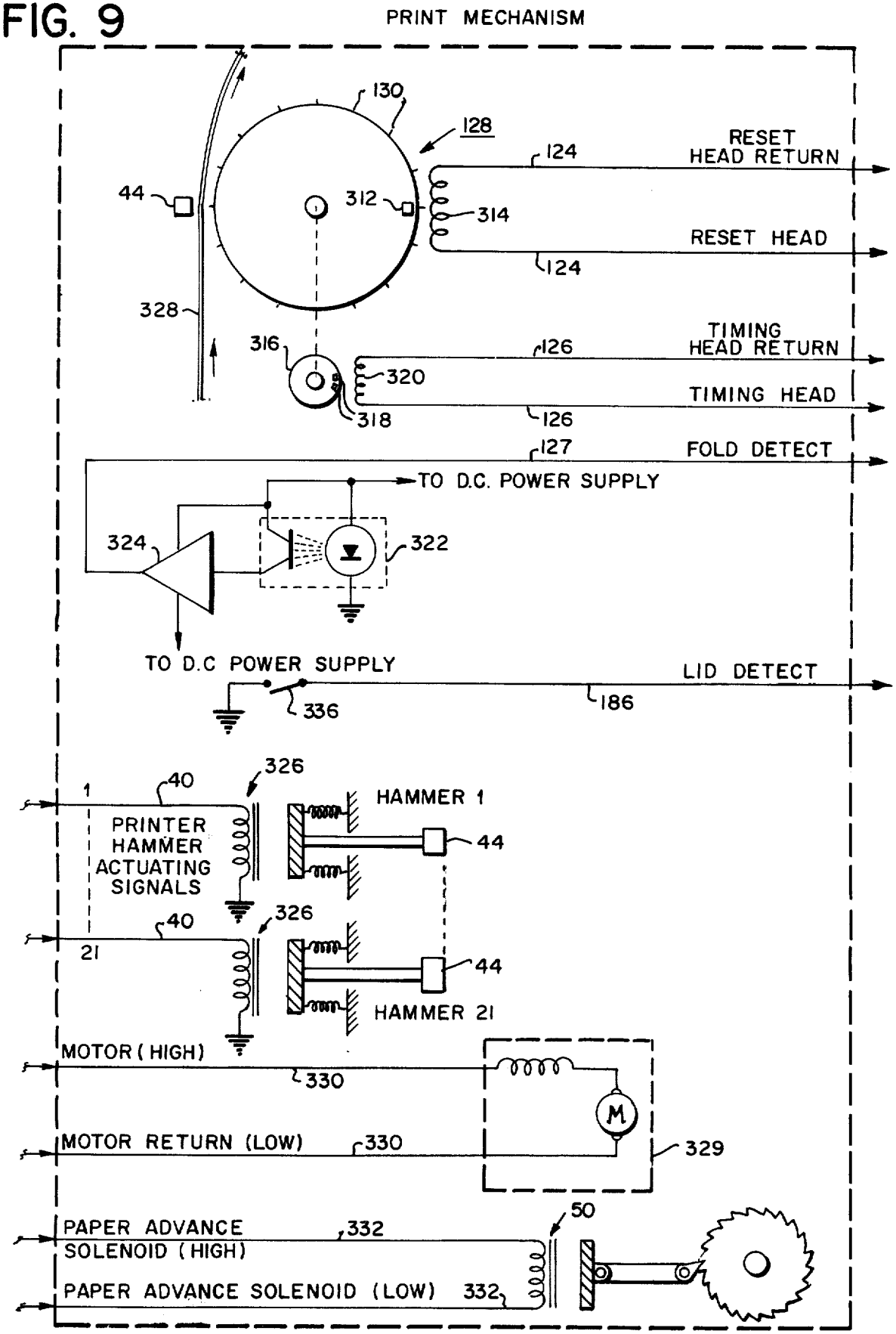
FIG. 9     PRINT MECHANISM

FIG. 10
REGISTER # ϕ
BIT #
| ϕ |
| 1 | ⎫ TO DATA ϕ, 4, 8, 12
| 2 |
| 3 |
| 4 | ⎫ TO STORED
| 5 | ⎭ DATA ADDRESS ϕ, 4
| 6 |
| 7 | ⎫ TO DATA 1, 5, 9, 13
| 8 |
| 9 |
| 10 | ⎫ TO STORED
| 11 | ⎭ DATA ADDRESS 1, 5
| 12 |
| 13 | ⎫ TO DATA 2, 6, 10, 14
| 14 |
| 15 |
| 16 | ⎫ TO STORED
| 17 | ⎭ DATA ADDRESS 2, 6
| 18 |
| 19 | ⎫ TO DATA 3, 7, 11, 15
| 20 |
| 21 |
| 22 | ⎫ TO STORED
| 23 | ⎭ DATA ADDRESS 3, 7
REGISTER # 1
BIT #
| ϕ | CLEAR ⎫
| 1 | LOAD BUFFER |
| 2 | START FORM | TO PROGRAMMABLE PRINTER
| 3 | FORM FEED | COMMAND INTERFACE
| 4 | SPACE |
| 5 | PRINT ⎭
| 6 | BUSY ⎫ TO PROGRAMMABLE PRINTER
| 7 | FORM BUSY ⎭ OUTPUT STATUS LINES
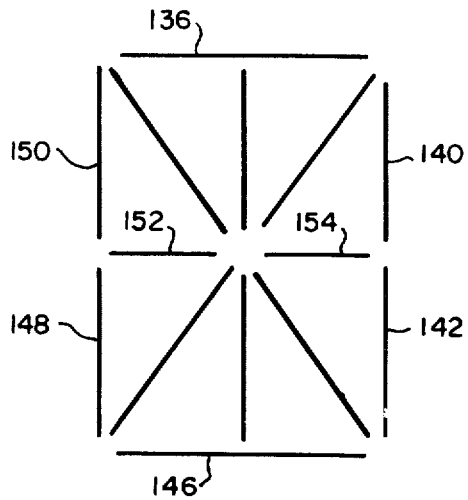
FIG. 17
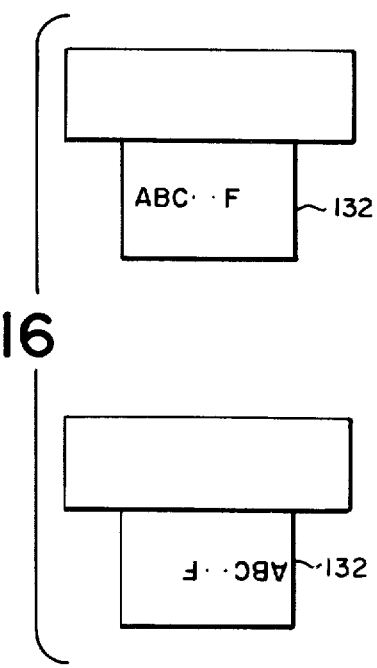
FIG. 16

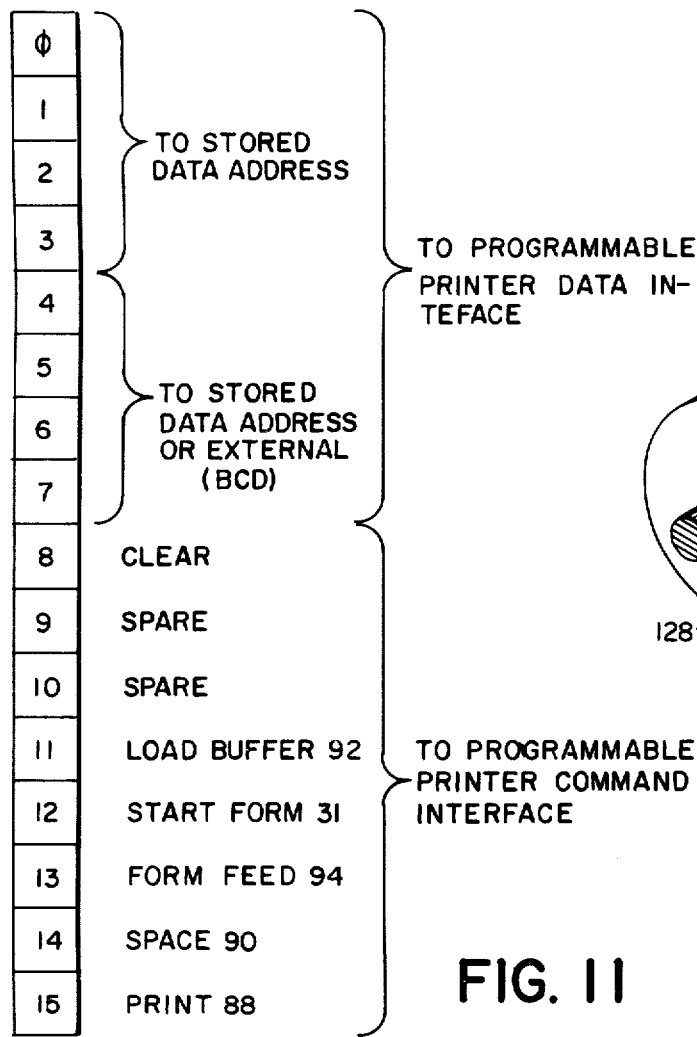
FIG. 11
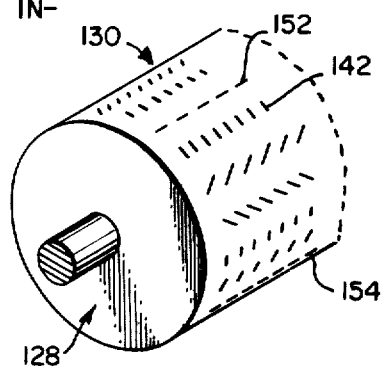
FIG. 18
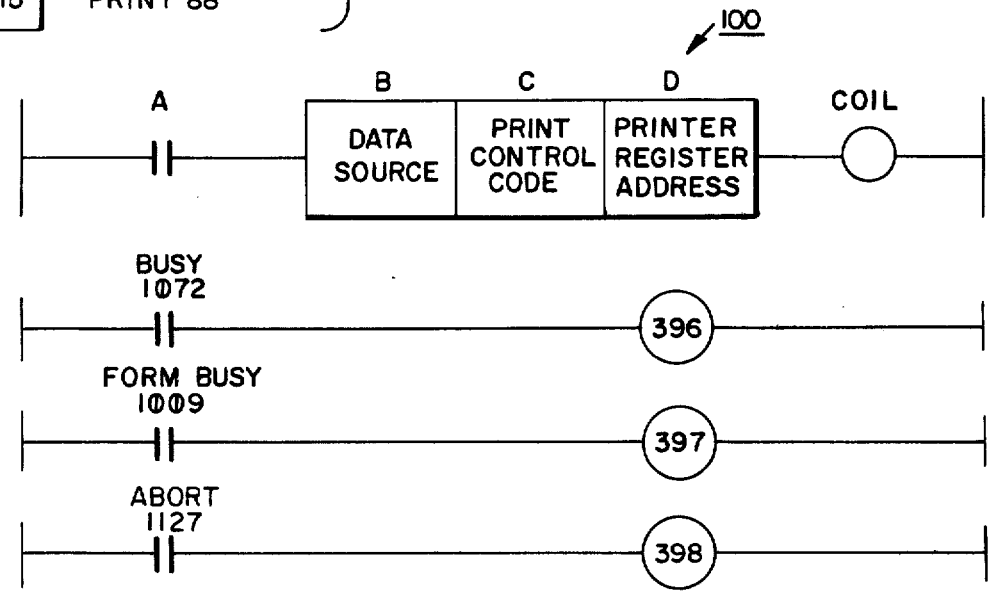

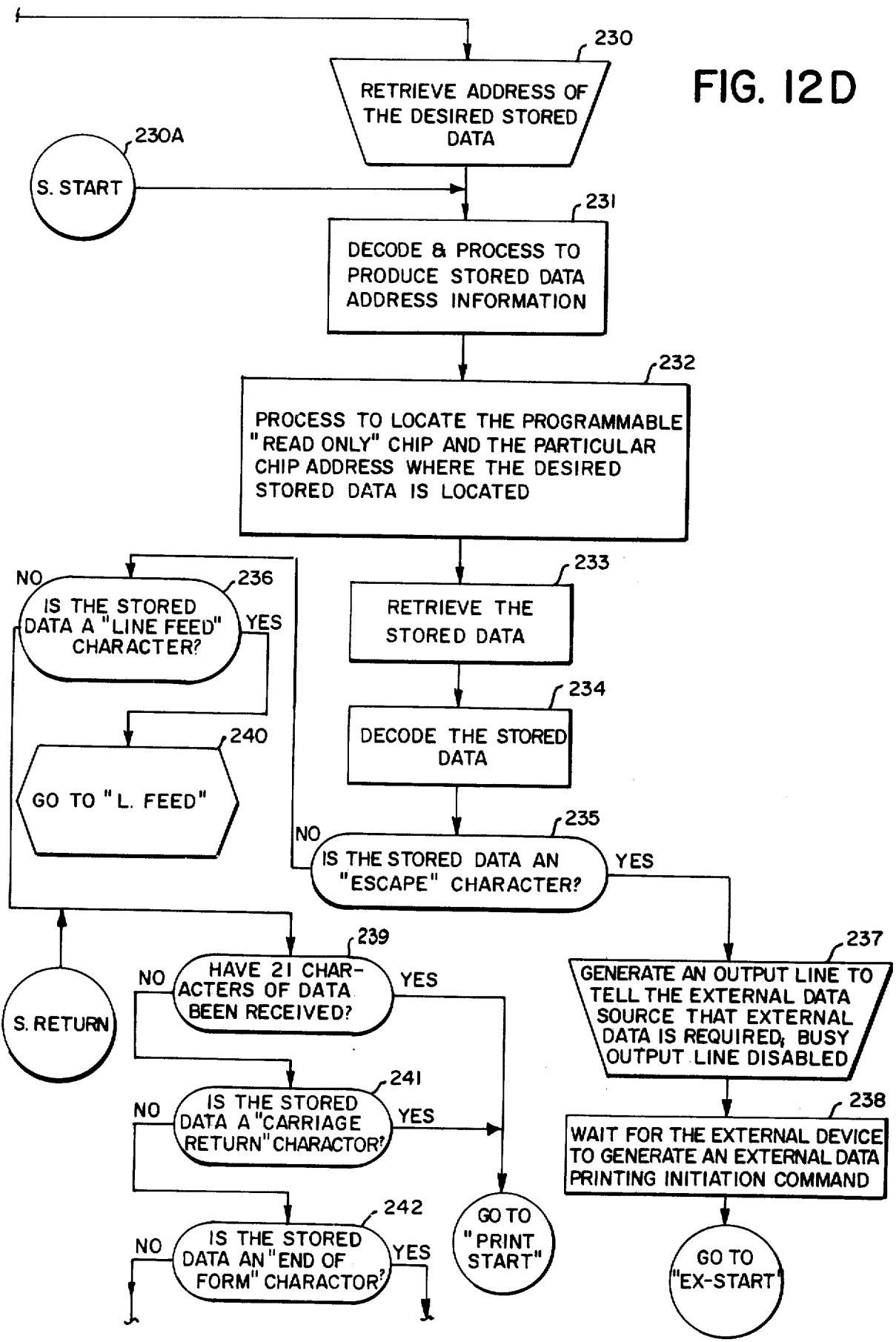

| DATA SELECT LINES | | NO. OF CHARACTERS | |
|---|---|---|---|
| 0 | 1 | BCD | ASCII |
| 0 | 0 | 1 | 1 |
| 0 | 1 | 2 | 1 |
| 1 | 0 | 3 | 2 |
| 1 | 1 | 4 | 2 |

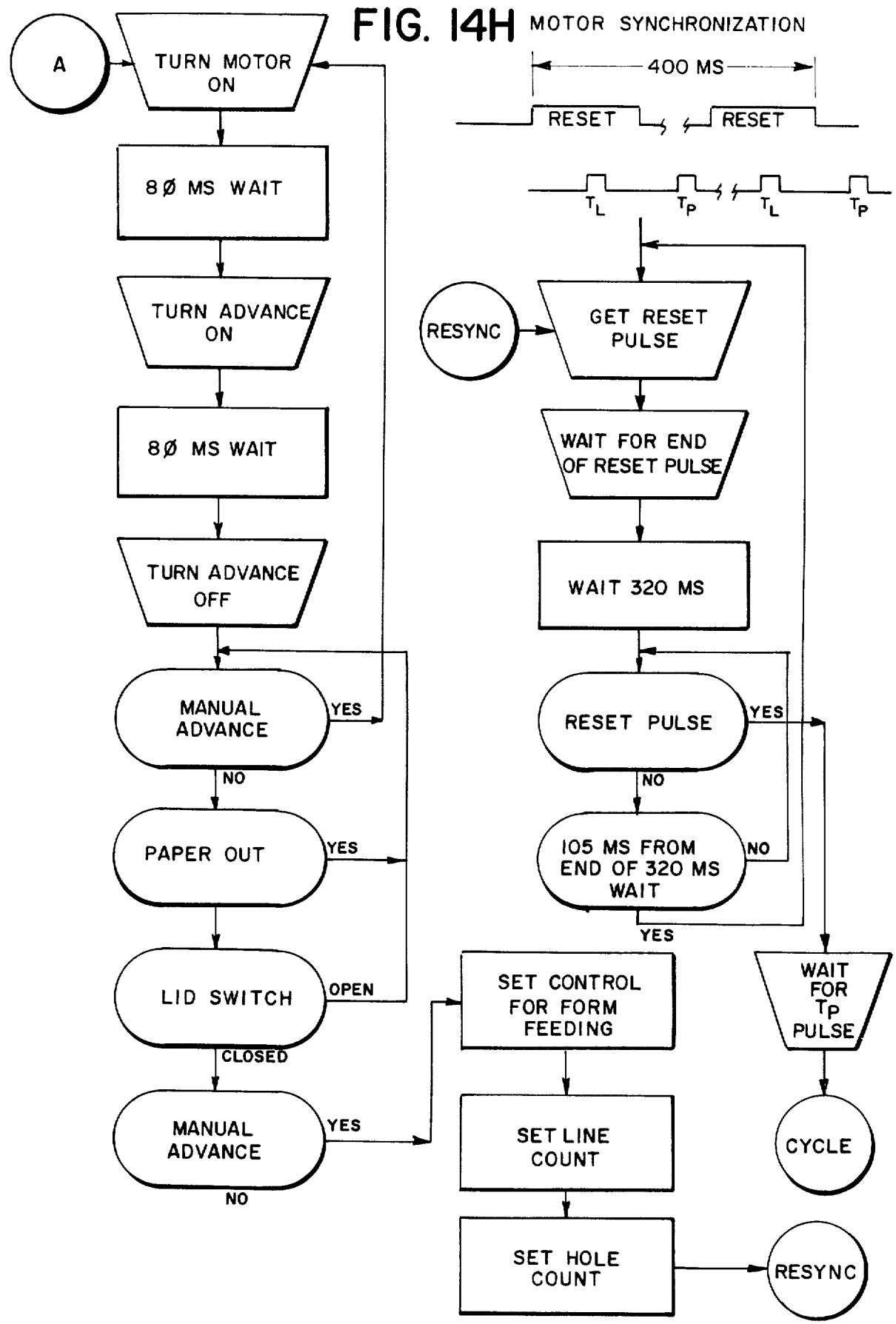

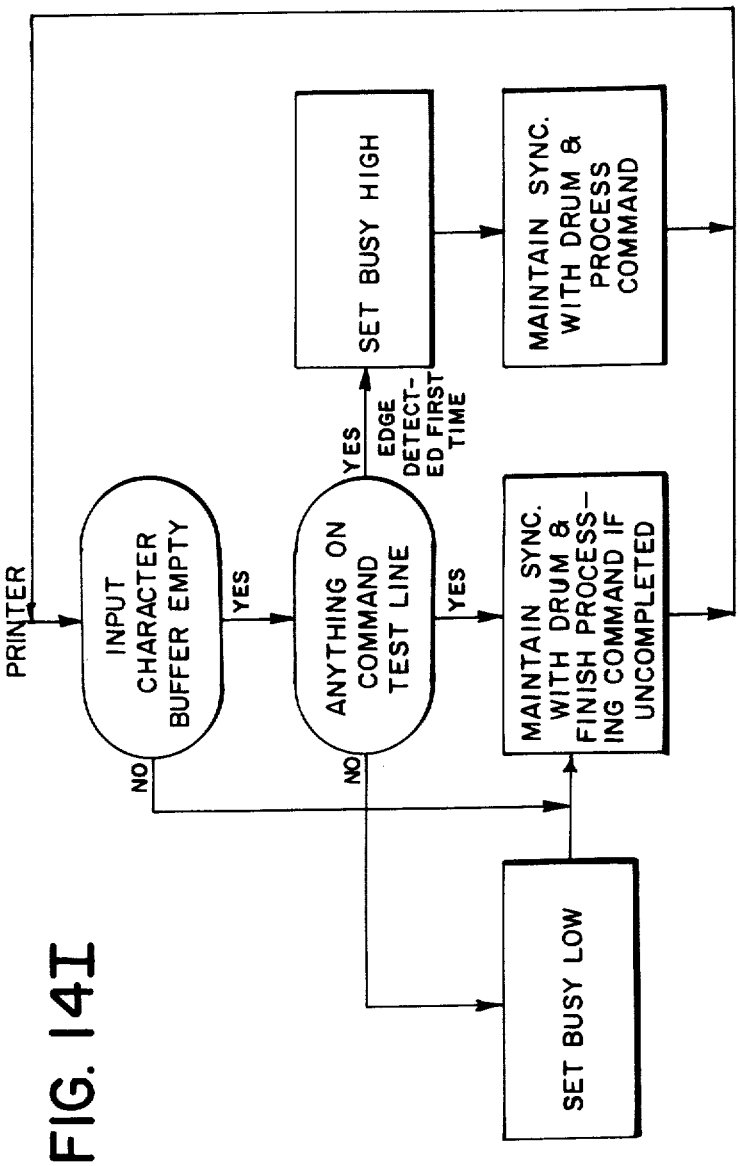
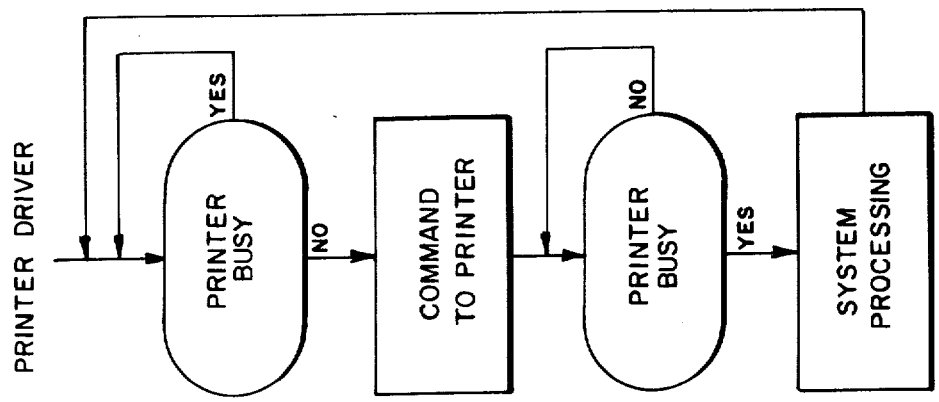
FIG. 14I

FIG. 14J
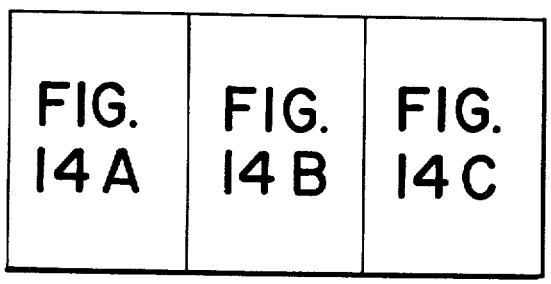
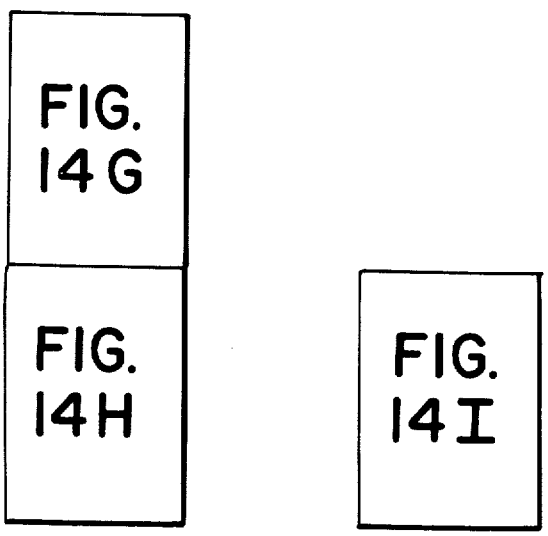

PROGRAMMABLE PRINTER

BACKGROUND OF THE INVENTION

This invention relates to a programmable printer, and more particularly to apparatus and methods employed therein.

The printer according to the invention disclosed herein is particularly adapted to an industrial environment so as to provide on line production monitoring and reporting. Such printers can be used to provide "hard" copy for plant supervisory and management personnel of essential data such as machine conditions, parts control, running time, tool life, and other desired industrial information.

In addition, the programmable printer herein disclosed is capable of printing both prestored data or data information and external data or data information, either individually or in combination with each other. The capability of intermixing stored data with external data allows the programmable printer to perform such functions as labeling external data so as to readily identify the external data, generating warning information when certain conditions exist in external machinery, generating diagnostic information regarding procedures to follow for correcting a machine malfunction, as well as many other industrial or non-industrial printing functions. Thus a statement such as "LIMIT SWITCH No. 03 FAILED TO TRIP" could be readily printed by the present invention upon receiving the required command and stored data addressing information as well as external data corresponding to the number "03".

Present day printers are primarily made to print information only when such information is properly transferred to its machanisms. Unlike the present invention, most present day printers are not designed for harsh industrial environments. In addition, none of the present day printers are able to intermix prestored data with external data. Furthermore, none of the present day printers are compatible with present day programmable industrial controllers such as the Modicon Model 084 and Modicon Model 184, manufactured by the Modicon Corporation of Andover, Massachusetts.

The present invention allows such industrial controllers to initiate a printing sequence that causes the present invention to retrieve stored data which may in turn command the industrial controller to supply external data. The resulting printout consists of a message with both prestored and external data.

The only known prior art devices that are able to monitor external devices and initiate the production of stored data upon receiving particular command information are the prerecorded emergency message devices used on some aircraft. These devices warn the crew of such aircraft of particular emergency conditions, such as an engine fire. These devices however are not able to receive and display a variety of external data information, nor are they able to intermix external data information with prestored data information.

SUMMARY OF THE INVENTION

The programmable printer of the present invention performs the printing, in combination or individually, of stored data or data information and external data or data information.

The programmable printer includes a memory for the storing of alphanumeric data. This information may consist of up to 100 separately addressable messages, that may be printed by selecting a number related to its memory location.

A novel feature of the invention is the capability of the stored data messages to include blank spaces where the programmable printer tells an external device, such as an industrial programmable controller, that external data (generally variable data; e.g., a calendar date) is needed. Once the desired external data is received, the programmable printer returns to the stored data message for further printing. The stored data message may contain as many insertions of external data as desired, each time commanding an external data source to submit the desired external data. Thus a printed message may state, DATE 2/20/74, TIME 2:04 P.M., where "DATE", "/", "/", "TIME", ":" and "P.M." are stored in the printer's memory and "2", "20", "74", "2" and "04" are retrieved by commanding an external device to supply this data.

The printer incorporates a command multiplexer comprising input command lines, addressing lines and an output line. The printer also incorporates a microprocessor comprising a miniature fixed program digital computer. The microprocessor decodes and processes all incoming signals, as well as generating the proper output signals to perform the desired printing.

More particularly, the microprocessor continuously monitors all the incoming command lines of the command multiplexer. When the "START FORM" command line is in the true state (i.e., the "START FORM" signal is received), the multiplexer initiates a sequence of events. It first addresses the data multiplexers for the receipt of stored memory addressing information. The data interface consists of four 8-input, 1-output addressable multiplexer integrated circuits. Four of the input data lines of each multiplexer are for the receipt of external data, two of the lines are for the receipt of addressing information for the stored data, and two of the input lines are for the receipt of stored data.

The microprocessor thus retrieves eight lines of information related to a particular address location of the stored data. It receives this addressing information in a parallel fashion, four lines at a time. It interprets this address information as two binary coded decimal (BCD) numbers. Thus the eight addressing lines represent a decimal number from zero to 99, corresponding to the 100 addressable stored data locations of the printer's programmable "read-only" memory.

The programmable "read-only" memory (PROM) comprises nine 256 × 8, 2048 bit "read-only" memory chips. These chips contain all the prestored data messages that a particular user may require, up to 100 messages.

After the microprocessor receives the stored data addressing information from the data interface, it decodes and processes this addressing information in a manner to generate an output signal to drive a stored data selector. The stored data selector transforms this output information by means of output latches and demultiplexers to generate a chip selector signal which activates one of the PROM chips and which also activates a particular address location (PROM address) of the selected PROM.

The address memory location of the PROM selected generates eight bits of stored data output, which are connected to the data interface. The microprocessor then addresses the data interface to retrieve these eight bits of stored data information. The stored data information is interpreted in an ASCII code in order to allow printing of alphanumeric information. The microprocessor decodes and stores this information in an input memory buffer, while incrementing the stored data address location in order to receive the next eight bits of stored data.

If nothing further occurred, the microprocessor would store the next 21 ASCII characters from the selected PROM and would then generate output information to drive a printer logic interface and a print drive and output status lines interface.

The printer logic interface provides the necessary amplification and shaping of the microprocessor's hammer information in order to drive the print mechanism's hammers, which perform the actual printing. The print drive and output status lines interface amplifies and shapes the print drive information so as to control the paper drive of the print mechanism. The microprocessor also receives timing information from the print mechanism by the printer logic and command interfaces that causes the print mechanism's hammers to be activated at the proper time.

If the microprocessor receives particular stored data indicating that external data is desired, the microprocessor addresses the data interface so as to receive external data. At the same time the microprocessor indicates to the external device supplying the external data that external data is desired. This external data is similarly decoded and stored in the microprocessor buffer.

The microprocessor will continue to receive external data until the stored data indicates that no further external data is required, at which time the microprocessor will again decode and store the stored data.

Printing of the decoded data will occur every time 21 characters are stored in the microprocessor's input buffer or until a "CARRIAGE-RETURN" signal is received from the stored memory. The "CARRIAGE-RETURN" signal in essence generates a print command identical to the command initiated when 21 characters are stored in the microprocessor's buffer.

The programmable printer is also able to print external data without stored data. To perform this mode of printing the microprocessor must receive a "LOAD BUFFER" command from the command interface. This command causes the microprocessor to address the external data lines. The microprocessor then receives, decodes, and stores the external data on the external data line. The external data can be decoded in a BCD code or in an ASCII code, depending on the condition of the BCD/ASCII command line. If a BCD code is desired, one to four BCD digits may be received on the sixteen data input lines, depending upon the condition of two data-select lines of the command interface. If an ASCII code is desired, one or two ASCII digits may similarly be received on the same input lines. Once the data has been transferred to the microprocessor's input buffer, initiation of a print command will cause a print sequence to occur identical to that discussed above. A print command will also be generated if 21 characters are stored in the microprocessor's input buffer, as also discussed above.

The stored data is transfered from the PROMS to the microprocessor in parellel ASCII code. Thus by providing a common serial and parallel converter (not shown) the printer can accept serial ASCII coded external data.

The programmable printer also contains output status lines which monitor the various conditions of the printer; including, the condition of the print paper, whether a stored message is being printed, whether variable external data is desired in the stored message, and whether the print motor is operating. All of these output status lines, as well as all the input command lines and input external data lines, are electrically isolated from the programmable printer. In addition, the input data lines and the input command lines may be supplied to receive either 24-volt DC signals or 120-volt AC signals. Similarly the output status lines may be supplied to drive 24-volt DC devices or 120-volt AC devices.

OBJECTS OF THE INVENTION

It is therefore an object of the invention to provide a printer that is capable of printing, in combination, stored data and external data.

Another object of the invention is to provide a programmable printer capable of accepting external data in either a BCD or an ASCII code in parallel on ASCII code in serial.

A further object of the invention is to provide a programmable printer capable of printing in both an upright mode and in an inverted mode.

Another object of the invention is to provide a programmable printer with output status lines that monitor various conditions of the printer.

Another object of the invention is to provide output information capable of communicating with external devices with regard to receipt of external data.

An additional object of the present invention is to provide a programmable printer utilizing programmable "read-only" memories for the storage of internal prestored data messages.

A further object of the invention is to provide a programmable printer that electrically isolates all input and output communications with the outside world.

An additional object of the present invention is to provide a programmable printer that utilizes a specially programmed digital mini-computer for decoding and processing input commands and data information.

A further object of the present invention is to provide a programmable printer that provides "hard" copy to plant supervisory and management personnel of various machine conditions.

An additional object of the present invention is to provide a programmable printer capable of withstanding harsh industrial environments.

Other objects of the invention will in part be obvious and will in part appear hereinafter.

THE DRAWINGS

FIG. 1 is a block diagram of a programmable printer according to the invention;

FIG. 2 is a schematic diagram of the microprocessor shown in FIG. 1;

FIG. 3 is a schematic diagram of the command interface shown in FIG. 1;

Figure 4A:
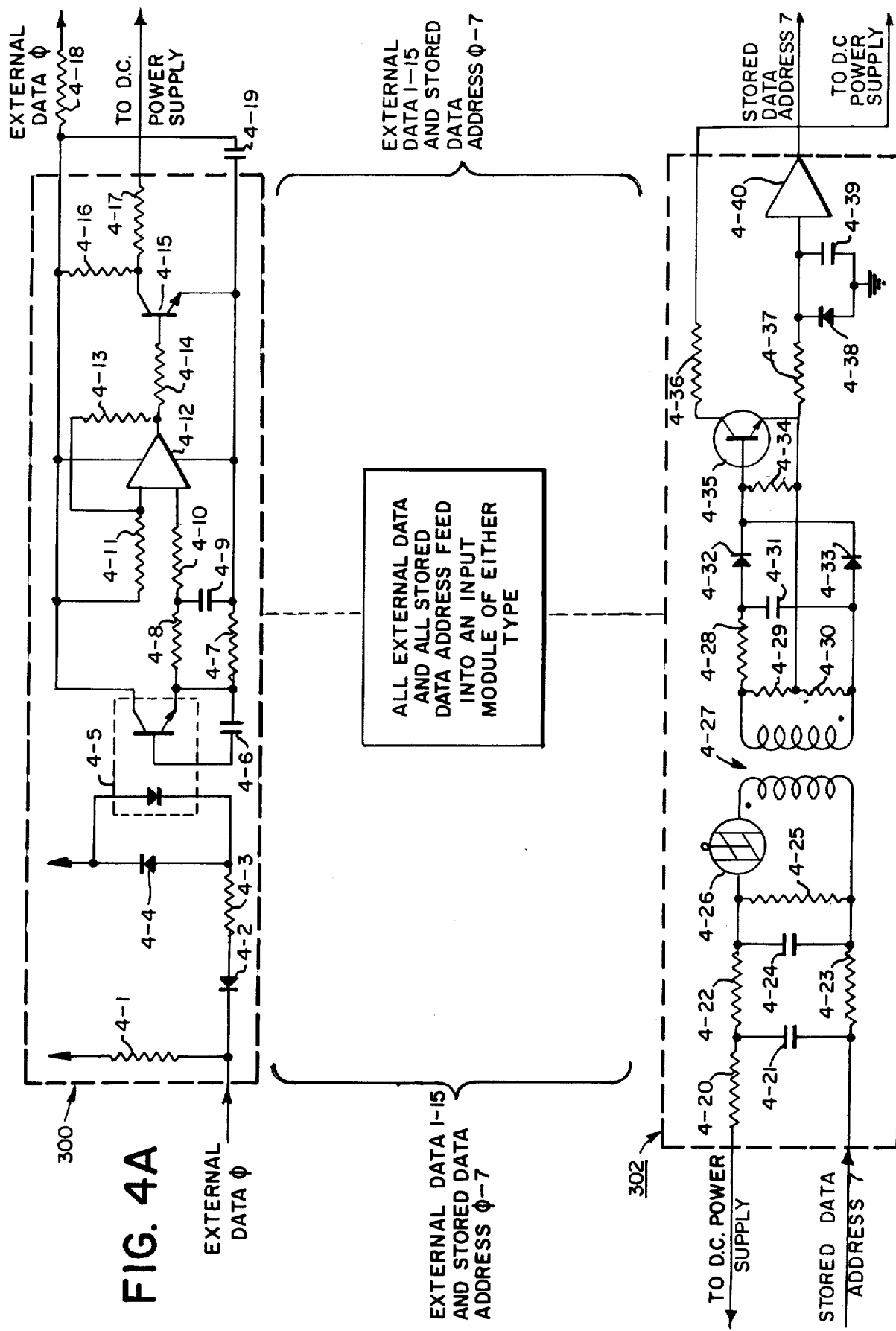
Figure 6:
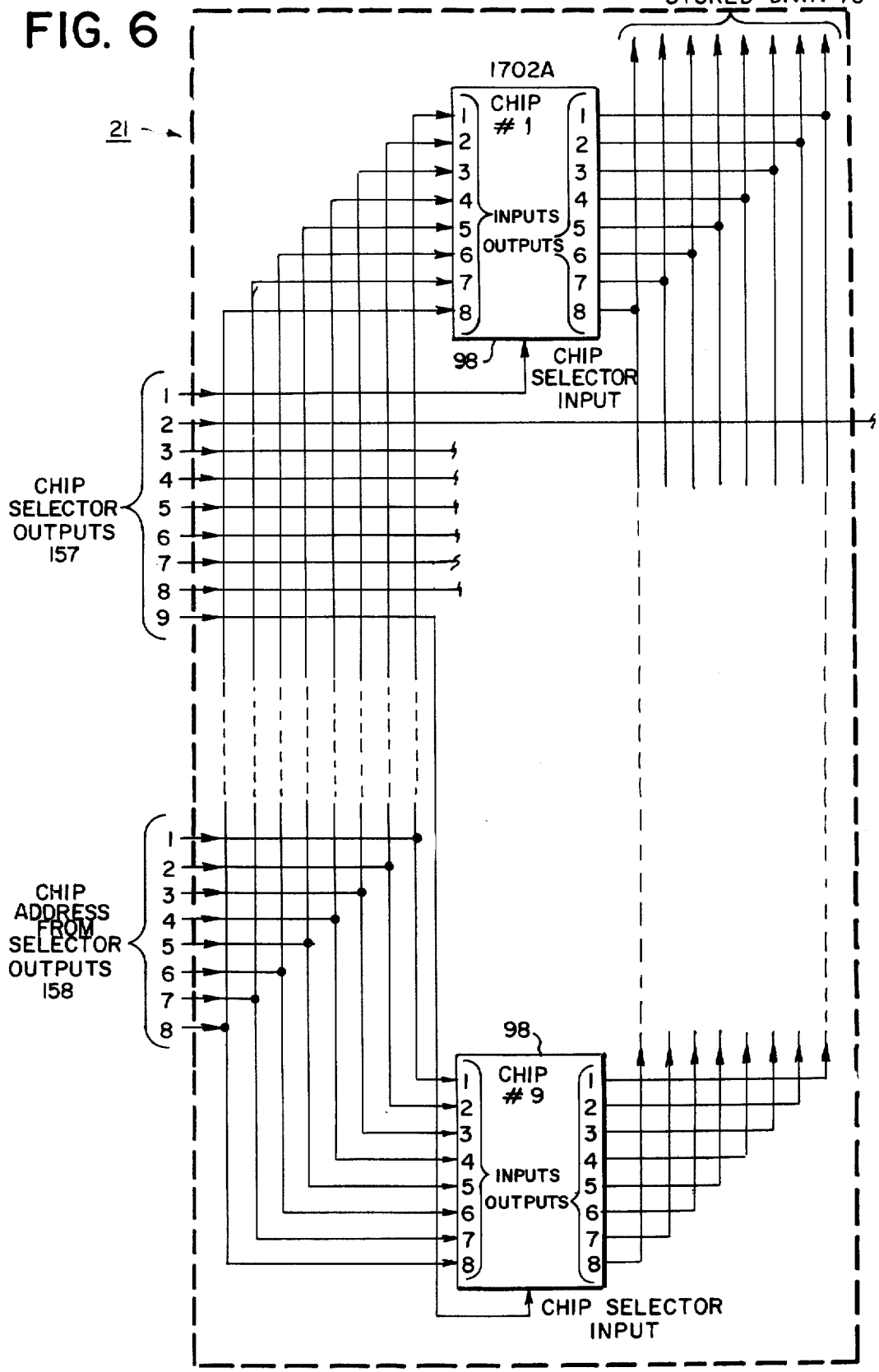
Figure 7:
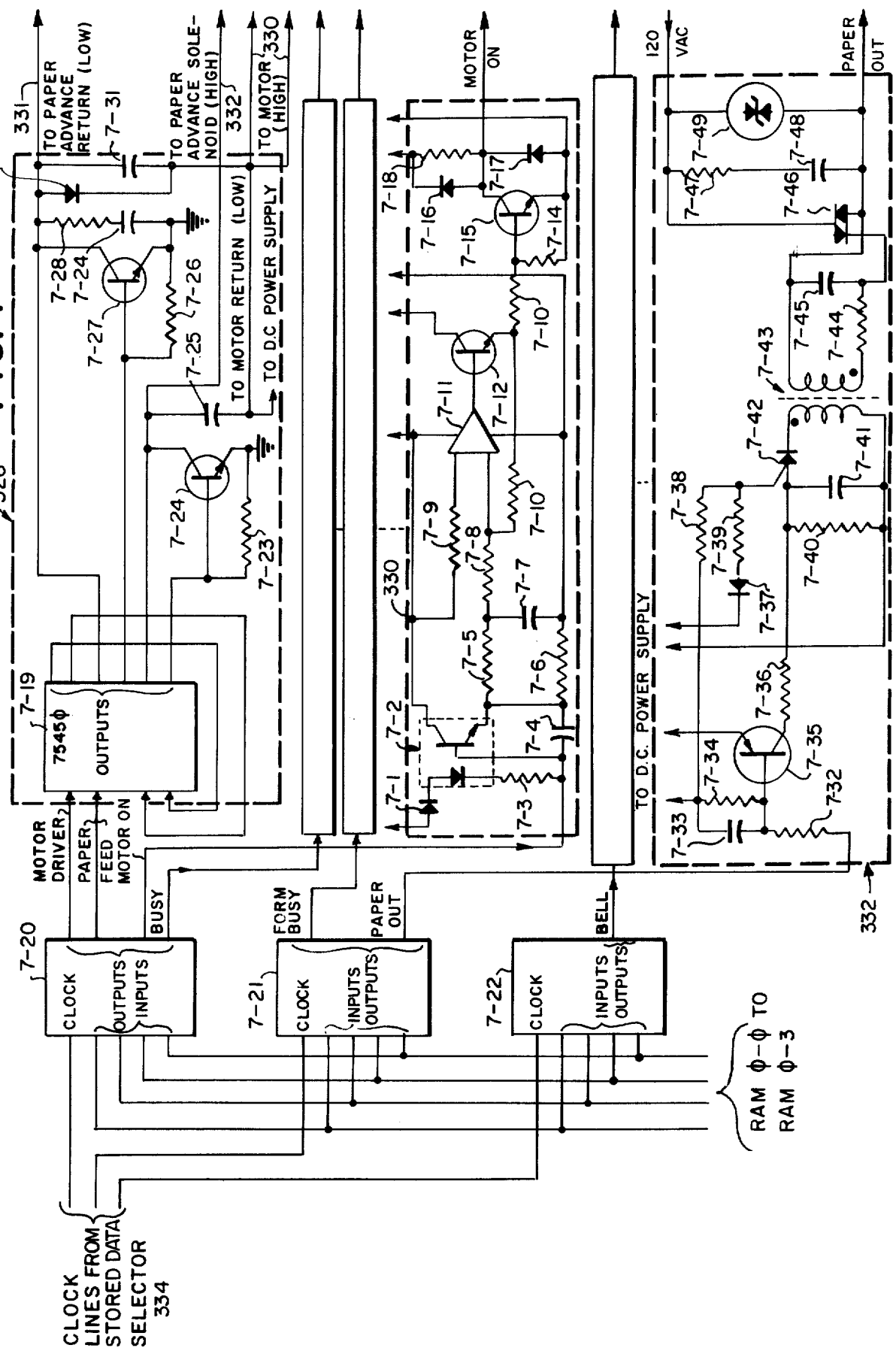
Figure 8A:
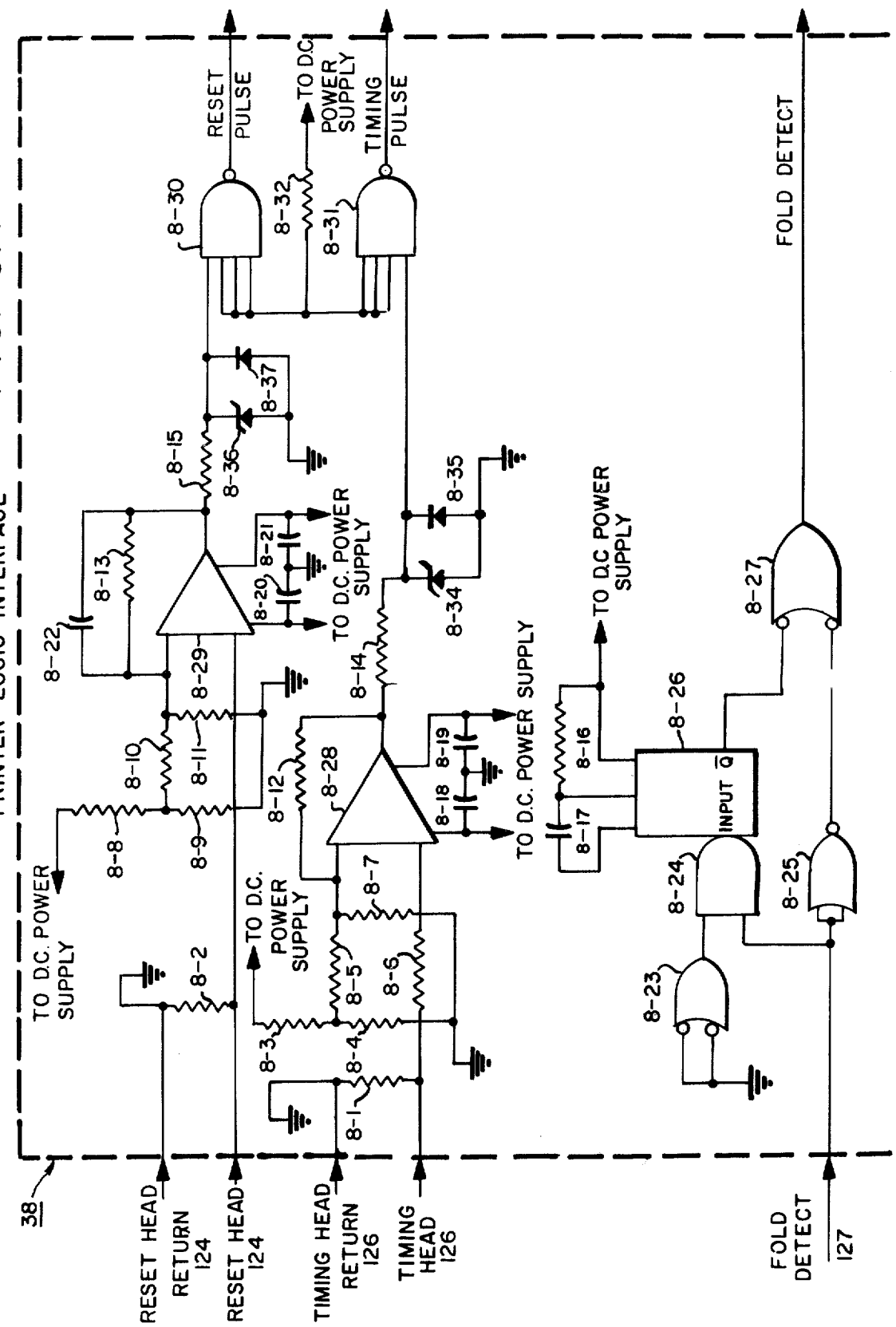
Figure 12A:
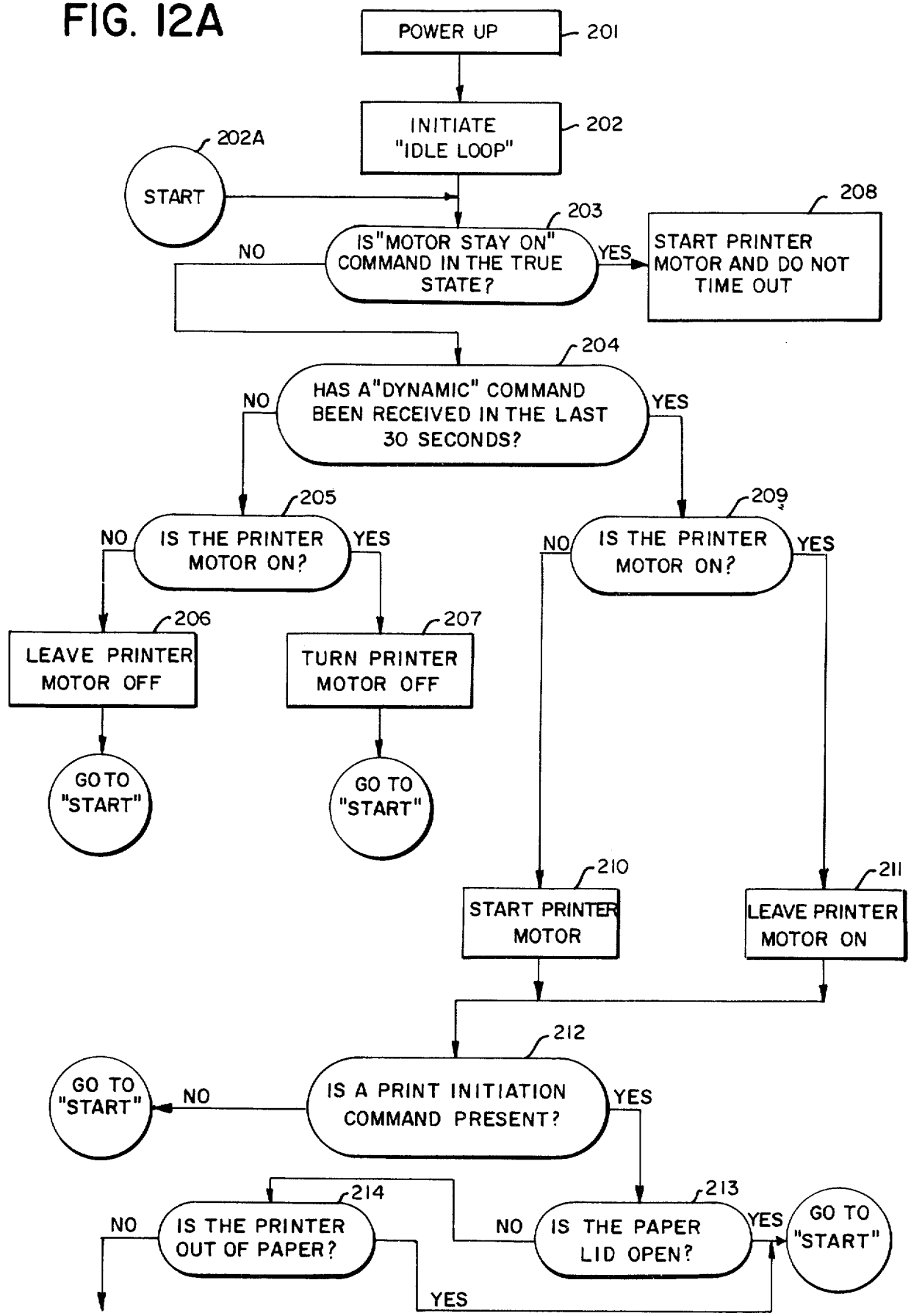
Figure 12B:
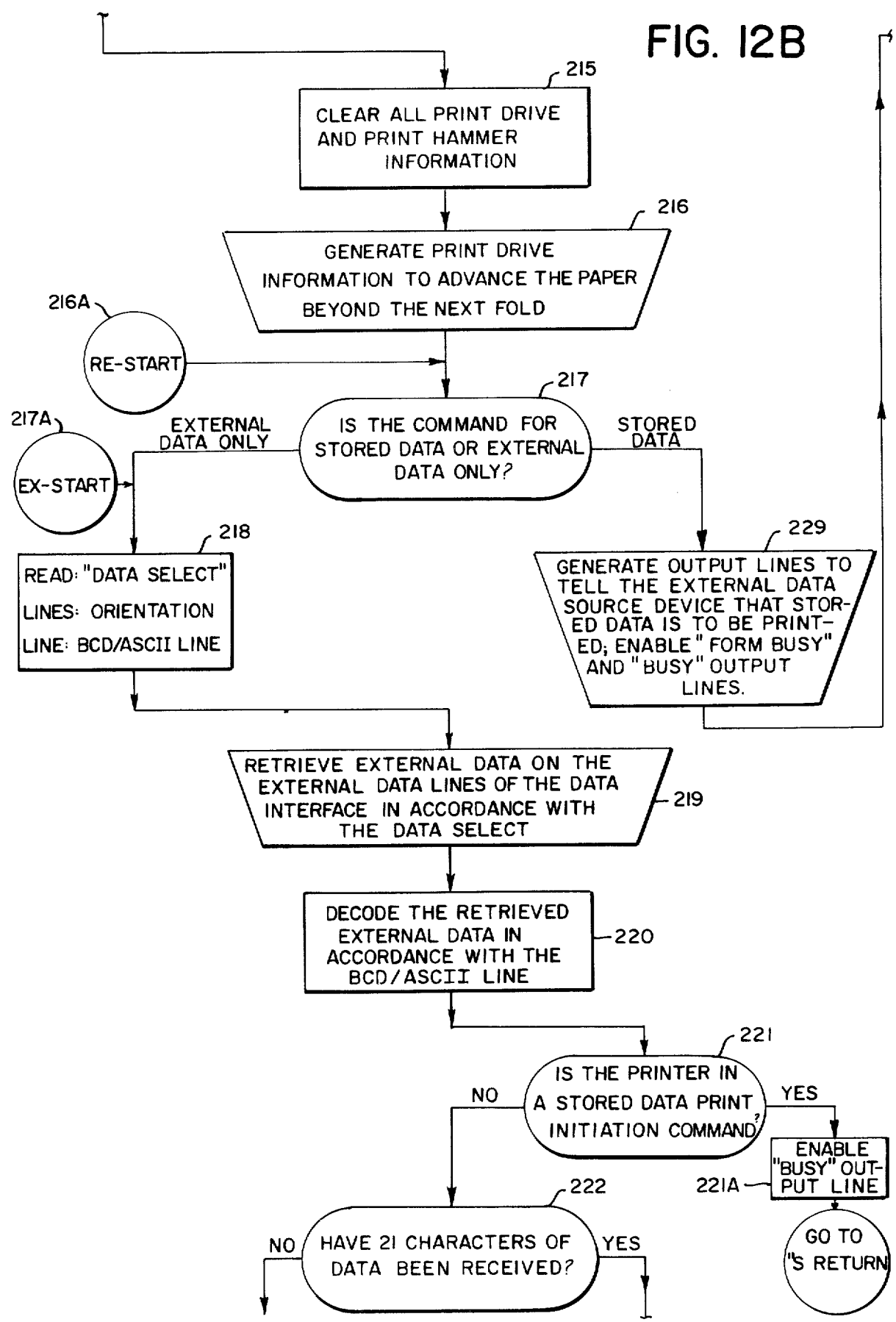
Figure 12C:
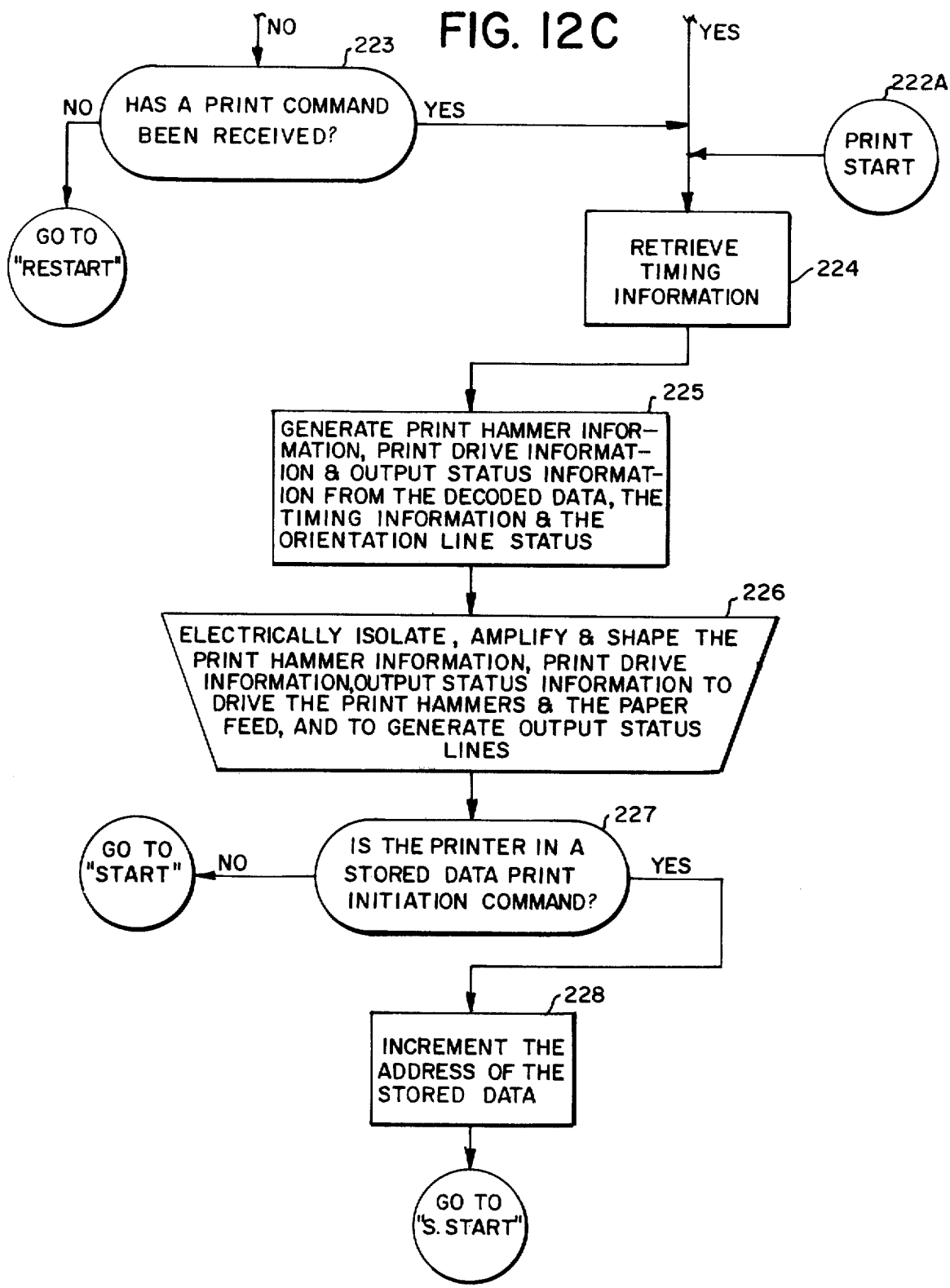
Figure 12E:
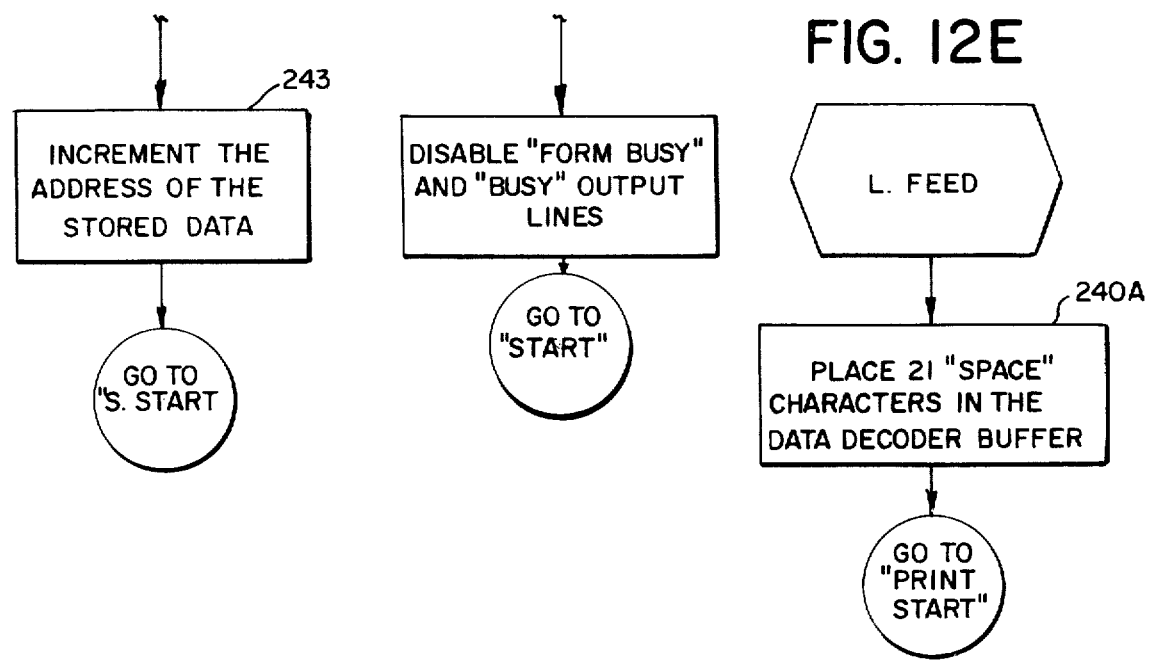
Figure 13:
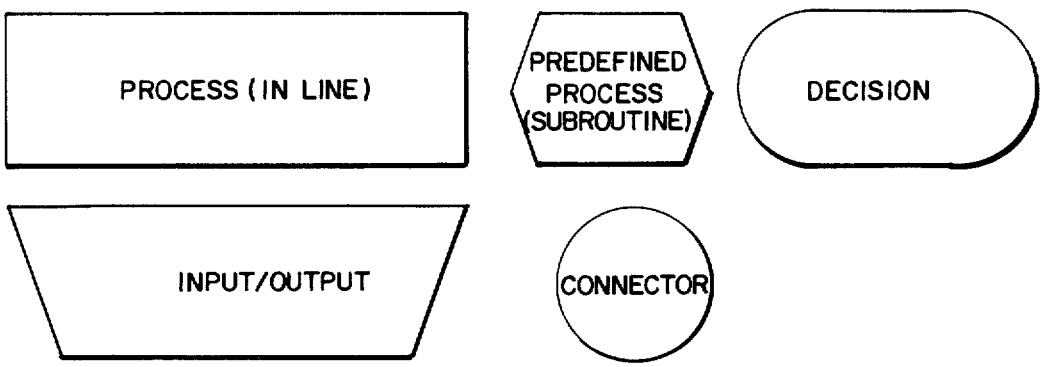
Figure 12F:
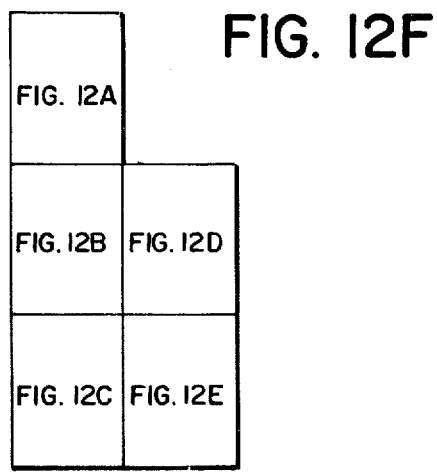
Figure 14A:
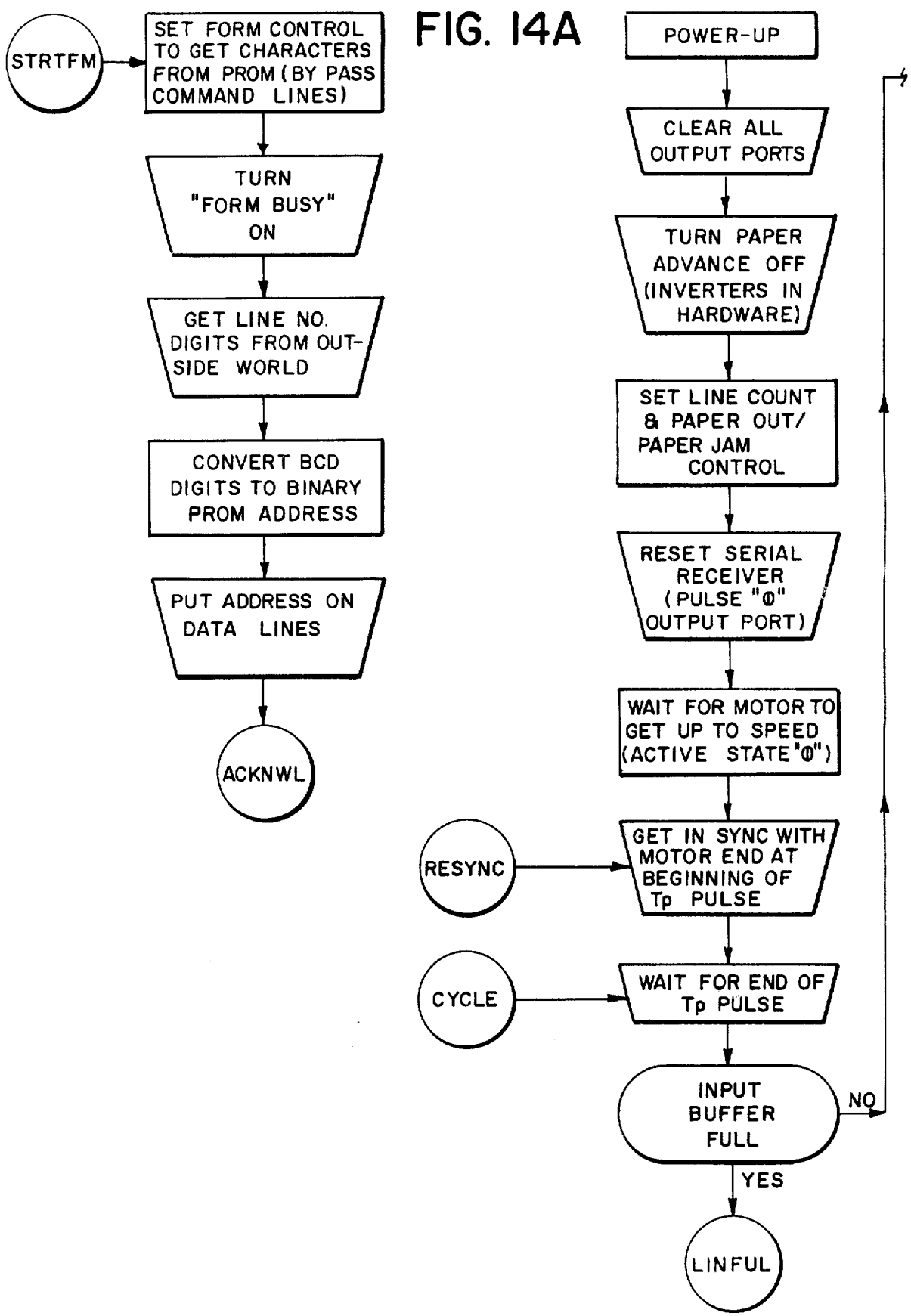
Figure 14B:
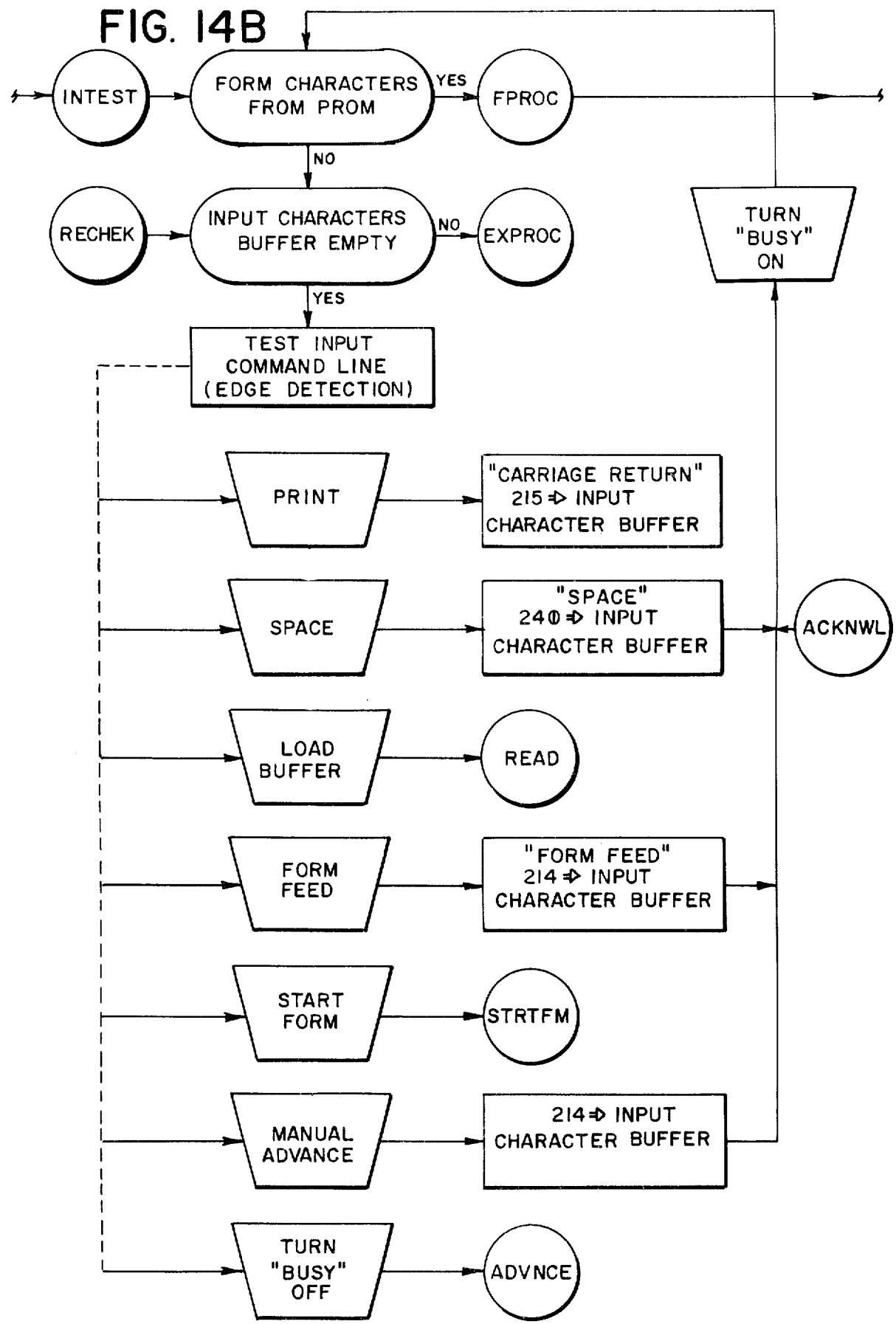
Figures 14C, 15:
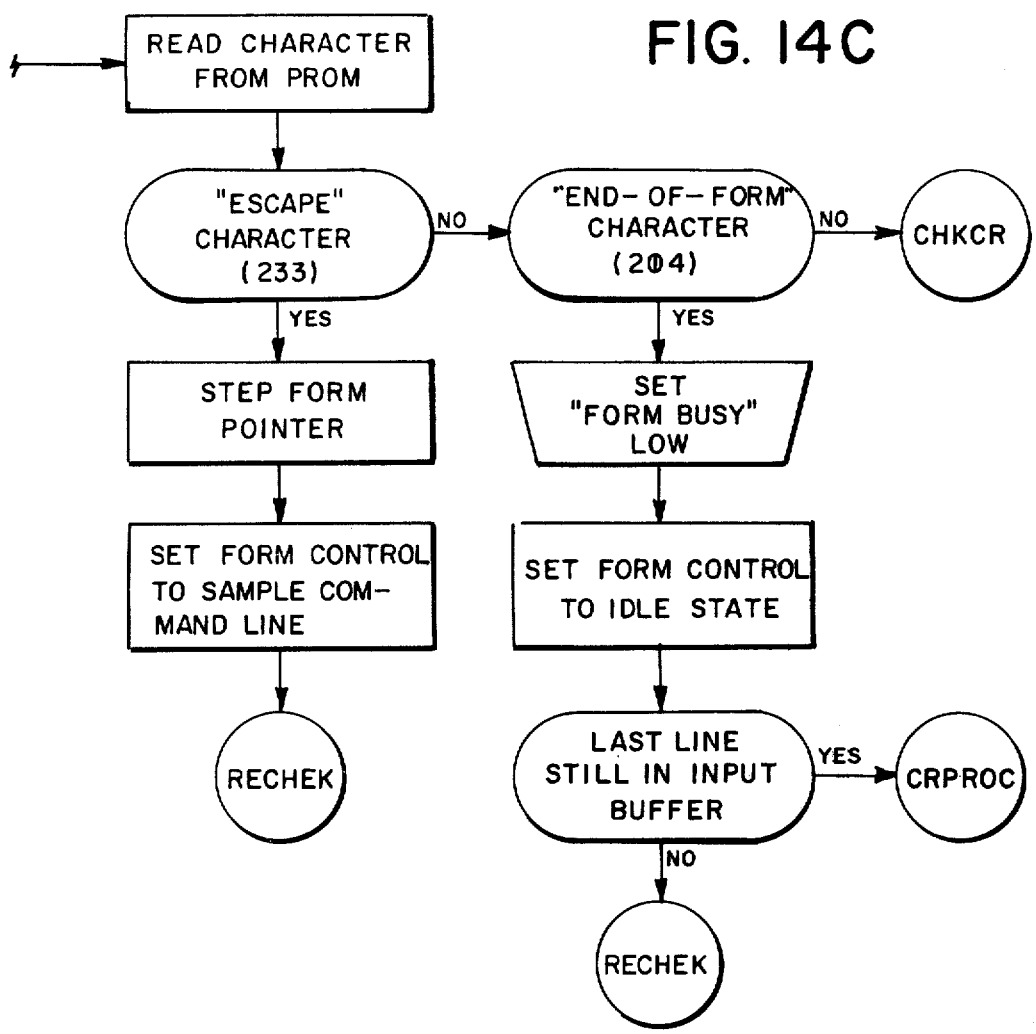
Figure 14D:
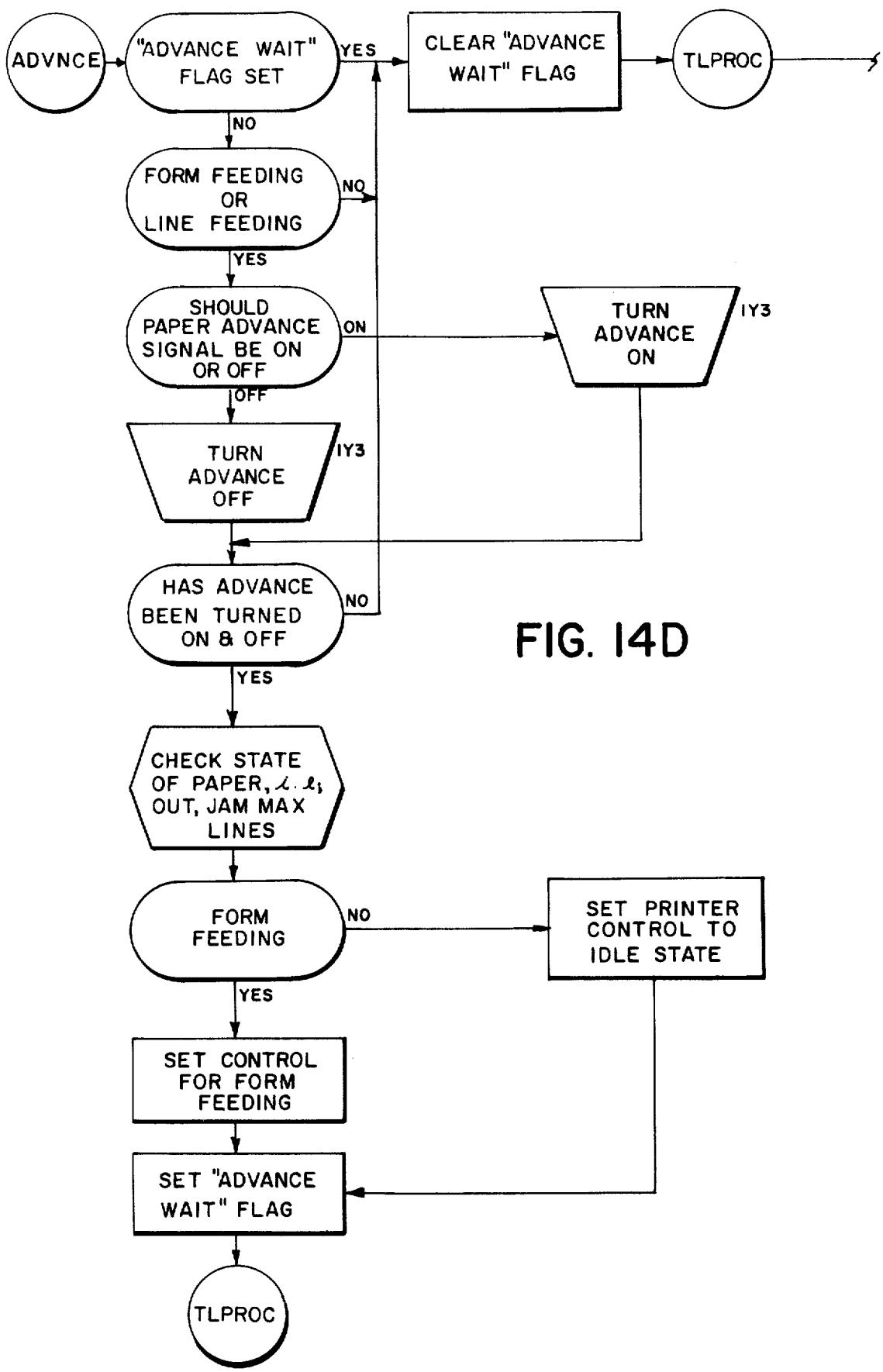
Figure 14E:
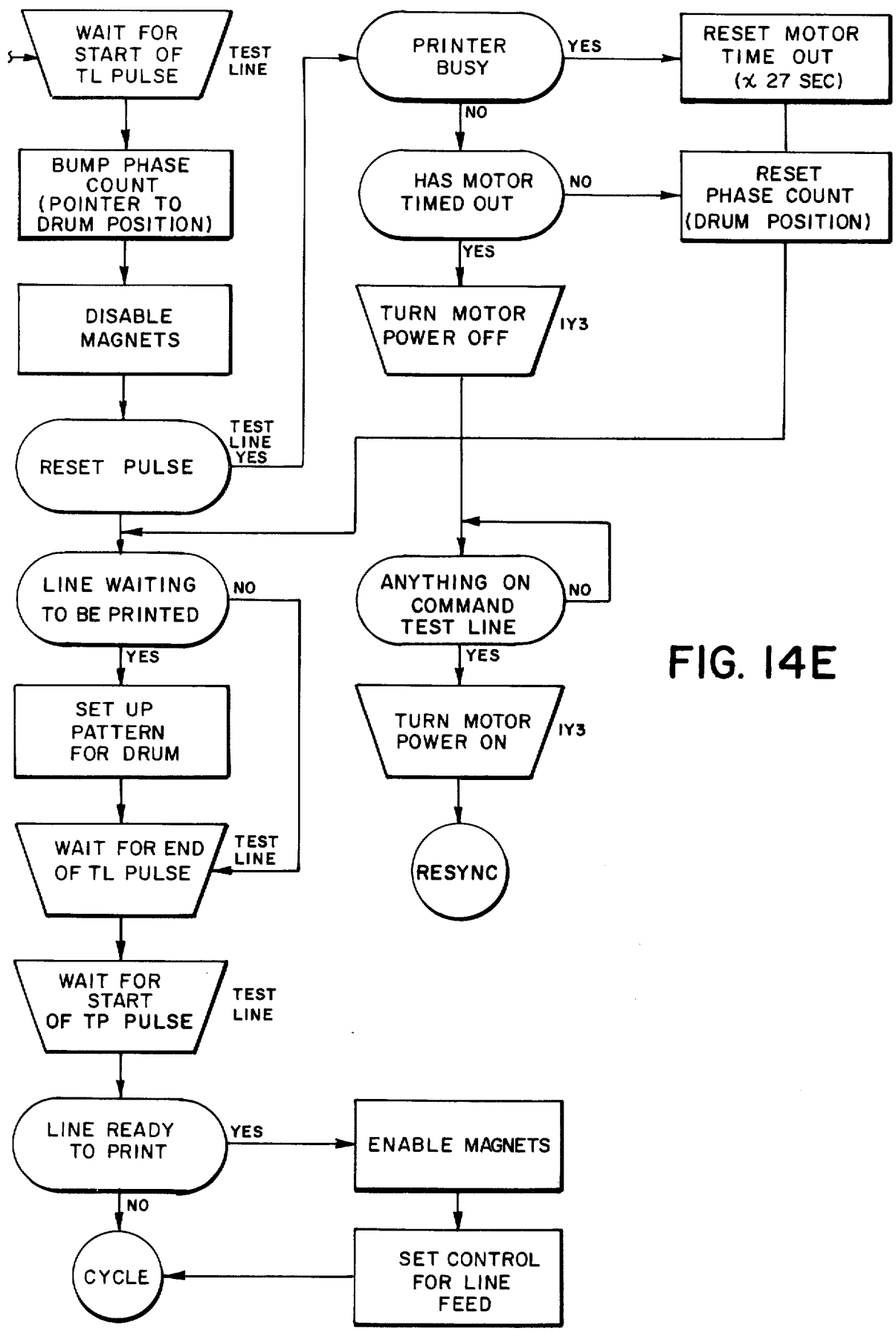
Figure 14F:
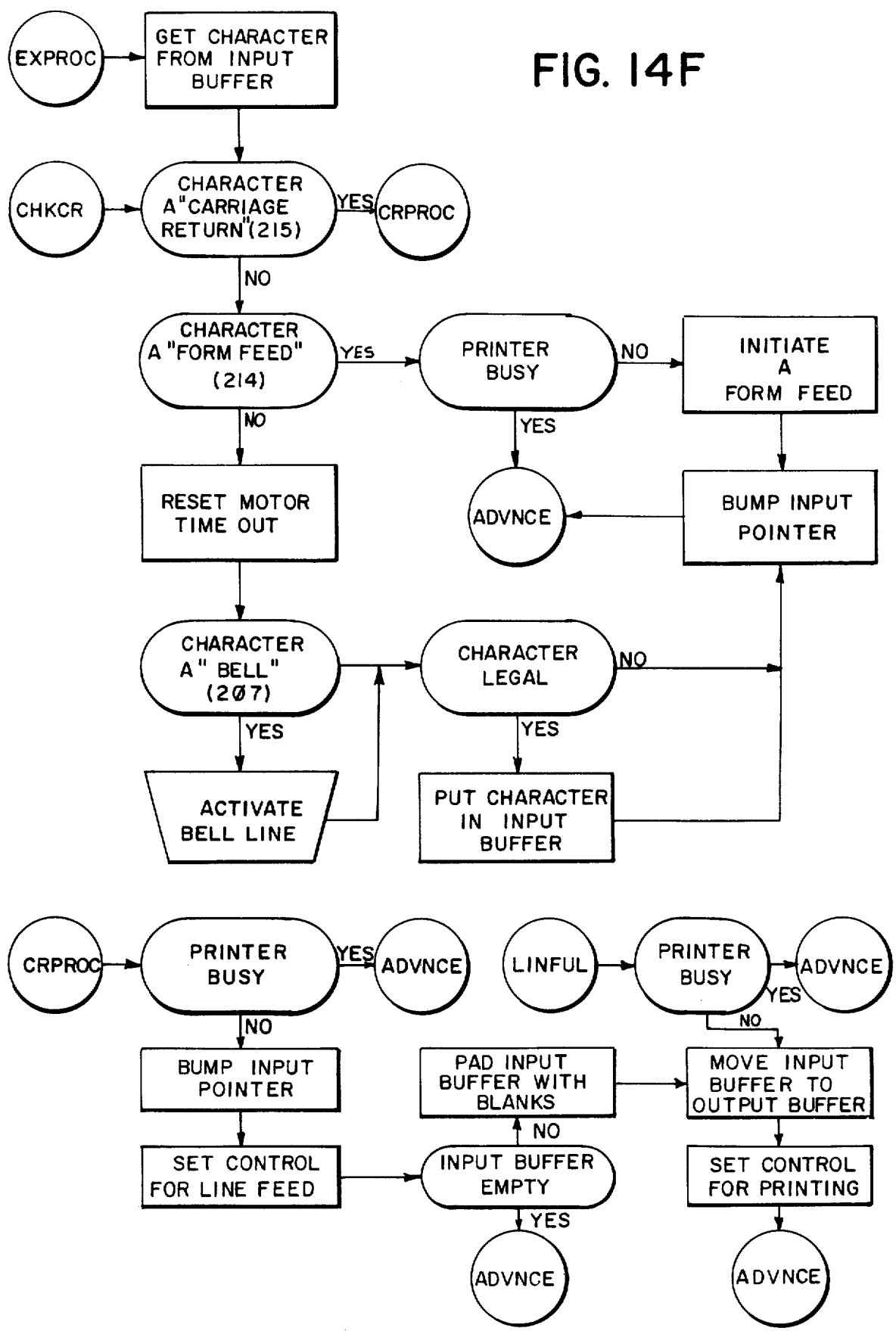
Figure 14G:
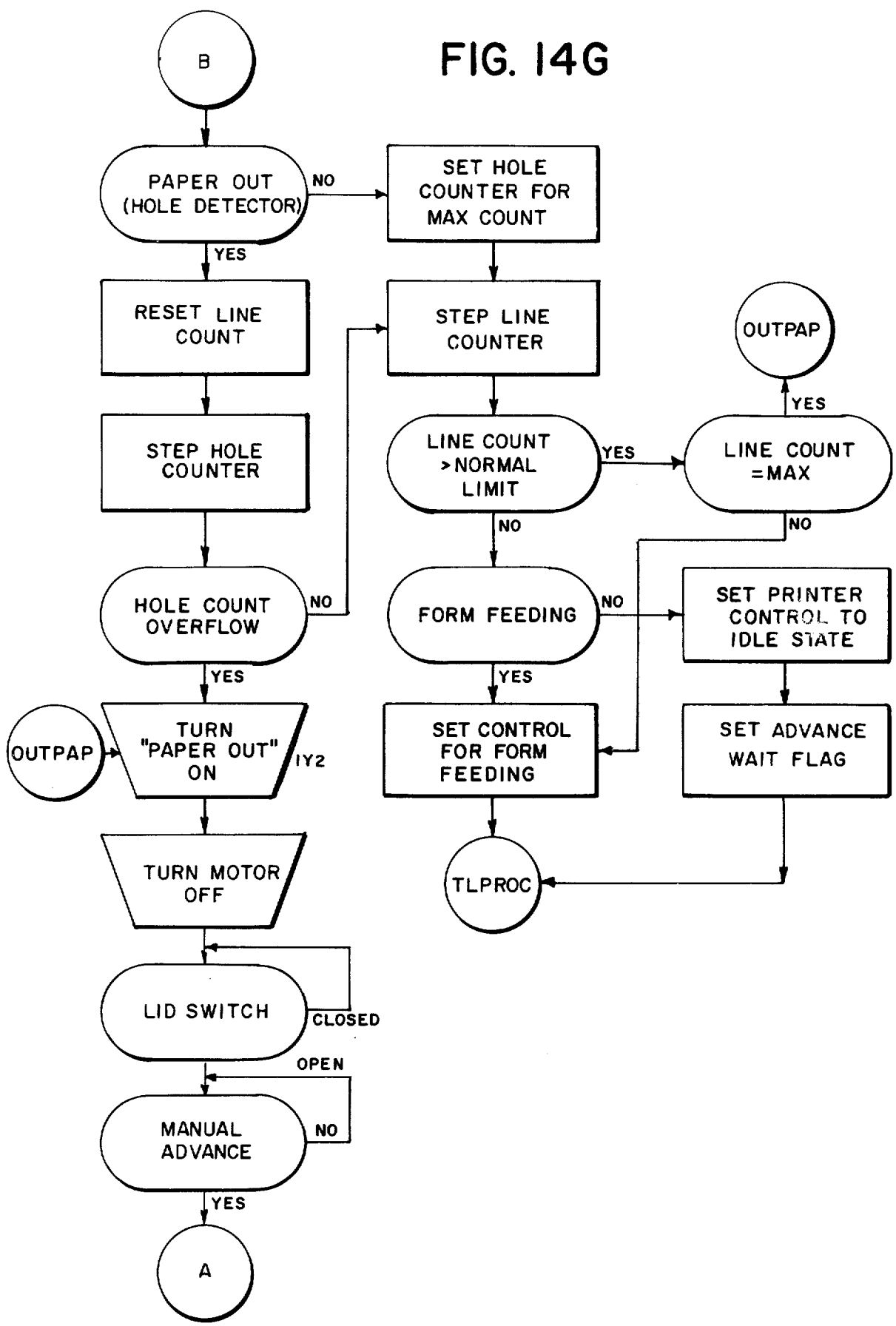

FIG. 4, comprising FIGS. 4A and 4B is a schematic diagram of the data interface shown in FIG. 1;

FIG. 4C is a diagram showing how FIGS. 4A and 4B are put together to form FIG. 4;

FIG. 5 is a schematic diagram of the stored data selector shown in FIG. 1;

FIG. 6 is a schematic diagram of the programmable "read only" memory (PROM) shown in FIG. 1;

FIG. 7 is a schematic diagram of the print drive and output status lines interface shown in FIG. 1;

FIG. 8 comprising FIGS. 8A and 8B is a schematic diagram of the printer logic interface shown in FIG. 1;

FIG. 8C is a diagram showing how FIGS. 8A and 8B are put together to form FIG. 8;

FIG. 9 is a diagrammatic view of a print mechanism showing the generation of timing, fold detect, and lid detect information, as well as energization of print hammers, a print motor and a paper advance solenoid of the print mechanism;

FIG. 10 is a diagram of two output registers of an external device and how these output registers are connected to the programmable printer;

FIG. 11 is a diagram of an output register, a control apparatus, and three input lines of a Modicon 184 Programmable Controller;

FIG. 12 comprising FIGS. 12A, 12B, 12C, 12D, and 12E is an overall flow chart of a programmable printer according to the invention;

FIG. 12F is a diagram showing how FIGS. 12A, 12B, 12C, 12D, and 12E are put together to form FIG. 12;

FIG. 13 is a representation of the block diagrams used in FIGS. 12 and 14;

FIG. 14 comprising FIGS. 14A, 14B, 14C, 14D, 14E, 14F, 14G, 14H, and 14I is an overall flow chart of the computer program used by the microprocessor of the present invention;

FIG. 14J is a diagram showing how FIGS. 14A, 14B, 14C, 14D, 14E, 14F, 14G, 14H, and 14I are put together to form FIG. 14;

FIG. 15 is a truth table showing the number of characters generated when data select lines are in various states;

FIG. 16 is an illustration of all the line segments that may be generated by the print mechanism shown in FIG. 9; and FIG. 17 is a diagrammatic view of the possible print-out orientations of the print mechanism shown in FIG. 9.

FIG. 18 is a diagrammatic view of the printing drum of the print mechanism.

DETAILED DESCRIPTION

The System

As can best be seen in FIG. 1, a programmable printer 19 of the present invention can be considered to consist of a number of functional blocks. The functional blocks communicate with each other and with external devices in a novel manner to produce printing of stored data, external data or a combination of stored data and external data or data information. The stored data is located in the programmable "read only" memory (PROM) 21 while the external data is supplied by any external device, including a programmable controller 33, connected to the external data lines 27.

More particularly if only external data is to be printed, a microprocessor 20 receives from a command interface 22 all the incoming command signals 23 by sequentially addressing command interface address lines 24. When a "LOAD BUFFER" command is received by microprocessor 20 from the command interface 22, the microprocessor generates a data address 25 that retrieves from a data interface 26, external data 27 via data lines 28. The external data is then decoded and stored as individual characters in an input buffer 29 of microprocessor 20. The type and number of characters stored in the input buffer is dependent on incoming command signals, 23, retrieved by microprocessor 20, from the command interface 22.

If no further commands are received by the microprocessor the stored external data remains in the input buffer 29. However, upon receiving a print command 88 (see FIG. 3) from the command interface or upon the input buffer containing twenty-one characters of data, the microprocessor initiates a print sequence. The print sequence processes the decoded data and timing, paper sensing and lid detection information 30 received from the command interface 22 in order to generate hammer drive information 32, print drive information 34, and output status information 36.

The hammer drive information is fed into a printer logic interface 38, where it is shaped and amplified to generate a hammer drive 40. The hammer drive 40 is transferred to a print mechanism 42, to activate a set of print hammers 44 (see FIG. 9). The print drive information 34 is transferred to a print drive and output status lines interface 46 where it is amplified and shaped to generate a print drive 48. The print drive 48 is then transferred to a paper advance solenoid 50 (see FIG. 9) of the print mechanism 42 in order to advance the paper before the print hammers 44 are activated. Similarly, the output status information 36 is fed into the print drive and output status lines interface 46, where this information is shaped, amplified and electrically isolated so as to generate output status lines 54 capable of driving output status indicators 55 and external devices such as lights, relays, solenoids, and industrial programmable controllers via output lines 59.

When stored data or stored data and external data in combination are desired to be printed, the microprocessor 20 must receive a stored data printing initiation command from the command interface 22. This particular command, as shown in FIG. 3, is labeled "START FORM" 31. Upon receiving this command, the microprocessor 20 initiates a sequence of steps in order to retrieve, decode, and process the desired stored data along with any desired external data, 27.

More particularly, the microprocessor generates output status information 36 that is transferred to an external device via output lines 59. This output status information tells the external device that the programmable printer 19 is in a stored data sequence by enabling the "FORM BUSY" output line 57.

The microprocessor 20, also tells the external device that the programmable printer does not want external data by enabling the "BUSY" output line 61.

The microprocessor 20 also addresses the data interface 26 in order to receive the address of the desired stored data 60 via data lines 28. This addressing data is received by the data interface 26 from an external source such as an industrial programmable controller 33.

After the microprocessor 20 decodes the received addressing data it generates a stored data address information 62 that is transferred to the stored data selector 64. The stored data selector 64 generates a stored data address 66 that energizes the desired stored data location in the programmable "read only" memory (PROM) 21.

The PROM 21 transfers the data in the particularly addressed data location to stored data lines 70 that connect to the data interface 26. The microprocessor 20 retrieves this stored data by properly addressing the data interface 26 via the data address lines 25. The data is then decoded and stored in the microprocessor's input buffer 29.

The stored data is decoded in an ASCII code in order to retrieve alphanumeric information, and to provide for an alternative data interface 26 for receiving external data in ASCII serial code. As can be seen in Table 1, certain ASCII characters represent commands; e.g. "END OF FORM", "BELL", "FORM FEED", "CARRIAGE-RETURN", and "ESCAPE". If an "ESCAPE" character is received, the microprocessor initiates the retrieval of external data by causing the "BUSY" output line 61 to become disabled. The disabled "BUSY" output line indicates to a connected external device; e.g., an industrial programmable printer 33, that external data has been requested by a stored data character. The external device then transfers external data to the data interface 26, and transfers commands 23 to the command interface 22, enabling the microprocessor 20 to properly interpret the external data.

Upon storing the decoded stored data if an "ESCAPE" character is not present, or upon storing the external data if an "escape" character is present, the microprocessor 20 increments the stored data address information 62 in order to retrieve the stored data in the next stored data location of PROM 21. This stored data will similarly be decoded by the microprocessor 20, generating another data character stored in the microprocessor's input buffer 29.

The above incrementation of the stored data address information 62 continues until either twenty-one characters are stored in the microprocessor's input buffer 29 or until a "CARRIAGE-RETURN" character is received from the stored data. In either event, the microprocessor 20 generates hammer drive information 32 and print drive information 34, which are transferred to the printer logic interface 38 and the print drive and output status lines interface 46, respectively. These respective interfaces generate hammer drive 40 and print drive 48 to properly energize the print hammer 44 and paper advance solenoid 50 of the print mechanism 42. Following the initiation of this print sequence, the incrementation of the stored data address information 62 resumes.

The above sequence of events will continue until an "END OF FORM" character is received from the PROM 21. This character causes the microprocessor 20 to terminate all the decoding and processing of stored data. The "FORM BUSY" 57 and "BUSY" 61 output lines will then be placed in a disabled state.

The printing of stored data, external data, or a combination of stored data and external data, will also be terminated by generation of a "CLEAR" signal 72. This signal and its inversion, generated by a clear interface 74, are transferred to the microprocessor 20. The microprocessor upon receipt of the clear and the inverted clear signal halts all decoding, retrieving and printing activity. The "CLEAR" signal 72 is the only command that the microprocessor 20 will accept when it is in a "BUSY" state; i.e., when the "BUSY" output line 61 is enabled.

The Method of Operation

As best seen in FIGS. 12A through 12E, the sequence of events that the programmable printer undertakes to print data may be represented as a series of processes, decisions and input and output operations (see FIG. 13).

More particularly, as best seen in FIGS. 1 and 12A, after initial power up, step 201, the programmable printer initiates an idle loop process, step 202. During the idle loop process, microprocessor 20 generates command interface address signals 24 that sequentially receive all the command timing, paper sensing and lid detection information 30 that the command interface 22 has received. During the idle loop, if the "MOTOR STAY-ON" command 80 (see FIG. 3) is in a true state, the printer starts and leaves on the printer motor 82 (see FIG. 9) no matter how long the time period before receipt of a dynamic command.

As best seen in FIG. 3, the dynamic commands consist of a "PRINT" command 88, "SPACE" command 90, "LOAD BUFFER" command 92, a "FORM FEED" command 94, and a "START FORM" command 31. A command is called a "dynamic" command when its detection by microprocessor 20 is achieved by sensing the command's change from a "high" electrical state to a "low" electrical state.

If a dynamic command has been received by microprocessor 20 in the last 30 seconds, the printer will leave the printer motor on, step 211. If the printer motor has not been energized prior to the receipt of a dynamic command, the receipt of such a command will start the printer motor, step 210.

The printer next determines if the retrieved dynamic command is a print initiation command, step 212. A print initiation command is a "LOAD BUFFER" command 92, a "PRINT" command 88 or a "START FORM" command 31.

If a print initiation command is present the printer determines whether the paper lid of the print mechanism 42 is open or closed, step 213. If the paper lid is open and thus indicating that paper is being attended to, the printer returns to the "START" position, step 202A. If the paper lid is closed, the printer allows the continuation of the print sequence and determines whether the printer is out of paper, step 214. If the printer is out of paper, the sequence returns to "START" since printing cannot be undertaken when the print mechanism 42 is out of paper.

If the print mechanism has paper and the paper lid is closed, the printer will proceed to clear all the print drive information 34 and hammer drive information 32 so that newly generated print drive and hammer information will not be misinterpreted by the print mechanism 42.

The printer then proceeds to generate print drive information 34 which will advance the paper to beyond the next fold in the paper, step 216. At this point the printer is ready to execute a sequence of steps that will print the desired data whether it be stored data or external data or a combination of stored data and external data.

If the print initiation command is for external data only, the printer proceeds to read the "DATA SELECT" lines 110, the "ORIENTATION" line 112, and the "BCD/ASCII" line 114 (see FIG. 3). The "DATA SELECT" lines 110 tell the microprocessor 20 how many characters of external data are to be received from the data interface 26. As can best be seen in FIG. 15, the "DATA SELECT" lines, depending on their states, will cause the microprocessor 20 to interpret the external data as either 1, 2, 3, or 4 BCD characters or 1 or 2 ASCII characters.

As seen in FIG. 12B, the printer proceeds to decode the retrieved external data in accordance with the state of the "BCD/ASCII" line, step 220. If the "BCD/ASCII" line 114 is in the true state; i.e., the 1 state, the external data is interpreted as binary coded decimal (BCD) information; i.e., numerical information. Similarly, if the "BCD/ASCII" line is in the false state; i.e., the zero state, the external data is interpreted as alphanumeric (ASCII) information.

Step 221 is present so as to determine if the external data is part of a stored data print sequence, in which case the printer returns to the stored data for further information. If however, as in the present case, the external data is to be printed without any internal stored data, the microprocessor 20 determines if twenty-one characters of information have been received by the microprocessor's input buffer 29, step 222.

If twenty-one characters have not been received, and if a "PRINT" command 88 has also not been received, the printer returns to "RE-START", step 216A, where the printer re-initiates the sequence of steps of receive external data or stored data.

If twenty-one characters of data have not been received, but a "PRINT" command 88 has been received, the printer proceeds to initiate a sequence of steps to print the received data characters. Similarly, if twenty-one characters of data have been received, the printer will initiate a print sequence regardless of whether a "PRINT" command has been received.

When in the print sequence, the microprocessor 20 first retrieves timing information from the command interface 22, step 224. As is best seen in FIG. 9, this timing information comprises a "RESET HEAD" signal 124 and a "TIMING HEAD" signal 126. The "RESET HEAD" signal causes the print operation to be synchronized with the revolutions of the print drum 128 so that the print hammers 44 will only be activated after the print drum 128 has returned to a starting position. The "TIMING HEAD" signal is used by the microprocessor 20 to cause the print hammers 44 to be activated at the proper time to cause the hammers to engage with the print drum line segments 130.

The microprocessor 20 next determines the desired orientation that the print-out 132 (see FIG. 16) is to have. This information is received on the "ORIENTATION" command of the command interface 22. The microprocessor 20 is able to generate hammer drive information 32, in accordance with the true or false state of the "ORIENTATION" command, so as to produce either upright or inverted printout (see FIG. 16).

Once the microprocessor 20 determines the orientation of the print-out 132, it processes the decoded data to generate hammer drive information 34. This hammer drive information is timed so as to be in synchronization with the print drum 128 and the print drum line segments 130.

More particularly the hammer drive information 32 must cause the print hammers 44 to strike the print drum line segments 130 in such a manner that the desired character is generated. As best seen in FIGS. 9 and 18 the print mechanism comprises twenty-one hammers that generate up to twenty-one characters per line of printout. The print mechanism 42 utilizes a Seiko Model AN-101S printer. This printer is capable of generating alphanumeric characters by striking print drum line segments 130 in a particular manner for each character. As best seen in FIG. 17 the line segments form a "star-burst" pattern. As best seen in FIG. 18, each of the line segments shown in FIG. 17 are evenly spaced about the circumference of the print drum 128 for each of the twenty-one character positions. Thus in order to generate a "7", line segments 136, 140 and 142 would be struck as they appeared under a particular print hammer. Similarly a letter "B" would be generated by striking line segments 136, 140, 142, 146, 148, 150, 152, and 154 when those line segments appeared under the print hammer 44. Thus up to twenty-one alphanumeric characters may be printed per line of print-out 132.

The hammer drive information 32 must therefor energize the print hammers 44 at the proper time for each desired character to be generated during each line of printout.

The microprocessor also generates print drive information 34 to cause the advance of the print paper each time a line of printout is generated. The print drive information 44 causes the print drive 48 to be generated by the print drive and output status interface 46.

The microprocessor 20 also generates output status informaion 36 which causes output lines 59 to be energized via the print drive and output status lines interface 46. This information is electrically isolated from the programmable printer 19 and may be used to drive relays, solenoids or other external devices such as industrial programmable controllers 33, including the Modicon Model 084 and 184 Programmable Controllers. As best seen in FIG. 12C if the programmable printer 19 is not executing a stored data print initiation command, it returns to "START", step 202A, after printing external data. The printer then proceeds to retrieve, decode, and process additional data upon the proper commands being received by the microprocessor 20 via the command interface 22.

If the printing of stored data; i.e., data stored in the programmable "read only" memory (PROM) 21 is desired the programmable printer 19 follows the same sequence of steps as for the external data printing as shown in FIGS. 12A and 12B up to and including step 227.

As shown in FIG. 3 the command that initiates the print sequence to generate printout of stored data is the "START FORM" command 31. As shown in FIGS. 1 and 12B, upon receipt of such a command the programmable printer 19 enables output lines "FORM BUSY" 57 and "BUSY" 61 that tell external data source devices, such as an industrial programmable controller 33, that stored data is to be printed, step 229.

The microprocessor 20 then proceeds to retrieve the address of the desired stored data. The microprocessor obtains this desired address by generating a data address 25 which retrieves from the data interface 26 the address of the desired stored data. This address is interpreted by the microprocessor 20 to be a decimal number from zero to 99 corresponding to one of the 100 possible externally addressable stored data locations in the programmable "read only" memory 21.

As best seen in FIGS. 1 and 6, the microprocessor then produces a stored data address information 62 which provides the information needed by the stored data selector 64 to generate a stored data address 66. The stored data address consists of a chip selector output 157 that locates the memory chip 98 of the PROM 68 in which the stored data is located, as well as a chip address 158 that locates the desired stored data in the energized chip.

This desired stored data is then produced on the stored data lines 70 (See FIGS. 1 and 6) and fed into the data interface 26. The microprocessor 20 retrieves this stored data from the data interface by generating the proper data address 25 to the data interface 26.

The microprocessor 20 proceeds to decode the stored data in order to obtain the particular ASCII character that the eight lines of stored data 70 represent. All stored data in the programmable "read only" memory 21 is in the ASCII code so as to enable the generation of alphanumeric characters. As seen in Table 1, an ASCII character may be a command character which causes the microprocessor to initiate or terminate a sequence of steps.

TABLE 1

| | | | ASCII CODE | | |
|---|---|---|---|---|---|
| Character | 8-Bit Code (in octal) | Character | 8-Bit Code (in octal) | Character | 8-Bit Code (in octal) |
| A | 301 | 1 | 261 | = | 275 |
| B | 302 | 2 | 262 | > | 276 |
| C | 303 | 3 | 263 | ? | 277 |
| D | 304 | 4 | 264 | @ | 300 |
| E | 305 | 5 | 265 | \| | 333 |
| F | 306 | 6 | 266 | \ | 334 |
| G | 307 | 7 | 267 | \| | 335 |
| H | 310 | 8 | 270 | ↑ | 336 |
| I | 311 | 9 | 271 | ← | 337 |
| J | 312 | | | | |
| K | 313 | ! | 241 | | |
| L | 314 | " | 242 | | |
| M | 315 | # | 243 | | |
| N | 316 | $ | 244 | END OF FORM | 204 |
| O | 317 | % | 245 | BELL | 207 |
| P | 320 | & | 246 | FORM FEED | 214 |
| Q | 321 | ' | 247 | CARRIAGE | 215 |
| R | 322 | ( | 250 | RETURN | |
| S | 323 | ) | 251 | ESCAPE | 233 |
| T | 324 | * | 252 | SPACE | 240 |
| U | 325 | + | 253 | | |
| V | 326 | . | 254 | | |
| W | 327 | – | 255 | | |
| X | 330 | . | 256 | | |
| Y | 331 | / | 257 | | |
| Z | 332 | : | 272 | | |
| | | ; | 273 | | |
| 0 | 260 | < | 274 | | |

More particularly if the stored data retrieved and decoded by the microprocessor is an "ESCAPE" character, denoted by octal code 233 (see Table 1), the programmable printer 19 proceeds to retrieve external data, step 237 (see FIG. 12D). If an "ESCAPE" character is not present, the printer continues to interpret the stored data character.

As best seen in FIGS. 1 and 12D, if an "ESCAPE" character is present, the microprocessor 20 disables its "BUSY" output line 61, and thus tells a connected external device such as an industrial programmable controller 33 that external data is required.

As seen in FIG. 11 with respect to a Modicon Model 184 Programmable Controller, the disabling of the printer's "BUSY" output line 61 de-activates Coil No. 396 that is connected to this output line. The de-activation of Coil No. 396 causes BUSY RELAY NO. 1092 to open thereby allowing the programmable controller to supply external data via use of the Data Transfer Function 100 as described in "Modicon Model 184" 1973 brochure; Modicon Corporation, Andover, Massachusetts. Upon receipt of such a signal the Modicon Model 184 Programmable Controller generates BCD data (see Table 2) on Bit numbers 4, 5, 6 and 7 of output register No. XXX. This BCD data is transferred to the data interface 26 where the microprocessor 20 is able to retrieve the data by properly addressing the data interface.

TABLE 2

| | BCD CODE | | | |
|---|---|---|---|---|
| Decimal Digits | 8 $b_3$ | 4 $b_2$ | 2 $b_1$ | 1 $b_0$ |
| 0 | 0 | 0 | 0 | 0 |
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |
| 9 | 1 | 0 | 0 | 1 |

Similarly, as seen in FIG. 10, an external device can generate external data on its Register No. 0, Bit Nos. 0-3, 6-9, 12-15, and 18-21, when the "BUSY" line is disabled on Register No. 1, Bit No. 6. Between the time that the microprocessor disables the "BUSY" output line 61 and the generation by an external device of the appropriate external data 27 (see FIG. 1), the microprocessor waits for the external device to generate an external data printing initiation command, step 238. For the retrieval of external data a "LOAD BUFFER" command 92 is generated (see FIGS. 10 and 11).

The sequence of events in retrieving the external data, including the receipt of the "LOAD BUFFER" command proceeds in an analogous fashion to the retrieval of "external data only". More particularly the sequence of events returns to and proceeds from the "EX-START" position, step 217A of the flow chart (FIG. 12B).

If the decoded stored data at Step 235 is not an "ESCAPE" character, the microprocessor 20 determines whether a "LINE FEED" is desired, Step 236. A "LINE FEED" causes the paper advance solenoid 50 (see FIG. 9) to energize causing the paper to unroll an amount equal to one line of printout. As shown in Steps 240 and 240A the "LINE FEED" command generates twenty-one "SPACE" characters that are placed in input buffer 29 of microprocessor 20. A "SPACE" command is a character that when processed by the microprocessor generates no hammer activation. Thus when twenty-one such characters are in the input buffer 29 a print sequence, Step 222A, is initiated where no printout occurs. As shown in FIG. 14C upon completion of the print sequence the microprocessor returns to "S START", Step 230A, to continue the retrieval of additional stored data.

As seen in FIG. 12D, if the retrieved stored data is not an "ESCAPE" character nor a "LINE FEED" character the microprocessor determines whether twenty-one characters of data have been received, Step 239. If twenty-one characters of data are in the microprocessor's input buffer 29 or if a "CARRIAGE RETURN" character is present in the last decoded stored data character, a print sequence is initiated, Step 222A. This print sequence is identical to the print sequence for the "external data only" situation.

If neither twenty-one characters of data have been received by input buffer 29 nor a "CARRIAGE RETURN" character has been decoded from the stored data, the flow chart proceeds to Step 242 where it is determined whether the decoded stored data character is an "END OF FORM" character. If the last stored data character in input buffer 29 is not an "END OF FORM" character the printer will continue to retrieve, decode and process more data by incrementing the stored data address, Step 243, and returning to "S START", Step 230A. If the last character of stored data in the input buffer 29 is an "END OF FORM" character, the microprocessor will conclude that the stored data information retrieval should be terminated and that external devices, such as industrial programmable controllers 33 (see FIG. 1) should be told that the programmable printer is no longer in the process of printing stored data with or without external data. After an "END OF FORM" character is retrieved, the printer disables the "FORM BUSY" 61 and "BUSY" 57 output lines and returns to the "START" position, Step 202A, where it is ready to receive a command to initiate "external data only" printing or "stored data with or without external data" printing.

Thus as shown in FIGS. 12A through FIG. 12E, once the programmable printer 19 is powered up, Step 201, it functionally proceeds through a sequence of events where it receives command information to perform the retrieval, decoding, processing, and transferring of data - whether it be stored data within the programmable printer or external data - to a print mechanism that is capable of responding to the generated output information so as to yield a desired print-out 132.

Examples

An example of the programmable printer's ability to print stored data is the following:

LIMIT SWITCH NO. 3
FAILED TO SWITCH
CHECK THE FOLLOWING:
 1. TOOL ALIGNMENT
 2. CASTING MOUNT
 3. LIMIT SWITCH
 MALFUNCTION.

In order to print the above message, it would be necessary to have each line of desired printout to be stored in sequential memory locations of the programmable "read only" memory 21 (see FIG. 1). It would also be necessary to set the stored data address lines 60 to a binary coded decimal number that is related to this particular message. If, for instance, the first line of the above message corresponded to the 10th externally addressable stored data location of the programmable "read only" memory, it would be necessary to set stored data address lines 0, 1, 2, 3 to a BCD "0" while setting stored data address lines 4, 5, 6, and 7 to a BCD "1".

Following this operation, a "START FORM" command would be necessary on command interface 22. If the last line of the above message contained an "END OF FORM" ASCII character, the printing of the above message would terminate after the printing of "MALFUNCTION". The "END OF FORM" character as well as the "CARRIAGE-RETURN" ASCII characters following each line of printout (to initiate the printing of each line), would be stored in the programmable "read only" memory 21.

If only the external data number "4372" is desired to be printed, the following operations are necessary (see FIG. 3):

1. enable the BCD/ASCII line 114 on command interface 22;

2. Set BCD digits corresponding to decimal numbers 4, 3, 7, 2 on the sixteen external data lines 27, in the following order:
 a. a BCD "4" on external data lines 0, 1, 2 and 3;
 b. a BCD digit "3" on external data lines 4, 5, 6, and 7;
 c. a BCD digit "7" on external data lines 8, 9, 10 and 11;
 d. a BCD digit "2" on external data lines 12, 13, 14, and 15;
3. Enable "DATA SELECT 0" and "DATA SELECT 1" lines 110;
4. Give a "LOAD BUFFER" command 92; and
5. Give a "PRINT" command 88.

Similarly, if an external data letter "X" is desired to be printed, the following operations are necessary:
1. Disable the BCD/ASCII line 114;
2. Set an ASCII letter "X" on external data lines 27, numbers 8, 9, 10, 11, 12, 13, 14, and 15;
3. Disable both "DATA SELECT 0" and "DATA SELECT 1" lines 110;
4. Give a "LOAD BUFFER" command 92; and
5. Give a "PRINT" command 88.

Finally, an example of a stored data message requiring external data will be given. A typical message might be:

OUTPUT OF MACHINE S
DATA SS-SS-SS
SHIPPED S
PARTS COUNT S S S;

where "S" denotes the retrieval of external data.

To print this message it is again necessary to set the stored data address lines of the data interface 26 to correspond to the externally addressable stored data location of the first line of printout. Second, a "START FORM" command 31 is given. At this point the "FORM BUSY" and "BUSY" output signals are enabled. At the "S" characters in each line of printout the "BUSY" output line 61 becomes disabled allowing variable data to be inserted on external data lines 27. This insertion of external data is similar to the displaying of external data as given in the second example. Thus,
1. Enable BCD/ASCII line 114 so that a BCD character can be decoded;
2. Set four bits of data on external data lines numbers 12, 13, 14, and 15 corresponding to the desired decimal number of the machine;
3. Disable "DATA SELECT 0" and "DATA SELECT 1" lines 110; and
4. Give a "LOAD BUFFER" command 92.

At each additional point in the message where an "S" character appears the "BUSY" output signal 61 is disabled and external data is inserted. At each such point the "BCD/ASCII", "DATA SELECT 0" and "DATA SELECT 1", and the external data lines have to be set to give the proper data in the form desired before the "LOAD BUFFER" command is given.

The Functional Blocks

The functional blocks of the present invention primarily consist of integrated circuit chips that perform various logic functions. In addition some of the functional blocks include other solid state components such as diodes, transistors, as well as conventional circuit components, such as resistors, capacitors and transformers.

As best seen in FIG. 2, microprocessor 20 consists of a group of integrated circuit chips which, in combination, perform as a digital computer.

More particularly, microprocessor 20 incorporates five programmable "read only" memories 156 wherein a specially formed computer program is stored that enables the microprocessor to decode and process all incoming command and data information as well as providing for the generation of output information including the hammer drive information 32, print drive information 34, output status information 36, stored data address information 62, data address information 25, and command interface address 24. The PROM's are ultraviolet "read only" memories manufactured by Intel Corporation, Part No. 1702A. As shown in FIG. 2, each PROM contains eight address lines and eight output lines, wherein eight bits of program information may be obtained by properly addressing the PROM. A chip select line 159 is included to activate the PROM containing the desired program information.

Microprocessor 20 also incorporates an address interface 160 (Intel Corporation, Part No. 4008) for addressing the PROM chips. The address information to address interface 160 comes from the output of the central processing unit (Intel Corporation, Part. No. 4004) 162. The central processing unit (CPU) is designed to be used with address interface 160, programmable "read only" memories (PROM) 156, central processing unit interface 164, random access memories (RAM) 166, chip selector latch 168, input buffers 29, and output latch 170 so as to provide a digital minicomputer.

The CPU 162 consists of a 4 bit adder, a 64 bit (16 × 4) index register, a 48 bit (4 × 12) program counter and stack, an address incrementer, an 8 bit instruction register and decoder, and control logic. Information flows from the CPU and the other microprocessor chips through a four line data bus 172. In a typical machine cycle the CPU 162 sends a synchronization signal (SYNC) 174 to the PROM's 156 and the RAM's 166. The CPU 162 then transmits 12 bits of PROM address information on data bus 7 by using three clock cycles. The PROM address information is then incremented by one and stored in the program counter. The selected PROM 162 sends back eight bits of instruction data during the following two clock cycles. This information is stored in an OPR register and an OPA register. The next three clock cycles are then used to execute the instruction transferred by the PROM 156. The instruction set of the CPU 162 is contained in Tables 3A, 3B, and 3C.

The PROM's 156 are controlled by a command PROM control signal (CM-PROM) 180 while the RAM's are controlled by RAM control signals (CM-RAM) 182.

The RAM's 166 (Intel Corporation, Part. No. 4002) allow the microprocessor to communicate with peripheral devices. As can be seen in FIGS. 1, 2, 3, 4, 5, 7 and 8, command interface address 24, hammer drive information 32, print drive information 34, output status information 36 and stored data address information 62 are totally or partially generated by RAM's 166. Other RAM's are used by microprocessor 20 for the storage of various computational information.

The central processing unit interface 164 provides the proper interfacing between the PROM's 156 and the central processing unit 162.

The chip selector 168 provides for the activation of the selected PROM 156 upon retrieving this information from the address interface 160.

TABLE #3-A

MICROPROCESSOR INSTRUCTION SET (Those instructions preceded by an asterisk (*) are 2 word instructions that occupy 2 successive locations in ROM)

Machine
Instructions:

| Mnemonic | Binary Code (5) | | Description of Operation |
|---|---|---|---|
| NOP | 0 0 0 0 | 0 0 0 0 | No operation |
| *JCN | 0 0 0 1<br>$A_2A_2A_2A_2$ | $C_1C_2C_3C_4$<br>$A_1^1A_1^2A_1^3A_1^4$ | Jump to ROM address $A_2A_2A_2A_2$, $A_1A_1A_1A1$ (within the same ROM that contains this JCN instruction) if condition $C_1C_2C_3C_4$ (1) is true, otherwise skip (go to the next instruction in sequence). |
| *FIM | 0 0 1 0<br>$D_2D_2D_2D_2$ | R R R 0<br>$D_1D_1D_1D_1$ | Fetch immediate (direct) from ROM Data $D_2$, $D_1$ to index register pair location RRR.<br>(2) |
| SRC | 0 0 1 0 | R R R 1 | Send register control. Send the address (contents of index register pair RRR) to ROM and RAM at $X_2$ and $X_3$ time in the Instruction Cycle. |
| FIN | 0 0 1 1 | R R R 0 | Fetch indirect from ROM. Send contents of index register pair location 0 out as an address. Data fetched is placed into register pair location RRR |

-continued

| | | | |
|---|---|---|---|
| JIN | 0 0 1 1 | R R R 1 | Jump indirect. Send contents of register pair RRR out as an address at $A_1$ and $A_2$ time in the Instruction Cycle. |
| *JUN | 0 1 0 0<br>$A_2A_2A_2A_2$ | $A_3A_3A_3A_3$<br>$A_1A_1A_1A_1$ | Jump unconditional to ROM address $A_3$, $A_2$, $A_1$. |
| *JMS | 0 1 0 1<br>$A_2A_2A_2A_2$ | $A_3A_3A_3A_3$<br>$A_1A_1A_1A_1$ | Jump to subroutine ROM address $A_3, A_2, A_1$, save old address. (Up 1 level in stack) |
| INC | 0 1 1 0 | R R R R | Increment contents of register RRRR(3) |
| *ISZ | 0 1 1 1<br>$A_2A_2A_2A_2$ | R R R R<br>$A_1A_1A_1A_1$ | Increment contents of register RRRR. Go to ROM address $A_2, A_1$ (within the same ROM that contains the ISZ instruction) if result ≠0. Otherwise skip (go to next instruction in sequence.) |
| ADD | 1 0 0 0 | R R R R | Add contents of register RRRR to accumulator with carry. |
| SUB | 1 0 0 1 | R R R R | Subtract contents of register RRRR to accumulator with borrow. |
| LD | 1 0 1 0 | R R R R | Load contents of register RRRR to accumulator |
| XCH | 1 0 1 1 | R R R R | Exchange contents of index register RRRR and accumulator. |
| BBL | 1 1 0 0 | D D D D | Branch back (down 1 level in stack) and load data DDDD to accumulator |
| LDM | 1 1 0 1 | D D D D | Load data DDDD to accumulator |

TABLE #3-B

INPUT/OUTPUT AND RAM INSTRUCTIONS (The RAM's and ROM's operated on in the I/O and RAM instructions have been previously selected by the last SRC instruction executed.)

| Mnemonic | Binary Code (5) | Description of Operation |
|---|---|---|
| WRM | 1 1 1 0  0 0 0 0 | Write the contents of the accumulator into the previously selected RAM main memory character. |
| WMP | 1 1 1 0  0 0 0 1 | Write the contents of the accumulator into the previously selected RAM output port. (Output Lines) |
| WRR | 1 1 1 0  0 0 1 0 | Write the contents of the accumulator into the previously selected ROM output port. (I/O Lines) |
| WPM | 1 1 1 0  0 0 1 1 | Write the contents of the accumulator into the previously selected half byte of read/write program memory (for use with 4008/4009 only). |
| WR0[4] | 1 1 1 0  0 1 0 0 | Write the contents of the accumulator into the previously selected RAM status character 0. |
| WR1[4] | 1 1 1 0  0 1 0 1 | Write the contents of the accumulator into the previously selected RAM status character 1. |

-continued

| Mnemonic | Binary Code | | Description of Operation |
|---|---|---|---|
| WR2[4] | 1 1 1 0 | 0 1 1 0 | Write the contents of the accumulator into the previously selected RAM status character 2. |
| WR3[4] | 1 1 1 0 | 0 1 1 1 | Write the contents of the accumulator into the previously selected RAM status character 3. |
| SBM | 1 1 1 0 | 1 0 0 0 | Subtract the previously selected RAM main memory character from accumulator with borrow. |
| RDM | 1 1 1 0 | 1 0 0 1 | Read the previously selected RAM main memory character into the accumulator. |
| RDR | 1 1 1 0 | 1 0 1 0 | Read the contents of the previously selected ROM input port into the accumulator (I/O Lines) |
| ADM | 1 1 1 0 | 1 0 1 1 | Add the previously selected RAM main memory character to accumulator with carry. |
| RD0[4] | 1 1 1 0 | 1 1 0 0 | Read the previously selected RAM status character 0 into accumulator |
| RD1[4] | 1 1 1 0 | 1 1 0 1 | Read the previously selected RAM status character 1 into accumulator. |
| RD2[4] | 1 1 1 0 | 1 1 1 0 | Read the previously selected RAM status character 2 into accumulator. |
| RD3[4] | 1 1 1 0 | 1 1 1 1 | Read the previously selected RAM status character 3 into accumulator. |

TABLE #3-C

ACCUMULATOR GROUP INSTRUCTIONS

| Mnemonic | Binary Code (5) | | Description of Operation |
|---|---|---|---|
| CLB | 1 1 1 1 | 0 0 0 0 | Clear both (Accumulator and carry) |
| CLC | 1 1 1 1 | 0 0 0 1 | Clear carry. |
| IAC | 1 1 1 1 | 0 0 1 0 | Increment accumulator. |
| CMC | 1 1 1 1 | 0 0 1 1 | Complement carry. |
| CMA | 1 1 1 1 | 0 1 0 0 | Complement accumulator. |
| RAL | 1 1 1 1 | 0 1 0 1 | Rotate left (Accumulator and carry) |
| RAR | 1 1 1 1 | 0 1 1 0 | Rotate right (Accumulator and carry) |
| TCC | 1 1 1 1 | 0 1 1 1 | Transmit carry to accumulator and clear carry. |
| DAC | 1 1 1 1 | 1 0 0 0 | Decrement accumulator. |
| TCS | 1 1 1 1 | 1 0 0 1 | Transfer carry subtract and clear carry. |
| STC | 1 1 1 1 | 1 0 1 0 | Set carry. |
| DAA | 1 1 1 1 | 1 0 1 1 | Decimal adjust accumulator |

-continued

```
KBP    1 1 1 1    1 1 0 0    Keyboard process. Converts the contents
                              of the accumulator from a one out of
                              four code to a binary code.

DCL    1 1 1 1    1 1 0 1    Designate command line.
```

- - - - - - - - - - - - - - - - - - - - -

NOTES (1) The condition code is assigned as follows:

$C_1 = 1$ Invert jump condition $C_1 = 0$ Not invert jump condition $C_2 = 1$ Jump if accumulator is zero $C_3 = 1$ Jump if carry/link is a 1

$C_4 = 1$ Jump if test signal is a 0

(2) RRR is the address of 1 of 8 index register pairs in the CPU.

(3) RRRR is the address of 1 of 16 index registers in the CPU.

(4) Each RAM chip has 4 registers, each with twenty 4-bit characters subdivided into 16 main memory characters and 4 status characters. Chip number, RAM register and main memory character are addressed by an SRC instruction. For the selected chip and register, however, status character locations are selected by the instruction code (OPA).

(5) In the program listing, the instructions are in the corresponding octal code.

The input buffers 29 provide for the proper electrical isolation of incoming data information 28 (see FIG. 1).

The output latch 170 provides the electrical isolation of microprocessor 20 from stored data selector 64 and data interface 26.

The computer program that microprocessor 20 utilizes in order to retrieve, decode and process stored data, external data, command timing, paper sensing and lid detection information, so as to produce the required output information to cause the programmable printer to print the desired data and other output information is reproduced in Table No. 4. As can best be seen in FIG. 14A through J, the flow chart of the computer program comprises a multiplicity of operations including initial power up (FIG. 14A), command detection (FIG. 14B), retrieval of exteral data (FIG. 14C), paper condition monitoring and paper feeding (FIG. 14D), timing synchronization of the output information (FIG. 14E), line feeding (FIG. 14F), paper and lid sensing (FIG. 14G), retrieving timing information from the print mechanism 42 (FIG. 14H), and detection of command information (FIG. 14I). It is thus apparent that the microprocessor 20 performs substantially all the information manipulation of the programmable printer, as discussed earlier in the "Method of Operation".

TABLE #4

MICROPROCESSOR COMPUTER PROGRAM

```
001                SUBJOB REGISTER DEFINITIONS
002                /
003                /REGISTER DEFINITION
004       000        R0=0   /SCRATCH
005       001        R1=1   /SCRATCH
```

-continued

| | | | |
|---|---|---|---|
| 006 | 002 | R2=2   /SCRATCH | |
| 007 | 003 | R3=3   /SCRATCH | |
| 008 | 004 | FORMC=4 | /LO BIT=FORM INPUT, |
| 009 | | | /HI BIT=FORM IN PROGRESS |
| 010 | 005 | PHASE=5 | /PHASE COUNTER |
| 011 | 006 | R6=6 | /SCRATCH |
| 012 | 007 | R7=7 | /SCRATCH |
| 013 | 010 | R10=10 | /SCRATCH |
| 014 | 011 | CBPNTR=11 | /CHARACTER BUFFER POINTER |
| 015 | 012 | PSTAT=12 | /PRINTER STATUS |
| 016 | | | /0=NOT BUSY |
| 017 | | | /1=PRINT LINE |
| 018 | | | /2=LINE JUST PRINTED-DO LF |
| 019 | | | /3=FORM FEEDING |
| 020 | 013 | SEGCTR=13 | /SEGMENT COUNTER |
| 021 | 014 | IBPNT1=14 | /INPUT BUFFER COUNTER |
| 022 | 015 | IBPNT2=15 | /INPUT BUFFER POINTER |
| 023 | 016 | CHAR1=16 | /CHARACTER BEING PROCESSED |
| 024 | 017 | CHAR2=17 | /CHARACTER BEING PROCESSED |
| 001 | | SUBJOB REGISTER DEFINITIONS | |
| 002 | | / | |
| 003 | | /REGISTER DEFINITION | |
| 004 | 000 | R0=0   /SCRATCH | |
| 005 | 001 | R1=1   /SCRATCH | |
| 006 | 002 | R2=2   /SCRATCH | |
| 007 | 003 | R3=3   /SCRATCH | |
| 008 | 004 | FORMC=4 | /LO BIT=FORM INPUT, |
| 009 | | | /HI BIT=FORM IN PROGRESS |
| 010 | 005 | PHASE=5 | /PHASE COUNTER |
| 011 | 006 | R6=6 | /SCRATCH |
| 012 | 007 | R7=7 | /SCRATCH |
| 013 | 010 | R10=10 | /SCRATCH |
| 014 | 011 | CBPNTR=11 | /CHARACTER BUFFER POINTER |
| 015 | 012 | PSTAT=12 | /PRINTER STATUS |
| 016 | | | /0=NOT BUSY |
| 017 | | | /1=PRINT LINE |
| 018 | | | /2=LINE JUST PRINTED-DO LF |
| 019 | | | /3=FORM FEEDING |
| 020 | 013 | SEGCTR=13 | /SEGMENT COUNTER |
| 021 | 014 | IBPNT1=14 | /INPUT BUFFER COUNTER |
| 022 | 015 | IBPNT2=15 | /INPUT BUFFER POINTER |
| 023 | 016 | CHAR1=16 | /CHARACTER BEING PROCESSED |
| 024 | 017 | CHAR2=17 | /CHARACTER BEING PROCESSED |

NOTE: Some instructions are two word instructions

REGISTER DEFINITIONS

Program Address | Instr. (Octal) | | | | |
|---|---|---|---|---|---|
| 001 | | / | | | |
| 002 | | / | | | |
| 003 | | / | | | |
| 004 | | SUBJOB INITIALIZATION | | | |
| 005 | | | | | |
| 006 | 0000 | *0 | | | |
| 007 | | / | | | |
| 008 | | / | | | |
| 009 | 0000 000 | | NOP | | |
| 010 | 0001 124 | ILOOP, | JMS | INITAL | /CLEAR ALL OUTPUT PORTS |
|     | 0002 226 | | | | |
| 011 | 0003 322 | | LDM 2 | | /TURN "DC ON" OFF |
| 012 | 0004 122 | | JMS OUTHI | | |
|     | 0005 102 | | | | |
| 013 | | / | | | |
| 014 | 0006 321 | | LDM | 1 | /TURN ADVANCE OFF |
| 015 | 0007 122 | | JMS | OUTHI | /1Y3,C0,B1 |
|     | 0010 102 | | | | |
| 016 | | / | | | |
| 017 | 0011 124 | | JMS | LDSETB | /GO PRESET LINE COUNT AND |
|     | 0012 173 | | | | |
| 018 | | | | | /HOLE COUNTER |
| 019 | | / | | | |
| 020 | | / | | | |

-continued

| | | | | | |
|---|---|---|---|---|---|
| 021 | 0013 331 | | LDM | 11 | /RESET SERIAL RECEIVER |
| 022 | 0014 122 | | JMS | OUTHI | /1Y1,C2,B1 |
| | 0015 102 | | | | |
| 023 | 0016 331 | | LDM | 11 | |
| 024 | 0017 124 | | JMS | OUTLO | |
| | 0020 206 | | | | |
| 025 | 0021 320 | RESYNC, | LDM | 0 | /SELECT RESET PULSE ON MUX |
| 026 | 0022 341 | | WMP | | |
| 027 | 0023 021 | TLOOP1, | JCN | TLOOP1;TEST | /HANG UNTIL RESET |
| | 0024 023 | | | | |
| 028 | 0025 031 | TLOOP2, | JCN | TLOOP2;NOT TEST | /WAIT FOR RESET END |
| | 0026 025 | | | | |
| 029 | 0027 050 | | FIM 14;R10 | | /SET UP 320 MS WAIT |
| | 0030 014 | | | | |
| 030 | 0031 124 | TLOOP3, | JMS WAIT80 | | /WAIT LOOP = MIN TIME |
| | 0032 160 | | | | |
| 031 | 0033 171 | | ISZ | TLOOP3;CBPNTR | /TO NEXT RESET PULSE |
| | 0034 031 | | | | |
| 032 | 0035 042 | | FIM 0!20 7;R2 | | |
| | 0036 007 | | | | |
| 033 | 0037 031 | TLOOP4, | JCN | TLOOP5;NOT TEST | /JUMP IF RESET PRESENT |
| | 0040 051 | | | | |
| 034 | 0041 160 | | ISZ | TLOOP4;R0 | /NO RESET PULSE;CHECK |
| | 0042 037 | | | | |

INITIALIZATION

| | | | | | |
|---|---|---|---|---|---|
| 035 | 0043 161 | | ISZ | TLOOP4;R1 | /FOR MAX TIME |
| | 0044 037 | | | | |
| 036 | 0045 163 | | ISZ | TLOOP4;R3 | |
| | 0046 037 | | | | |
| 037 | 0047 100 | | JUN | TLOOP1 | |
| | 0050 023 | | | | |
| 038 | 0051 031 | TLOOP5, | JCN TLOOP5;NOT TEST | | /WAIT FOR END OF RESET |
| | 0052 051 | | | | |
| 039 | 0053 122 | | JMS TEST1 | | /SELECT TIMING PULSE |
| | 0054 163 | | | | |
| 040 | 0055 021 | TLOOP7, | JCN | TLOOP7;TEST | /WAIT FOR TP PULSE BEGIN |
| | 0056 055 | | | | |
| 041 | | / | | | |
| 042 | 0057 334 | | LDM | 14 | /PRESET TIMEOUT |
| 043 | 0060 344 | | WRO | | |
| 044 | | / | | | |
| 045 | 0061 322 | | LDM 2 | | /TURN "DC ON" ON |
| 046 | 0062 124 | | JMS OUTLO | | |
| | 0063 206 | | | | |
| 047 | | SUBJOB | | | |

| | | | | | |
|---|---|---|---|---|---|
| 001 | | SUBJOB MAIN CYCLE PROCESSING | | | |
| 002 | | / | | | |
| 003 | | / | | | |
| 004 | 0064 122 | CYCLE, | JMS | TEST1 | /SELECT TIMING INPUT |
| | 0065 163 | | | | |
| 005 | 0066 031 | CYCLE1, | JCN | CYCLE1;NOT TEST | /WAIT FOR TP END |
| | 0067 066 | | | | |
| 006 | | / | | | |
| 007 | 0070 334 | | LDM | 14 | /TEST FOR INPUT BUFFER FULL |
| 008 | 0071 214 | | ADD | IBPNT1 | |
| 009 | 0072 024 | | JCN | LINFUL;ZERO | /JUMP IF YES |
| | 0073 267 | | | | |
| 010 | | / | | | |
| 011 | 0074 244 | INTEST, | LD | FORMC | /TEST FOR FORM INPUT |
| 012 | 0075 366 | | RAR | | |
| 013 | 0076 022 | | JCN | FPROCJ;CARRY | /JUMP IF YES |
| | 0077 366 | | | | |
| 014 | | / | | | |
| 015 | 0100 251 | RECHEK, | LD | CBPNTR | /TEST FOR CHAR BUFFER EMPTY |
| 016 | 0101 034 | | JCN | EXPROC;NOT ZERO | /JUMP IF NO |
| | 0102 223 | | | | |
| 017 | | / | | | |
| 018 | | / | | | |
| 019 | | /TEST COMMAND LINE INPUTS & CHECK FOR EDGE DETECTION | | | |
| 020 | | / | | | |
| 021 | | / | | | |

-continued

```
022                                    /FLUSH 'SOMETHING' ON COMMAND
023 0103 267            XCH R7         /LINE 'FLAG'
024 0104 322            LDM 2          /MUX ADDRESS FOR PRINT COMMAND
025 0105 040            FIM 350;R0     /ADDRESS OF TRANSFER VECTOR
    0106 350
026 0107 042            FIM 4!20 0;R2  /SET FOR R1,R0,C0
    0110 100
027                                    /STORAGE FOR COMMAND HISTORY
028 0111 051   CHEKLP,  SRC R10        /SELECT R0,R0,C0
029 0112 341            WMP
030 0113 266            XCH R6         /SAVE AC
031 0114 021            JCN CHKSAV;TEST /JMP IF LINE HIGH
    0115 143
032 0116 043            SRC R2         /SELECT R1,R0,C'N'
033 0117 320            LDM 0          /NO INPUT;CLEAR HISTORY
034 0120 340            WRM
035
036 0121 266   CHKSAW,  XCH R6         /RESTORE AC
037 0122 143            INC R3         /STEP TO NEXT HISTORY CHAR
038 0123 362            IAC
039 0124 141            INC    R1
040 0125 141            INC    R1
MAIN CYCLE PROCESSING
041 0126 141            INC    R1
042 0127 161            ISZ    CHEKLP;R1
    0130 111
043 0131 160            ISZ CHEKLP;R0  /BUMP VECTOR POINTER, LOOP
    0132 111
044 0133 247            LD     R7
045 0134 034            JCN    ADPROC;NOT ZERO
    0135 141
046 0136 323            LDM    3       /NOTHING HAPPENING - SET
047 0137 122            JMS    OUTHI   /BUSY LINE LOW
    0140 102
048                /
049                /
050             /INPUT PROCESSING DONE, CONTINUE CYCLE
051                /
052                /
053 0141 101   ADPROC,  JUN    ADVNCE  /GO DO ADVANCE PROCESSING
    0142 106
054            EJECT
055 0143 043   CHKSAV,  SRC R2         /SELECT HISTORY OF COMMAND
056 0144 147            INC    R7      /STEP 'COMMAND LINE LIVE' FLAG
057 0145 351            RDM            /R1,R0, CHAR N
058 0146 034            JCN CHKSAW;NOT ZERO/JMP IF HISTORY IS SAME
    0147 121
059 0150 370            DAC            /NEW INPUT; SET FLAG
060 0151 340            WRM            /SORE IN HISTORY FILE
061 0152 061            JIN R0         /PROCESS INPUT COMMAND
062 0153 122   TLPROC,  JMS    TEST1   /SELECT TIMING INPUT
    0154 163
063 0155 021   TLRC,    JCN    TLRC;TEST    /WAIT FOR TL START
    0156 155
064                /
065 0157 145            INC    PHASE   /BUMP PHASE COUNT
066                /
067 0160 040            FIM 14!20 0;R0 /DISABLE MAGNETS
    0161 300
068 0162 041            SRC    R0      /RAM 3, REG 0, BIT 2 CONTROLS
069 0163 341            WMP
070                /
071 0164 122            JMS    TESTX   /TEST FOR RESET TIME
    0165 164
072 0166 031            JCN    TRSETJ;NOT TEST /JUMP IF YES
    0167 372
073                /
074 0170 252   TLCON1,  LD     PSTAT   /TEST FOR PRINTING
075 0171 370            DAC
076 0172 034            JCN    TLCON2;NOT ZERO /JUMP IF NO
    0173 176
077                /
```

```
MAIN CYCLE PROCESSING
078 0174 122              JMS     OUTPAT   /GO SET UP PATTERN
    0175 040
079                  /
080 0176 122  TLCON2, JMS     TEST1    /SELECT TIMING INPUT
    0177 163
081 0200 031  TLCON3, JCN     TLCON3;NOT TEST /WAIT FOR TL END
    0201 200
082                  /
083 0202 021  TLCON4, JCN     TLCON4;TEST     /WAIT FOR TP START
    0203 202
084                  /
085 0204 252              LD      PSTAT    /TEST FOR PRINTING
086 0205 370              DAC
087 0206 034              JCN     CYCLE;NOT ZERO  /JUMP IF NO
    0207 064
088                  /
089 0210 040              FIM 14!20 0;R0  /ENABLE MAGNETS
    0211 300
090 0212 041              SRC     R0
091 0213 324              LDM     4
092 0214 341              WMP
093                  /
094 0215 173              ISZ CYCLE;SEGCTR        /BUMP SEG. COUNT
    0216 064
095                  /
096 0217 052              FIM 2!20 13;PSTAT       /INITIATE ADVANCE
    0220 053
097 0221 100              JUN     CYCLE
    0222 064
098           SUBJOB
099                  /

001           SUBJOB PROCESS EXTERNALLY INPUT CHARACTERS
002                  /
003                  /
004 0223 051  EXPROC, SRC     R10      /READ FROM CHAR. BUFFER
005 0224 351              RDM
006 0225 277              XCH     CHAR2
007 0226 151              INC     CBPNTR
008 0227 051              SRC     R10
009 0230 351              RDM
010 0231 276              XCH     CHAR1
011 0232 251              LD CBPNTR       /LEAVE CHAR BUFFER POINTER UNCHA
NGED
012 0233 370              DAC
013 0234 271              XCH     CBPNTR
014                  /
015 0235 040  CHKCR,  FIM 215;R0      /TEST FOR CR
    0236 215
016 0237 124              JMS     COMPAR
    0240 213
017 0241 034              JCN     FFCHEK;NOT ZERO /JUMP IF NO
    0242 300
018                  /
019 0243 252  CRPROC, LD      PSTAT    /TEST FOR PRINTER BUSY
020 0244 034              JCN     ADPROC;NOT ZERO /JUMP IF YES
    0245 141
021                  /
022 0246 124              JMS     BMPPTR   /GO BUMP INPUT POINTER
    0247 000
023                  /
024 0250 052              FIM 2!20 13;PSTAT/TENTATIVELY INITIATE ADVANCE
    0251 053
025                  /
026 0252 254              LD      IBPNT1   /TEST FOR INPUT BUFFER EMPTY
027 0253 024              JCN     ADPROC;ZERO     /JUMP IF YES
    0254 141
028                  /
029 0255 056  PADLIN, FIM 240;CHAR1   /PAD INPUT BUFFER WITH BLANKS
    0256 240
030 0257 122              JMS     PCHAR
    0260 141
```

```
MAIN CYCLE PROCESSING
031 0261 334                  LDM    14
032 0262 214                  ADD    IBFNT1
033 0263 034                  JCN    PADLIN;NOT ZERO
     0264 255
034 0265 100                  JUN    PRINT
     0266 272
035                /
036 0267 252      LINFUL,  LD    PSTAT    /TEST FOR PRINTER BUSY
PROCESS EXTERNALLY INPUT CHARACTERS
037 0270 034                  JCN    ADPROC;NOT ZERO /JUMP IF YES
     0271 141
038                /
039 0272 121      PRINT,   JMS    MBUFF    /MOVE INPUT BUFFER TO OUTPUT
     0273 256
040                /
041 0274 052                  FIM 1!20 0;PSTAT         /INITIATE PRINT
     0275 020
042 0276 100                  JUN    ADPROC
     0277 141
043                /
044 0300 040      FFCHEK,  FIM 214;R0       /TEST FOR FORM FEED
     0301 214
045 0302 124                  JMS    COMPAR
     0303 213
046 0304 034                  JCN    OUTCHR;NOT ZERO /JUMP IF NO
     0305 317
047                /
048 0306 252                  LD     PSTAT    /TEST FOR PRINTER BUSY
049 0307 034                  JCN    ADPROC;NOT ZERO /JUMP IF YES
     0310 141
050                /
051 0311 052                  FIM 3!20 13;PSTAT        /INITIATE FORMFEED
     0312 073
052                /
053 0313 124      FFBUMP,  JMS    BMPPTR   /GO BUMP INPUT POINTER
     0314 000
054 0315 101                  JUN    ADVNCE   /DO ADVANCE PROCESSING
     0316 106
055                /
056 0317 051      OUTCHR,  SRC    R10      /RESET TIMEOUT
057 0320 320                  LDM    0
058 0321 345                  WR1             /0,0,SC0
059 0322 334                  LDM    14
060 0323 344                  WR0             /0,0,SC0
061                /
062 0324 040                  FIM 207;R0       /TEST FOR BELL
     0325 207
063 0326 124                  JMS    COMPAR
     0327 213
064 0330 034                  JCN    TSTLGL;NOT ZERO /JUMP IF NO
     0331 335
065                /
066 0332 337                  LDM    17       /ACTIVATE BELL LINE
067 0333 122                  JMS    OUTHI    /1Y0, CHAR 3, BIT 3
     0334 102
068                /
069 0335 256      TSTLGL,  LD     CHAR1    /TEST FOR LEGAL CHARACTER
070 0336 366                  RAR
071 0337 366                  RAR
072 0340 210                  ADD    R10
073 0341 366                  RAR
074 0342 032                  JCN    FFBUMP;NOT CARRY         /JUMP IF NO
     0343 313
075                /
076 0344 122                  JMS    PCHAR    /GO PUT CHAR. IN INPUT BUFFER
     0345 141
077 0346 100                  JUN    FFBUMP
     0347 313
078                /
079                /
```

-continued

```
PROCESS EXTERNALLY INPUT CHARACTERS
001        350       MARKO= .
002                  /
003                  /
004                  /COMMAND TRANSFER VECTOR
005                  /
006        0350              *350
007                  /
008  0350 040               FIM    215;R0     /PRINT (CR/LF) COMMAND
     0351 215
009  0352 100               JUN    CHTOCB
     0353 376
010                  /
011  0354 040               FIM    240;R0     /SPACE COMMAND
     0355 240
012  0356 100               JUN    CHTOCB
     0357 376
013                  /
014  0360 101               JUN    READ       /LOAD COMMAND
     0361 015
015                  /
016  0362 061       CHKFND, JIN R0            /JMP THROUGH COMMAND TRANSFER VECTOR
017  0363 000               NOP
018                  /
019  0364 100               JUN    MANADV    /FORMFEED COMMAND
     0365 374
020                  /
021  0366 103       FPROCJ, JUN    FPROC      /JUMP TO FORM PROCESSING
     0367 000
022                  /
023  0370 103               JUN    STRTFM     /START FORM COMMAND
     0371 055
024                  /
025  0372 101       TRSETJ, JUN    TRESET     /JUMP TO RESET TIME PROCESSING
     0373 203
026                  /
027  0374 040       MANADV, FIM 214;R0        /MANUAL ADVANCE COMMAND
     0375 214
028                  /
029  0376 050       CHTOCB, FIM 17;R10        /PLACE COMMAND IN CHAR. BUFFER
     0377 017
030                  /
031                  /ROM 1 STARTS HERE
032                  /
033  0400 240               LD     R0
034  0401 051               SRC    R10
035  0402 340               WRM
036  0403 050               FIM 016;R10
     0404 016
037  0405 241               LD     R1
038  0406 051               SRC    R10
039  0407 340               WRM
040                  /
041  0410 323       ACKNWL, LDM    3          /TURN BUSY LINE ON
042  0411 124               JMS    OUTLO      /1Y3, C3, BIT 3
     0412 206
043  0413 100               JUN    INTEST
     0414 074
044                  /
045                  /

001                  /READ CHARACTER(S) FROM INPUT DATA LINES
002                  /
003                  /
004  0415 050       READ,   FIM 016;R10       /PRESET CHAR. BUFFER POINTER
     0416 016
005                  /
006  0417 331               LDM    11         /TEST L.O. CHAR COUNT LINE
007  0420 122               JMS    TESTX
     0421 164
008                  /
```

PROCESS EXTERNALLY INPUT CHARACTERS

```
009 0422 267             XCH     R7       /PRESET INPUT PORT NUMBER
010              /
011 0423 031             JCN     CCOOFF;NOT TEST /JUMP IF C.C. LINE OFF
    0424 027
012              /
013 0425 334             LDM     14       /DECREMENT CHAR BUFF POINTER
014 0426 271             XCH     CBPNTR
015              /
016 0427 334    CCOOFF,  LDM     14       /TEST BCD/ASCII INPUT LINE
017 0430 341             WMP
018 0431 021             JCN     ASCII;TEST      /JUMP IF ASCII
    0432 060
019              /
020 0433 332             LDM     12       /TEST H.O. CHAR COUNT LINE
021 0434 341             WMP
022 0435 031             JCN     CC1OFF;NOT TEST /JUMP IF OFF
    0436 042
023              /
024 0437 334             LDM     14       /DECREMENT CHAR BUFF POINTER BY 2
025 0440 211             ADD     CBPNTR
026 0441 271             XCH     CBPNTR
027              /
028 0442 251    CC1OFF,  LD      CBPNTR   /SAVE CHAR BUFF POINTER
029 0443 266             XCH     R6
030              /
031 0444 122    BCDLP,   JMS     DATAIN   /READ BCD DIGITS TO CHAR BUFFER
    0445 124
032 0446 151             INC     CBPNTR
033 0447 051             SRC     R10
034 0450 333             LDM     13
035 0451 340             WRM
036 0452 171             ISZ     BCDLP;CBPNTR
    0453 044
037              /
038 0454 246    RDEXIT,  LD      R6       /RESTORE CHAR BUFF POINTER
039 0455 271             XCH     CBPNTR
040 0456 101             JUN     ACKNWL
    0457 010
041              /
042 0460 251    ASCII,   LD      CBPNTR   /SAVE CHAR BUFF POINTER
043 0461 266             XCH     R6
044              /
045 0462 330             LDM     10       /ENABLE SERIAL RECEIVER OUTPUT
046 0463 122             JMS     OUTHI    /1Y1, C2, BIT 0
    0464 102
047              /
048 0465 122    ASCILP,  JMS     DATAIN   /READ ASCII CHARS TO CHAR BUFFER
    0466 124
049 0467 151             INC     CBPNTR
050 0470 122             JMS     DATAIN
    0471 124
051 0472 351             RDM
052 0473 365             RAL
053 0474 372             STC
054 0475 366             RAR
055 0476 340             WRM
056 0477 171             ISZ     ASCILP;CBPNTR
    0500 065
057              /
058 0501 330             LDM     10       /DISABLE SERIAL RECEIVER OUTPUT
059 0502 124             JMS     OUTLO
    0503 206
060 0504 101             JUN     RDEXIT
    0505 054
061              /
062              /

001             SUBJOB PROCESS LINE ADVANCE
002              /
003              /
```

```
PROCESS EXTERNALLY INPUT CHARACTERS
004  0506 046       ADVNCE, FIM  1;20 0;R6      /TEST FOR ADVANCE WAIT
     0507 020
005  0510 047               SRC  R6
006  0511 354               RD0                 /0, 1, SC0
007  0512 364               CMA
008  0513 024               JCN  AWFCLR;ZERO    /JUMP IF YES
     0514 177
009                  /
010  0515 361               CLC                 /TEST FOR ADVANCING
011  0516 252               LD   PSTAT
012  0517 366               RAR
013  0520 024               JCN  AWFCLR;ZERO    /JUMP IF NO
     0521 177
014                  /
015  0522 322               LDM  2              /TEST FOR SEGMENT COUNT > -3
016  0523 361               CLC
017  0524 213               ADD  SEGCTR
018  0525 321               LDM  1
019  0526 022               JCN  RETRCT;CARRY   /JUMP IF YES
     0527 134
020                  /
021  0530 124               JMS  OUTLO  /TURN ADVANCE ON
     0531 206
022                  /
023  0532 173               ISZ  AWFCLR;SEGCTR  /BUMP SEGMENT COUNT
     0533 177
024                  /
025  0534 122       RETRCT, JMS  OUTHI  /TURN ADVANCE OFF
     0535 102
026                  /
027  0536 173               ISZ  AWFCLR;SEGCTR  /BUMP SEGMENT COUNT
     0537 177
028                  /
029  0540 124               JMS  LDTEST /GO TEST FOLD DETECTOR
     0541 041
030                  /
031  0542 357               RD3                 /BUMP LINE COUNT
032  0543 362               IAC
033  0544 347               WR3
034  0545 261               XCH  R1
035  0546 356               RD2
036  0547 032               JCN  NOINC;NOT CARRY
     0550 152
037  0551 362               IAC
038  0552 346       NOINC,  WR2
PROCESS LINE ADVANCE
039                  /
040  0553 024               JCN  TSTSKP;ZERO    /JUMP IF LINE COUNT GE 0
     0554 165
041                  /
042  0555 335               LDM  15             /TEST FOR FORM FEEDING
043  0556 212               ADD  PSTAT
044  0557 034               JCN  ENDADV;NOT ZERO /JUMP IF NO
     0560 174
045                  /
046  0561 052       FEED,   FIM  3;20 13;PSTAT  /INITIATE FORM FEED
     0562 073
047  0563 101               JUN  AWFSET
     0564 176
048                  /
049  0565 326       TSTSKP, LDM  6              /TEST FOR LINE COUNT = 10
050  0566 361               CLC
051  0567 201               ADD  R1
052  0570 034               JCN  FEED;NOT ZERO  /JUMP IF NO
     0571 161
053                  /
054  0572 104               JUN  OUTPAP /PAPER JAM CONDITION
     0573 061
055                  /
056  0574 052       ENDADV, FIM  0;PSTAT        /SET PRINTER NOT BUSY
     0575 000
057                  /
```

-Continued

```
PROCESS LINE ADVANCE
058 0576 337    AWFSET,  LDM    17       /SET ADVANCE WAIT FLAG
059 0577 047    AWFCLR,  SRC    R6
060 0600 344             WRO
061 0601 100             JUN    TLPROC
    0602 153
062             /
063             /

001             SUBJOB RESET TIME PROCESSING
002             /
003             /
004 0603 252    TRESET,  LD     PSTAT    /TEST FOR PRINTER BUSY
005 0604 024             JCN    TSTPWR;ZERO    /JUMP IF NO
    0605 216
006             /
007 0606 320    RTIMO,   LDM    0        /RESET TIMEOUT
008 0607 345             WR1
009 0610 334             LDM    14
010 0611 344             WRO
011             /
012 0612 320    INITPH,  LDM    0        /PRESET PHASE COUNT
013 0613 265             XCH    PHASE
014 0614 100             JUN    TLCON1
    0615 170
015             /
016 0616 330    TSTPWR,  LDM    10       /TEST POWER ON INPUT LINE
017 0617 341             WMP
018 0620 021             JCN    RTIMO;TEST     /JUMP IF ON
    0621 206
019             /
020 0622 355             RD1             /BUMP TIMEOUT COUNT
021 0623 362             IAC
022 0624 345             WR1
023 0625 034             JCN    INITPH;NOT ZERO
    0626 212
024 0627 354             RD0
025 0630 362             IAC
026 0631 344             WRO
027 0632 034             JCN    INITPH;NOT ZERO /JUMP IF NO OVERFLOW
    0633 212
028             /
029 0634 122             JMS    OUTHI    /TURN MOTOR OFF
    0635 102
030             /
031 0636 040    WATLP1,  FIM    11!20 2;R0/WAIT FOR ANY COMMAND LINE INPUTS
    0637 222
032 0640 241    WATLP2,  LD     R1
033 0641 341             WMP
034 0642 021             JCN    REACT;TEST
    0643 251
035 0644 141             INC    R1
036 0645 160             ISZ    WATLP2;R0
    0646 240
037 0647 101             JUN    WATLP1
    0650 236
038             /
RESET TIME PROCESSING
039 0651 320    REACT,   LDM    0        /TURN MOTOR ON
040 0652 124             JMS    OUTLO    /1Y3, C0, BIT 0
    0653 206
041 0654 100             JUN    RESYNC
    0655 021
042             /
043             /
001             SUBJOB MOVE INPUT BUFFER TO OUTPUT
002             /
003             /
004 0656 333    MBUFF,   LDM    13       /TEST ORIENTATION
005 0657 122             JMS    TESTX
    0660 164
006             /
```

RESET TIME PROCESSING

```
007 0661 040           FIM   1!20 2;R0    /SET POINTERS TO BUFFERS
    0662 022
008 0663 054           FIM   15!20 2;IBPNT1
    0664 322
009 0665 056           FIM   1!20 1;CHAR1
    0666 021
010 0667 031           JCN   MBLOOP;NOT TEST /JUMP IF UPRIGHT
    0670 275
011 0671 040           FIM   3!20 16;R0
    0672 076
012 0673 056           FIM   17!20 15;CHAR1
    0674 375
013                /
014 0675 041   MBLOOP, SRC   R0    /CONVERT CHAR TO TABLE PTR. & MOVE
015 0676 351           RDM
016 0677 361           CLC
017 0700 365           RAL
018 0701 055           SRC   IBPNT1
019 0702 340           WRM
020 0703 141           INC   R1
021 0704 155           INC   IBPNT2
022 0705 041           SRC   R0
023 0706 351           RDM
024 0707 365           RAL
025 0710 055           SRC   IBPNT1
026 0711 340           WRM
027 0712 323           LDM   3
028 0713 353           ADM
029 0714 340           WRM
030                /
031 0715 241           LD    R1        /BUMP POINTERS
032 0716 217           ADD   CHAR2
033 0717 261           XCH   R1
034 0720 175           ISZ   MBLOOP;IBPNT2
    0721 275
035 0722 367           TCC
036 0723 217           ADD   CHAR2
037 0724 261           XCH   R1
038 0725 240           LD    R0
039 0726 216           ADD   CHAR1
040 0727 260           XCH   R0
```

MOVE INPUT BUFFER TO OUTPUT

```
041 0730 322           LDM   2
042 0731 275           XCH   IBPNT2
043 0732 174           ISZ   MBLOOP;IBPNT1
    0733 275
044 0734 300           BBL   0
045                /
046                /
001                /SUBROUTINE TO SET UP FOR OUTPUT CONTROL
002                /
003                /
004 0735 263   OUTSET, XCH   R3    /FORM BIT # COUNT
005 0736 243           LD    R3
006 0737 365           RAL
007 0740 365           RAL
008 0741 372           STC
009 0742 366           RAR
010 0743 372           STC
011 0744 366           RAR
012 0745 263           XCH   R3
013                /
014 0746 361           CLC         /FORM IMAGE POINTER
015 0747 366           RAR
016 0750 361           CLC
017 0751 366           RAR
018 0752 261           XCH   R1
019 0753 320           LDM   0
020 0754 260           XCH   R0
021 0755 041           SRC   R0
022                /
```

```
MOVE INPUT BUFFER TO OUTPUT
023 0756 243            LD     R3       /COPY BIT COUNTER
024 0757 262            XCH    R2
025              /
026 0760 351            RDM             /ACCESS BIT
027 0761 365   OUTL1,   RAL
028 0762 162            ISZ    OUTL1;R2
    0763 361
029 0764 260            XCH    R0
030 0765 300            BBL    0
031              /
032              /
033      366   MARK1=   .
034              /
035              /

001      1000            *1000
002              /
003              /
004              /PHASE NUMBER TRANSLATION TABLE FOR CHARACTER PATTERNS
005              /    LEFT HALF OF CHARACTER CONTAINS BIT #, HALF #
006              /    FOR UPRIGHT ORIENTATION; RIGHT HALF FOR INVERTED
007              /
008              /
009 1000 002   PHTBL,    002
010 1001 040             040
011 1002 103             103
012 1003 145             145
013 1004 027             027
014 1005 064             064
015 1006 126             126
016 1007 161             161
017 1010 001             001
018 1011 043             043
019 1012 105             105
020 1013 147             147
021 1014 020             020
022 1015 062             062
023 1016 124             124
024 1017 166             166
025              /
026              /
027              /ROUTINE TO OUTPUT CURRENT SEGMENT OF CHARACTER PATTERN
028              /
029              /
030 1020 366   SHIFT,    RAR            /SHIFT CURRENT BIT TO CARRY
031 1021 366             RAR
032 1022 366             RAR
033 1023 366             RAR
034              /
035 1024 321             LDM    1       /ENTER BIT INTO SHIFT REGISTER
036 1025 365             RAL
037 1026 341             WMP
038 1027 320             LDM    0
039 1030 341             WMP
040              /
041 1031 163             ISZ OPLOOP;R3  /BUMP OUTPUT BUFFER POINTER
    1032 066
042 1033 322             LDM    2
043 1034 263             XCH    R3
044 1035 162             ISZ OPLOOP;R2
    1036 066
045 1037 300             BBL    0
046              /
047              /
048              /ENTRY POINT TO SUBROUTINE
049              /
050 1040 333   OUTPAT,   LDM    13      /TEST ORIENTATION
051 1041 122             JMS    TESTX
    1042 164
052              /
053 1043 245             LD     PHASE   /TRANSLATE PHASE NUMBER
```

```
MOVE INPUT BUFFER TO OUTPUT
054  1044 261              XCH     R1
055  1045 060              FIN     R0
056  1046 240              LD      R0
057  1047 031              JCN     NOINVT;NOT TEST /JUMP IF UPRIGHT
     1050 052
058  1051 241              LD      R1
059          /
060  1052 366   NOINVT,    RAR                     /SET UP SHIFT POINTER
061  1053 267              XCH     R7
062  1054 321              LDM     1
063  1055 266              XCH     R6
064          /
065  1056 323              LDM     3               /SET UP HALF SELECT POINTER
066  1057 365              RAL
067  1060 365              RAL
068  1061 277              XCH     CHAR2
069  1062 327              LDM     7
070  1063 276              XCH     CHAR1
071          /
072  1064 042              FIM     322;R2          /SET UP POINTER TO OUTPUT BUFFER
     1065 322
073          /
074  1066 043   OPLOOP,    SRC     R2              /GET PROPER TABLE WORD
075  1067 245              LD      PHASE
076  1070 365              RAL
077  1071 367              TCC
078  1072 353              ADM
079  1073 261              XCH     R1
080  1074 143              INC     R3
081  1075 043              SRC     R2
082  1076 351              RDM
083  1077 260              XCH     R0
084  1100 060              FIN     R0
085          /
086  1101 077              JIN     CHAR1           /GO SELECT PROPER HALF
087          /
088          /

001          /SUBROUTINE TO SET OUTPUT LINE HIGH
002          /
003          /
004  1102 121   OUTHI,     JMS     OUTSET          /GO SET UP OUTPUT
     1103 335
005          /
006  1104 372              STC                     /SET BIT ON
007          /
008  1105 260   OUTPUT,    XCH     R0              /RESTORE BIT
009  1106 366   OUTL2,     RAR
010  1107 163              ISZ     OUTL2;R3
     1110 106
011  1111 340   OPORT,     WRM
012          /
013  1112 341              WMP                     /OUTPUT TO LATCH
014  1113 241   INITP,     LD      R1
015  1114 361              CLC
016  1115 365              RAL
017  1116 342              WRR
018  1117 362              IAC
019  1120 342              WRR
020  1121 370              DAC
021  1122 342              WRR
022  1123 300              BBL     0
023          /
024          /
025          /SUBROUTINE TO READ INPUT PSEUDO-PORT
026          /
027          /
028  1124 247   DATAIN,    LD      R7              /ADDRESS PORT
029  1125 051              SRC     R10
030  1126 342              WRR
031          /
```

```
MOVE INPUT BUFFER TO OUTPUT
032  1127 040              FIM    1!20 0;R0     /READ PORT
     1130 020
033  1131 000              NOP                  /INCREASE TIME ALLOW POWER TO FROM
034  1132 041              SRC    R0
035  1133 352              RDR
036                  /
037  1134 051              SRC    R10           /WRITE TO RAM MEMORY
038  1135 340              WRM
039                  /
040  1136 147              INC    R7            /BUMP PORT #
041  1137 147              INC    R7
042  1140 300              BBL    0
043                  /
044                  /
045                  /SUBROUTINE TO PLACE CHARACTER IN INPUT BUFFER
046                  /
047                  /
048  1141 254    PCHAR,    LD     IBPNT1        /TEST FOR INPUT BUFFER EMPTY
049  1142 034              JCN    IBNZRO;NOT ZERO /JUMP IF NO
     1143 146
050                  /
051  1144 054              FIM    1!20 2;IBPNT1/PRESET INPUT BUFFER POINTER
     1145 022
052                                             /ROM 0, REG 0, CHAN 2
053                  /
054  1146 055    IBNZRO,   SRC    IBPNT1        /MOVE CHARACTER TO INPUT BUFFER
055  1147 257              LD     CHAR2
056  1150 340              WRM
057  1151 155              INC    IBPNT2
058  1152 055              SRC    IBPNT1
059  1153 256              LD     CHAR1
060  1154 340              WRM
061                  /
062  1155 175              ISZ    PCEXIT;IBPNT2  /BUMP INPUT BUFFER POINTER
     1156 162
063  1157 322              LDM    2
064  1160 275              XCH    IBPNT2
065  1161 154              INC    IBPNT1
066  1162 300    PCEXIT,   BBL    0
067                  /
068                  EJECT
069                  /
070                  /SUBROUTINE TO SET UP INPUT LINE TEST
071                  /
072                  /
073  1163 321    TEST1,    LDM    1             /SET UP FOR TIMING INPUT
074                  /
075  1164 040    TESTX,    FIM    0;R0          /SELECT INPUT LINE
     1165 000
076  1166 041              SRC    R0
077  1167 341              WMP
078  1170 361              CLC
079  1171 300              BBL    0
080                  /
081                  /
082       172    MARK2=   .
083                  /
084                  /
085                  /PATTERN WORD HALF SELECT
086                  /
087       1174             *1174
088                  /
089  1174 240              LD     R0            /SELECT LEFT HALF
090  1175 067              JIN    R6
091                  /
092  1176 241              LD     R1            /SELECT RIGHT HALF
093  1177 067              JIN    R6
094                  /
095                  /
```

-Continued

MOVE INPUT BUFFER TO OUTPUT
```
001                     /CHARACTER PATTERN TABLE
002                     /
003                     /
004       1200          *1200
005                     /
006                     /
007  1200 000    000    / SPACE
008  1201 000    000
009  1202 200    200    / !
010  1203 200    200
011  1204 001    001    / "
012  1205 200    200
013  1206 007    007    / #
014  1207 252    252
015  1210 055    055    / $
016  1211 252    252
017  1212 011    011    / %
018  1213 104    104
019  1214 062    062    / &
020  1215 067    067
021  1216 000    000    / '
022  1217 200    200
023                     /
024  1220 000    000    / (
025  1221 120    120
026  1222 000    000    / )
027  1223 005    005
028  1224 000    000    / *
029  1225 377    377
030  1226 000    000    / +
031  1227 252    252
032  1230 200    200    / ,
033  1231 004    004
034  1232 000    000    / -
035  1233 042    042
036  1234 200    200    / .
037  1235 000    000
038  1236 000    000    / /
039  1237 104    104
040                     /
041  1240 077    077    / 0
042  1241 104    104
043  1242 000    000    / 1
044  1243 210    210
045  1244 064    064    / 2
046  1245 044    044
047  1246 054    054    / 3
048  1247 140    140
049  1250 001    001    / 4
050  1251 252    252
051  1252 045    045    / 5
052  1253 022    022
053  1254 014    014    / 6
054  1255 144    144
055  1256 041    041    / 7
056  1257 110    110
057                     /
058  1260 077    077    / 8
059  1261 042    042
060  1262 041    041    / 9
061  1263 106    106
062  1264 300    300    / :
063  1265 000    000
064  1266 300    300    / ;
065  1267 004    004
066  1270 004    004    / <
067  1271 104    104
068  1272 040    040    / =
069  1273 042    042
070  1274 004    004    / >
071  1275 021    021
```

-Continued

```
MOVE INPUT BUFFER TO OUTPUT
072 1276 241    241     / ?
073 1277 100    100
074             /
075 1300 075    075     / @
076 1301 024    024
077 1302 030    030     / A
078 1303 144    144
079 1304 047    047     / B
080 1305 122    122
081 1306 047    047     / C
082 1307 000    000
083 1310 074    074     / D
084 1311 210    210
085 1312 047    047     / E
086 1313 042    042
087 1314 043    043     / F
088 1315 042    042
089 1316 057    057     / G
090 1317 040    040
091             /
092 1320 033    033     / H
093 1321 042    042
094 1322 044    044     / I
095 1323 210    210
096 1324 036    036     / J
097 1325 000    000
098 1326 003    003     / K
099 1327 122    122
100 1330 007    007     / L
101 1331 000    000
102 1332 033    033     / M
103 1333 101    101
104 1334 033    033     / N
105 1335 021    021
106 1336 077    077     / O
107 1337 000    000
108             /
109 1340 063    063     / P
110 1341 042    042
111 1342 077    077     / Q
112 1343 020    020
113 1344 063    063     / R
114 1345 062    062
115 1346 055    055     / S
116 1347 042    042
117 1350 040    040     / T
118 1351 210    210
119 1352 037    037     / U
120 1353 000    000
121 1354 003    003     / V
122 1355 104    104
123 1356 033    033     / W
124 1357 024    024
125             /
126 1360 000    000     / X
127 1361 125    125
128 1362 000    000     / Y
129 1363 111    111
130 1364 044    044     / Z
131 1365 104    104
132 1366 006    006     / [
133 1367 042    042
134 1370 000    000     / \
135 1371 021    021
136 1372 014    014     / ]
137 1373 042    042
138 1374 000    000     / ^
139 1375 024    024
140 1376 004    004     / ←
141 1377 000    000
142             /
143             /
144             /END OF CHARACTER PATTERN TABLE
```

MOVE INPUT BUFFER TO OUTPUT

```
001                 SUBJOB FORM PROCESSING ROUTINES
002      1400       *1400
003
004                 /
005                 /
006                 /
007 1400 040        FPROC,   FIM    1;20 0;R0    /READ FORM CHARACTER
    1401 020
008 1402 334                 LDM    14
009 1403 051                 SRC    R10
010 1404 342                 WRR
011 1405 041                 SRC    R0
012 1406 352                 RDR
013 1407 277                 XCH    CHAR2
014 1410 336                 LDM    16
015 1411 051                 SRC    R10
016 1412 342                 WRR
017 1413 041                 SRC    R0
018 1414 352                 RDR
019 1415 276                 XCH    CHAR1
020                 /
021 1416 040                 FIM    233;R0       /TEST FOR ESCAPE
    1417 233
022 1420 124                 JMS    COMPAR
    1421 213
023 1422 034                 JCN    TSTEOF;NOT ZERO  /JUMP IF NO
    1423 032
024                 /
025 1424 124                 JMS    BMPFRM       /BUMP FORM POINTER
    1425 020
026                 /
027 1426 330                 LDM    10           /SET FORM IN OFF
028 1427 264        FRMXIT,  XCH    FORMC
029 1430 100                 JUN    RECHEK
    1431 100
030                 /
031 1432 040        TSTEOF,  FIM    204;R0       /TEST FOR END OF FORM
    1433 204
032 1434 124                 JMS    COMPAR
    1435 213
033 1436 034                 JCN    TSTCR;NOT ZERO   /JUMP IF NO
    1437 051
034 1440 324                 LDM    4            /SET "FORM BUSY" LOW
035 1441 122                 JMS    OUTHI
    1442 102
036                 /
037 1443 264                 XCH FORMC           /SET FORM IN OFF
038 1444 254                 LD  IBPNT1          /INPUT BUFFER EMPTY?
```

FORM PROCESSING ROUTINES

```
039 1445 034                 JCN TSTAA;NOT ZERO      /NO ON JMP- FORCE PRINT
    1446 053
040 1447 100                 JUN RECHEK          /YES;ALL DONE
    1450 100
041                 /
042 1451 100        TSTCR,   JUN CHKCR          /TEST FOR CR
    1452 235
043                 /
044 1453 100        TSTAA,   JUN    CRPROC      /GO PROCESS CR
    1454 243
045                 /
046                 /
047                 /START FORM INPUT
048                 /
049 1455 331        STRTFM,  LDM    11           /SET FORM IN ON
050 1456 264                 XCH    FORMC
051                 /
052 1457 324                 LDM 4               /1Y2, 0, 0, B0
053 1460 124                 JMS OUTLO           /SET FORM BUSY HIGH
    1461 206
```

FORM PROCESSING ROUTINES

```
054 1462 054              FIM 4;IBPNT1
    1463 004
055 1464 046              FIM 1!20 0;R6       /GET MSD OF LINE #
    1465 020
056 1466 332              LDM 12              /MSD MUX ADDRESS
057 1467 342              WRR
058 1470 047              SRC R6              /SELECT ROM1
059 1471 352              RDR                 /READ MSD FROM ROM 1 PORT
060 1472 276              XCH CHAR1
061 1473 055              SRC IBPNT1          /SELECT ROM0
062 1474 330              LDM 10              /LSD MUX ADDRESS
063 1475 342              WRR
064 1476 047              SRC R6              /SELECT ROM1
065 1477 352              RDR                 /READ LSD FROM ROM PORT
066 1500 277              XCH CHAR2
067 1501 320              LDM 0               /SET CHIP SELECT TO 1ST CHIP
068 1502 271              XCH CBPNTR
069 1503 040              FIM 1!20 1;R0       /INITIALIZE LINE POINTER TO BCD 11
    1504 021
070
071 1505 372   MES100,    STC                 /SUBTRACT LINE # FROM
072 1506 371              TCS                 /INPUT LINE #.  IF
073 1507 221              SUB R1              /CARRY BIT IS SET AFTER SECOND
074 1510 361              CLC                 /DAA INSTR., INPUT
075 1511 217              ADD CHAR2           /LINE # > LINE POINTER.
076 1512 373              DAA
077 1513 371              TCS
078 1514 220              SUB R0
079 1515 361              CLC
080 1516 216              ADD CHAR1
081 1517 373              DAA
082 1520 032              JCN MES160;NOT CARRY  /LINE #< LPNTR ON JUMP
    1521 137
083 1522 151              INC CBPNTR          /LINE # > LPNTR
084 1523 361              CLC                 /ADD NEXT CHIP'S WORTH
085 1524 322              LDM 2               /OF LINE #'S TO LINE POINTER.
086 1525 201              ADD R1
087 1526 373              DAA
088 1527 261              XCH R1
089 1530 321              LDM 1
090 1531 200              ADD R0
091 1532 260              XCH R0
092 1533 330              LDM 10              /CHIP SELECT = 0?
093 1534 231              SUB CBPNTR          /(INPUT PRECAUTIONS)
094 1535 034              JCN MES100;NOT ZERO   /CHIP SELECT = 8 ON WALK-THRU
    1536 105
095
096 1537 042   MES160,    FIM 1!20 1;R2       /BCD 11
    1540 021
097 1541 372              STC                 /SUBTRACT BCD 11 FROM
098 1542 371              TCS                 /LINE POINTER
099 1543 223              SUB R3
100 1544 361              CLC
101 1545 201              ADD R1
102 1546 373              DAA
103 1547 261              XCH R1
104 1550 371              TCS
105 1551 222              SUB R2
106 1552 361              CLC
107 1553 200              ADD R0
108 1554 373              DAA
109 1555 260              XCH R0
110 1556 042              FIM 0;R2            /INITIALIZE FROM ADDRESS
    1557 000
111 1560 124   MES170,    JMS COMPAR          /INPUT LINE # = LINE POINTER?
    1561 213
112 1562 024              JCN MES180;ZERO     /JUMP IF EQUAL
    1563 205
113 1564 361              CLC                 /BUMP LINE POINTER
114 1565 321              LDM 1
115 1566 201              ADD R1
```

FORM PROCESSING ROUTINES

```
116  1567  373              DAA
117  1570  261              XCH R1
118  1571  320              LDM 0
119  1572  200              ADD R0
120  1573  260              XCH R0
121  1574  361              CLC                /STEP ADDRESS BY (21)10
122  1575  325              LDM 5
123  1576  203              ADD R3
124  1577  263              XCH R3
125  1600  321              LDM 1
126  1601  202              ADD R2
127  1602  262              XCH R2
128  1603  103              JUN MES170
     1604  160
129
130  1605  040      MES180, FIM 4;R0           /SELECT ADDRESS STORAGE
     1606  004
131  1607  041              SRC R0             /LINE #= LINE POINTER
132  1610  243              LD R3              /SEND OUT ADDRESS & CHIP SELECT
133  1611  122              JMS OPORT
     1612  111
134  1613  141              INC R1             /STEP TO LSD OF ADDRESS POINTER
135  1614  041              SRC R0
136  1615  242              LD R2
137  1616  122              JMS OPORT
     1617  111
138  1620  141              INC R1             /STEP TO CHIP SELECT
139  1621  041              SRC R0
140  1622  251              LD CBPNTR
141  1623  122              JMS OPORT          /2Y1 STROBE
     1624  111
142  1625  271              XCH CBPNTR         /CLEAR POINTER
143  1626  101              JUN ACKNWL
     1627  010
144                 EJECT
001        2000    *2000
002                 /
003                 /SUBROUTINE TO BUMP INPUT POINTER
004                 /BUMPS EITHER CHARACTER BUFFER POINTER OR
005                 /FORM POINTER, AS APPROPRIATE
006
007  2000  244     BMPPTR, LD FORMC            /TEST FOR FORM INPUT
008  2001  366             RAR
009  2002  022             JCN BMPFRM;CARRY/JMP IF FORM INPUT
     2003  020
010  2004  151             INC CBPNTR          /BUMP CHAR POINTER
011  2005  151             INC CBPNTR
012  2006  251             LD CBPNTR
013  2007  034             JCN    BMP30;NOT ZERO   /CHAR BUFFER EMPTY?
     2010  017
014  2011  244             LD FORMC            /YES; FIP?
015  2012  365             RAL
016  2013  032             JCN    BMP30;NOT CARRY
     2014  017
017  2015  331             LDM 11              /YES; TURN
018  2016  264             XCH FORMC           /FORM IN ON
019  2017  300     BMP30,  BBL 0
020
021                 /SUBROUTINE TO BUMP FORM POINTER
022                 /
023                 /
024  2020  040     BMPFRM, FIM 4;R0            /SET POINTER TO FORM ADDRESS
     2021  004
025                 /
026  2022  042             FIM 1!20 15;R2      /SET COUNTER
     2023  035
027  2024  361     BMPLP,  CLC
028                 /
029  2025  041             SRC    R0           /INCREMENT FORM ADDRESS
030  2026  351             RDM
031  2027  202             ADD    R2
032  2030  262             XCH    R2
033  2031  367             TCC
```

```
FORM PROCESSING ROUTINES
034  2032 262              XCH       R2
035  2033 122              JMS       OPORT
     2034 111
036  2035 141              INC       R1
037  2036 163              ISZ       EMPLP;R3
     2037 024
038  2040 300              BBL       0
039              /
040              /
001              /PAPER OUT/PAPER JAM DETECTION
002              /
003              /
004  2041 337   LDTEST,    LDM       17        /TEST FOR HOLE IN PAPER
005  2042 341              WMP
006  2043 031              JCN       NOHOLE;NOT TEST /JUMP IF NO HOLE
     2044 153
007  2045 124              JMS LDSET           /HAVE HOLE-RESET LINE COUNTERS
     2046 201
008
009  2047 052              FIM 0;PSTAT         /SET PRINTER NON-BUSY
     2050 000
010  2051 047              SRC       R6        /SELECT ROM 0, REG 1
011  2052 357              RD3                 /READ HOLE COUNTER
012  2053 365              RAL                 /BIT 0 ORIGINALLY SET. IF
013  2054 347              WR3                 /BIT 0 GOES TO CARRY,OUT-OF-
014  2055 022              JCN       OUTPAP;CARRY   /PAPER CONDITION EXISTS
     2056 061
015  2057 041              SRC       R0        /NO PROBLEM SO FAR
016  2060 300              BBL       0         /RETURN TO PROCESSING
017
018  2061 327   OUTPAP,    LDM       7         /TURN ON "PAPER OUT" LIGHT
019  2062 122              JMS       OUTHI     /1Y2, CHAR 1, BIT 3
     2063 102
020  2064 122              JMS OUTHI           /TURN MOTOR OFF,1Y3,CHAR 0,BIT 0
     2065 102
021  2066 322              LDM 2               /TURN "DC ON" OFF
022  2067 122              JMS OUTHI
     2070 102
023  2071 336              LDM       16        /SELECT LID SWITCH ON MUX
024  2072 341              WMP
025  2073 031   LIDCLO,    JCN       LIDCLO;NOT TEST /STAY HERE IF LID CLOSED
     2074 073
026  2075 327              LDM       7         /SELECT MANUAL ADVANCE
027  2076 341              WMP                 /ON MUX
028  2077 031   MANNO,     JCN       MANNO;NOT TEST  /STAY HERE IF NO PAPER
     2100 077
029  2101 322              LDM 2               /TURN "DC ON" ON
030  2102 124              JMS OUTLO
     2103 206
031  2104 320   MANNO1,    LDM       0         /SOMEBODY MESSING WITH
032  2105 124              JMS       OUTLO     /PRINTER-TURN MOTOR ON
     2106 206
033  2107 124              JMS       WAIT80    /80 MS WAIT
     2110 160
034  2111 321              LDM       1
035  2112 124              JMS       OUTLO              /TURN ADVANCE ON
     2113 206
036  2114 124              JMS       WAIT80    /80 MS WAIT
     2115 160
037  2116 321              LDM       1
038  2117 122              JMS       OUTHI     /TURN ADVANCE OFF
     2120 102
039  2121 327   MANNO2,    LDM       7         /SELECT MANUAL ADVANCE
040  2122 341              WMP                 /ON MUX
041  2123 021              JCN       MANNO1;TEST      /JUMP IF MANUAL ADVANCE
     2124 104
042  2125 337              LDM       17        /NO ADVANCE; CHECK PAPER SUPPLY
043  2126 341              WMP                 /SELECT HOLE DETECT ON MUX
044  2127 021              JCN       MANNO2;TEST      /JUMP IF NO PAPER
     2130 121
045  2131 336              LDM       16        /HAVE PAPER; CHECK LID
046  2132 341              WMP
```

```
FORM PROCESSING ROUTINES
047 2133 021              JCN    MANN02;TEST     /JUMP IF LID OPEN
    2134 121
048 2135 327              LDM    7               /SELECT MAN. ADV. ON MUX
049 2136 341              WMP
050 2137 031   MANN04,    JCN MANN04;NOT TEST    /WAIT FOR SIGNAL TO GO
    2140 137
051 2141 052              FIM    3!20 13;PSTAT   /INITIATE FORM FEED
    2142 073
052 2143 124              JMS    LDSET           /SET LINE COUNT
    2144 201
053 2145 321              LDM    1               /SET HOLE COUNTER
054 2146 047              SRC    R6
055 2147 347              WR3
056 2150 041              SRC    R0
057 2151 100              JUN    RESYNC
    2152 021
058 2153 321   NOHOLE,    LDM    1               /NO HOLE; SET HOLE COUNTER
059 2154 047              SRC R6                 /FOR MAX COUNT
060 2155 347              WR3
061 2156 041              SRC    R0
062 2157 300              BBL    0
063
064 2160 040   WAIT80,    FIM    0;R0            /85.6 MS WAIT LOOP
    2161 000
065 2162 042              FIM    0!20 2;R2
    2163 002
066 2164 160   WAIT1,     ISZ    WAIT1;R0
    2165 164
067 2166 161              ISZ    WAIT1;R1
    2167 164
068 2170 163              ISZ    WAIT1;R3
    2171 164
069 2172 300              BBL    0
070
071 2173 321   LDSETB,    LDM    1               /SET HOLE COUNTER FOR
072 2174 141              INC    R1              /MAX COUNT
073 2175 041              SRC    R0
074 2176 347              WR3
075 2177 040              FIM    0;R0
    2200 000
076 2201 336   LDSET,     LDM    16              /SET LINE COUNTERS
077 2202 346              WR2
078 2203 334              LDM    14
079 2204 347              WR3
080 2205 300   EQXIT,     BBL    0
081
082                       /SUBROUTINE TO SET OUTPUT LINE LOW
083 2206 121   OUTLO,     JMS OUTSET
    2207 335
084 2210 361              CLC
085 2211 102              JUN OUTPUT
    2212 105
086
087                       /SUBROUTINE TO COMPARE 2 CHAR IN R0,1 & R16,17
088                       /RETURN 0 IF EQUAL, 17 IF NOT EQUAL
089
090 2213 361   COMPAR,    CLC                    /TEST FOR LOW HALVES EQUAL
091 2214 257              LD CHAR2
092 2215 221              SUB R1
093 2216 034              JCN NEQXIT;NOT ZERO    /JMP IF NOT EQUAL
    2217 225
094 2220 361              CLC                    /TEST FOR HIGH HALVES EQUAL
095 2221 256              LD CHAR1
096 2222 220              SUB R0
097 2223 024              JCN EQXIT;ZERO         /JMP IF EQUAL
    2224 205
098 2225 317   NEQXIT,    BBL 17
099            /
100 2226 040   INITAL,    FIM 10;R0              /FLUSH OUTPUT PORT IMAGE AREA
    2227 010
101 2230 043   INIT2,     SRC R2                 /SELECT ROM 0
102 2231 340              WRM
103 2232 143              INC R3
```

—Continued

FORM PROCESSING ROUTINES

```
104 2233 161            ISZ INIT2;R1
    2234 230
105 2235 122   INIT3,   JMS INITP       /CLEAR PORTS
    2236 113
106 2237 161            ISZ INIT3;R1
    2240 235
107 2241 300            BBL 0
108            /
109       242  MARK3=
110            /
111            /
```

NOTE: Tags followed by an asterisk denote that it is not referred to in the program.

FORM PROCESSING ROUTINES

| Tags | Program Address | Tags | Program Address |
|---|---|---|---|
| ACKNWL | 0410 | MANADV | 0374 |
| ADPROC | 0141 | MANNO | 2077 |
| ADVNCE | 0504 | MANNO1 | 2104 |
| ASCII | 0460 | MANNO2 | 2121 |
| ASCILP | 0465 | MANNO4 | 2137 |
| AWFCLR | 0577 | MARK0 | 0350* |
| AWFSET | 0576 | MARK1 | 0766* |
| BCDLP | 0444 | MARK2 | 1172* |
| BMPFRM | 2020 | MARK3 | 2242* |
| BMPLP | 2024 | MBLOOP | 0675 |
| BMPPTR | 2000 | MBUFF | 0656 |
| BMP30 | 2017 | MES100 | 1505 |
| CBPNTR | 0011 | MES160 | 1537 |
| CC0OFF | 0427 | MES170 | 1560 |
| CC1OFF | 0442 | MES180 | 1605 |
| CHAR1 | 0016 | NEQXIT | 2225 |
| CHAR2 | 0017 | NOHOLE | 2153 |
| CHEKLP | 0111 | NOINC | 0552 |
| CHKCR | 0235 | NOINVT | 1052 |
| CHKFND | 0362* | OFLOOP | 1066 |
| CHKSAV | 0143 | OPORT | 1111 |
| CHKSAW | 0121 | OUTCHR | 0317 |
| CHTOCB | 0376 | OUTHI | 1102 |
| COMPAR | 2213 | OUTLO | 2206 |
| CRPROC | 0243 | OUTL1 | 0761 |
| CYCLE | 0064 | OUTL2 | 1106 |
| CYCLE1 | 0066 | OUTPAP | 2061 |
| DATAIN | 1124 | OUTPAT | 1040 |
| ENDADV | 0574 | OUTPUT | 1105 |
| EQXIT | 2205 | OUTSET | 0735 |
| EXPROC | 0223 | PADLIN | 0255 |
| FEED | 0561 | PCEXIT | 1162 |
| FFBUMP | 0313 | PCHAR | 1141 |
| FFCHEK | 0300 | PHASE | 0005 |
| FORMC | 0004 | PHTBL | 1000* |
| FPROC | 1400 | PRINT | 0272 |
| FPROCJ | 0364 | PSTAT | 0012 |
| FRMXIT | 1427* | RDEXIT | 0454 |
| IBNZRO | 1146 | REACT | 0651 |
| IBPNT1 | 0014 | READ | 0415 |
| IBPNT2 | 0015 | RECHEK | 0100 |
| ILOOP | 0001* | RESYNC | 0021 |
| INITAL | 2226 | RETRCT | 0534 |
| INITP | 1113 | RTIMO | 0606 |
| INITPH | 0612 | R0 | 0000 |
| INIT2 | 2230 | R1 | 0001 |
| INIT3 | 2235 | R10 | 0010 |
| INTEST | 0074 | R2 | 0002 |
| LDSET | 2201 | R3 | 0003 |
| LDSETB | 2173 | R6 | 0006 |
| LDTEST | 2041 | R7 | 0007 |
| LIDCLO | 2073 | SEGCTR | 0013 |
| LINFUL | 0267 | SHIFT | 1020* |

FORM PROCESSING ROUTINES

| Tags | Program Address | | Tags | Program Address |
|---|---|---|---|---|
| STRTFM | 1455 | | TLRC | 0155 |
| TESTX | 1164 | | TRESET | 0603 |
| TEST1 | 1163 | | TRSETJ | 0372 |
| TLCON1 | 0170 | | TSTAA | 1453 |
| TLCON2 | 0176 | | TSTCR | 1451 |
| TLCON3 | 0200 | | TSTEOF | 1432 |
| TLCON4 | 0202 | | TSTLGL | 0335 |
| TLOOP1 | 0023 | | TSTPWR | 0616 |
| TLOOP2 | 0025 | | TSTSKP | 0565 |
| TLOOP3 | 0031 | | WAIT1 | 2164 |
| TLOOP4 | 0037 | | WAIT80 | 2160 |
| TLOOP5 | 0051 | | WATLP1 | 0636 |
| TLOOP7 | 0055 | | WATLP2 | 0640 |
| TLPROC | 0153 | | | |

Revisions to Main Program

```
003
004          000     R0=0
005          001     R1=1
006          002     R2=2
007          003     R3=3
008          102     OUTHI=1102
009          113     INITP=1113
010
011        0004     *4
012 0004 104         JUN PATA
    0005 244
013        0634     *634
014 0634 104         JUN PATB
    0635 253
015        2203     *2203
016 2203 333         LDM 13           /LINE COUNTER
017        2226     *2226
018 2226 104         JUN INITAL
    2227 262
019        2244     *2244
020 2244 122  PATA, JMS OUTHI         /TURN FORM BUSY OFF
    2245 102
021 2246 324         LDM 4
022 2247 122         JMS OUTHI
    2250 102
023 2251 100         JUN 6
    2252 006
024
025 2253 122  PATB, JMS OUTHI
    2254 102
026 2255 322         LDM 2            /TURN "DC ON" OFF
027 2256 122         JMS OUTHI
    2257 102
028 2260 101         JUN 636
    2261 236
029
030 2262 040  INITAL, FIM 14!20 0;R0  /CLEAR RAM0
    2263 300
031 2264 043  INIT2, SRC R2           /BUT NOT STATUS CHAR
032 2265 340         WRM
033 2266 163         ISZ INIT2;R3     /STEP CHAR SELECT
    2267 264
034 2270 142         INC R2           /STEP REG SELECT
035 2271 160         ISZ INIT2;R0     /STEP COUNTER
    2272 264
036 2273 122  INIT3, JMS INITP        /CLEAR OUTPUT PORTS
    2274 113
037 2275 161         ISZ INIT3;R1
    2276 273
038 2277 300         BBL 0
039
```

−Continued

Revisions to Main Program

| | |
|---|---|
| INITAL | 2262 |
| INITP | 1113 |
| INIT2 | 2264 |
| INIT3 | 2273 |
| OUTHI | 1102 |
| PATA | 2244 |
| PATB | 2253 |
| R0 | 0000 |
| R1 | 0001 |
| R2 | 0002 |
| R3 | 0003 |

As can best be seen in FIG. 3, command interface 22 basically comprises a 16 input addressable command multiplexer 184 (Texas Instrument, Part No. SN 74150). The inputs to the command mutiplexer 184 are the print reset pulse 124, the print timing pulse 126, a PRINT command 88, a SPACE command 90, a LOAD BUFFER command 92, a FORM FEED command 94, a START FORM command 31, a MOTOR STAY ON command 80, a DATA SELECT 0 and DATA SELECT 1 command 110, an ORIENTATION command 112, a BCD/ASCII command 114, a LID DETECT signal 186, a FOLD DETECT signal 188, and a MANUAL ADVANCE command 190. The MANUAL ADVANCE command 190 incorporates inverter 192 and nor gate 194 for the proper conditioning of this command. The resistor 196 is used for current limiting LID DETECT signal 186. The output of multiplexer 184 is inverted by the inverter 198 and transferred to microprocessor 20. Command addressing information is obtained from the microprocessor via outputs RAM 0-0 to RAM 0-3. These four addressing lines sequentially sample all the input command information received by multiplexer 184, thereby obtaining an output signal that time samples all the input command information. All of the incoming commands from external devices 33 are first electrically isolated, shaped and amplified by D.C. input modules or A.C. input modules as discussed below with respect to data interface 26.

As best seen in FIGS. 4A and 4B the data interface 26 comprises input modules 300 and 302 for electrically isolating external data information and stored data address information (see FIG. 4A). As best seen in FIG. 4B, data interface 26 also comprises four multiplexers 304 for selectively channeling said external data, stored data address information, and stored data. Multiplexers 304 (Texas Instruments, Part No. SN74151A) are addressed by the outputs of microprocessor latch 170; i.e., ROM 00-1 to ROM 00-3. The output of data interface 26 consists of four output lines, ROMI-1-0 to ROMI-1-3, which are received by microprocessor 20 in input buffers 29.

When external data or stored data address information are of a direct voltage nature, input module 300 is used to provide the correct input information to multiplexers 304. The list of the components used in input module 300 are contained in Table No. 5. Basically the input module utilizes an optical coupler 4-5 to isolate the input information from an external device. This information is then amplified by operational amplifier 4-12 and transistor 4-15.

Input module 302 is utilized if the external data information or stored data address information is in an alternating voltage mode. A list of the components used will be found in Table 6. Basically this input mode utilizes an input energy threshold means via capacitors 4-21 and 4-24 and thyristor 4-26, to allow the generation of an output signal to the data interface multiplexer 304 when the energy level of the input alternating voltage signal is greater than a predetermined level.

Alternatively the printer 19 may take the form of a general purpose computer compatible printer. Such printers are usually supplied with ASCII coded characters on serial data lines. The data may be supplied at a rate of 110 or 300 band (corresponding to 10 or 30 characters per second) in accordance with the Electrical Industry Standard RS232C or on so called 60 or 20 milliamps current loop channels.

A printer which is designed to receive such serial ASCII data employs a data interface 26 comprising a serial to parallel data converter known in the art as U/ART (universal asynchronous receiver transmitter). For example, a Texas Instrument's model TMS6011.

The output of the U/ART is supplied on data lines 28 (FIG. 1) to the input buffer 29 of the microprocessor 20.

If it is desired to print stored serial coded ASCII data, the information on the stored data lines 70 is appropriately multiplexed with the outputs from the U/ART in a manner similar to that illustrated in FIG. 4B.

TABLE 5

| DATA INTERFACE — D. C. INPUT MODULE | |
|---|---|
| Number | Component |
| 4-1 | 10K |
| 4-2 | Diode IN4007 |
| 4-3 | 931 ohm |
| 4-4 | Diode IN4148 |
| 4-5 | LED-Phototransistor |
| 4-6 | 470 pf |
| 4-7 | 2.2K |
| 4-8 | 33.2K |
| 4-9 | 0.33 μfd |
| 4-10 | 33.2K |
| 4-11 | 221K |
| 4-12 | Operational Amplifier |
| 4-13 | 2.2 mcg |
| 4-14 | 5.1K |
| 4-15 | Transistor (RCA No. CA3086) |
| 4-16 | 5.1K |
| 4-17 | 51 ohm |
| 4-18 | 10 ohm |
| 4-19 | 1.0 μfd |

TABLE 6

| DATA INTERFACE — A.C. INPUT MODULE | |
|---|---|
| Number | Component |
| 4-20 | 510 ohm |
| 4-21 | 0.56 μfd |
| 4-22 | 27K |
| 4-23 | 27K |
| 4-24 | 0.1 μfd |
| 4-25 | 6.2K |
| 4-26 | Thyristor |
| 4-27 | Transformer |
| 4-28 | 100 ohm |
| 4-29 | 51 ohm |
| 4-30 | 51 ohm |
| 4-31 | .01 μfd |
| 4-32 | Diode IN4148 |
| 4-33 | Diode IN4148 |
| 4-34 | 470 ohm |
| 4-35 | Transistor 2N4401 |
| 4-36 | 10 ohm |
| 4-37 | 100 ohm |
| 4-38 | Diode IN914 |
| 4-39 | .01 μfd |
| 4-40 | Inverter |

As can best be seen in FIG. 6, programmable "read only" memory (PROM) 21 consists of nine ultraviolet memory chips (Intel Corporation, Part No. 702A) 98. These memory chips are identical to the programmable "read only" memories 156 of microprocessor 20. The PROM's 98 are activated by chip selector outputs 157 from stored data selector 64. Likewise the particular memory address location of the selected PROM 98 is obtained via the eight chip address lines 58, from stored data selector 64. The output of the selected PROM data location is transferred to eight stored data lines 70 and transferred thereby to data interface 26.

As best seen in FIGS. 8A and 8B, printer logic interface 38 comprises timing information and fold detection information amplification and shaping (FIG. 8A) as well as providing amplification and shaping to hammer drive information 32, so as to generate hammer drive 40. A table of the electronic components utilized in amplifying and shaping the timing information 124 and 126 as well as fold detect signal 127 is contained in Table 7. Since the reset head signals 124 and the timing head signals 126 are generated by magnetic means (see FIG. 9) the circuitry shown in FIG. 8A basically shapes this pulse information so as to be compatible with command multiplexer 184.

TABLE 7

| PRINTER LOGIC INTERFACE | |
|---|---|
| Number | Component |
| 8-1 | 1K |
| 8-2 | 2.37K |
| 8-3 | 4.22K |
| 8-4 | 511 ohm |
| 8-5 | 19.6K |
| 8-6 | 1K |
| 8-7 | 1.33K |
| 8-8 | 4.22K |
| 8-9 | 511 ohm |
| 8-10 | 19.6K |
| 8-11 | 1.33K |
| 8-12 | 19.6K |
| 8-13 | 19.6K |
| 8-14 | 100 ohm |
| 8-15 | 100 ohm |
| 8-16 | 30K |
| 8-17 | 10 μfd |
| 8-18 | 0.01 μfd |
| 8-19 | 0.01 μfd |
| 8-20 | 0.01 μfd |
| 8-21 | 0.01 μfd |
| 8-22 | 0.05 μfd |
| 8-23 | Nor Gate |
| 8-24 | And Gate |
| 8-25 | Inverted or Gate |
| 8-26 | Flip-Flop |
| 8-27 | Nor Gate |
| 8-28 | Operational Amplifier |

TABLE 7-continued

| PRINTER LOGIC INTERFACE | |
|---|---|
| Number | Component |
| 8-29 | Operational Amplifier |
| 8-30 | And Gate |
| 8-31 | And Gate |
| 8-32 | 1K |
| 8-34 | Zener Diode IN746 |
| 8-35 | Diode IN914 |
| 8-36 | Zener Diode IN746 |
| 8-37 | Diode IN914 |

Likewise since the fold detect signal 127 is generated by an optical device (see FIG. 9), it is shaped and amplified by the printer logic interface to be compatible with command multiplexer 184.

As shown in FIG. 8B, the printer logic interface 38 retrieves a serial hammer drive information 32 and generates a parallel output hammer drive 40. The printer logic interface 38 utilizes three shift registers (Intel Corporation, Part No. 4003) to receive the serial hammer drive information 32 and generate twenty-one parallel output signals 306. These output signals are then amplified via inverters 308 and relay drivers 310. The outputs of the relay drivers 310 generate the hammer drive 40 which is transferred to print mechanism 42 to drive the print hammers 46.

As can best be seen in FIGS. 9 and 18, print mechanism 42 comprises a print drum 128 incorporating arrays of line segments 130. Reset head signal 124 is generated by magnetic slug 312 passing in proximity to pick-up coil 314. Timing head disc 316 is mechanically coupled to print drum 128 in a gear ratio of 16 to 1. Therefore timing head disc 316 makes 16 revolutions per one revolution of print drum 128. Magnetic slugs 318 in combination with pick-up coil 320 generate two timing head pulses per revolution of timing head disc 316. These timing pulses provide the proper synchronization of hammer drive 40 so that the desired line segments 130 are properly struck by print hammers 44.

Fold detect signal 127 is generated by detecting holes in the print paper via light emitting diode - photo transistor combination 322 and operational amplifier 324.

As seen in FIG. 9, hammer drive 40 activates hammer solenoid 326, causing print hammers 44 to engage with print paper 328.

Print motor 329 is activated by motor signal 330 while paper advance solenoid 50 is activated by paper advance solenoid signal 322. Lid detect signal 186 is generated by switch 336 connected to the paper lid enclosing paper 328.

As best seen in FIG. 7, print drive and output status lines interface 46 incorporates a motor drive and paper feed module 328, a direct current output module 330, and an alternating current output module 332. The components used in the print drive and output status interface 46 are listed in Table 8.

More particularly motor drive and paper feed module 328 incorporates "Positive - And" driver 7-19 (Texas Instruments, Part No. 75450) which, when amplified by transistors 7-24 and 7-27 with peripheral circuitry, provides the motor signals 330 and paper advance solenoid signal 331.

TABLE 8

| PRINT DRIVE AND OUTPUT STATUS INTERFACE COMPONENTS | |
|---|---|
| Number | Component |
| 7-1 | IN4148 |
| 7-2 | LED-phototransistor |
| 7-3 | 360 ohm |
| 7-4 | 47OPF |
| 7-5 | 33.2K |
| 7-6 | 10K |

TABLE 8-continued
PRINT DRIVE AND OUTPUT STATUS INTERFACE COMPONENTS

| Number | Component |
| --- | --- |
| 7-7 | 0.33 μfd |
| 7-8 | 33.2K |
| 7-9 | 221K |
| 7-10 | 2.2MEG |
| 7-11 | Operational Amplifier |
| 7-12 | 2N4923 |
| 7-13 | 360 ohm |
| 7-14 | 1K |
| 7-15 | 2N4923 |
| 7-16 | 1N4007 |
| 7-17 | 1N4007 |
| 7-18 | 20K |
| 7-19 | 75450 Texas Instruments |
| 7-20 | Output Latches, SN74174 Texas Instruments |
| 7-21 | Output Latches, SN74174 Texas Instruments |
| 7-22 | Output Latches, SN74174 Texas Instruments |
| 7-23 | 220 |
| 7-24 | Transistor |
| 7-25 | 0.01 μfd |
| 7-26 | 220 ohm |
| 7-27 | Transistor |
| 7-28 | 10 ohm |
| 7-29 | 0.01 μfd |
| 7-30 | 1N4007 |
| 7-31 | 0.01 μfd |
| 7-32 | 1K |
| 7-33 | 0.002 μfd |
| 7-34 | 1K |
| 7-35 | 2N4403 |
| 7-36 | 470 ohm |
| 7-37 | 1N914 |
| 7-38 | 4.7K |
| 7-39 | 4.7K |
| 7-40 | 27K |
| 7-41 | 0.1 μfd |
| 7-42 | 2N6027 |
| 7-43 | Transformer |
| 7-44 | 47 ohm |
| 7-45 | 0.002 μfd |
| 7-46 | Thyristor |
| 7-47 | 47 ohm |
| 7-48 | 0.05 μfd |
| 7-49 | Bi-polar diode |

The direct current output module 330 electrically isolates the output of latch 7-21 (Texas Instruments, Part No. SN74174) via light emitting diode - phototransistor combination 7-2. This signal is amplified by operational amplifier 7-11, transistor 7-12, and transistor 7-15, in combination with the remainder of the circuitry of DC output module 330.

Alternating current output module 332 incorporates transformer 7-43 for electrically isolating the 120 volt AC output signal from the output latches. The output module 332 incorporates transistor 7-35 and 7-42 for properly shaping pulse information applied to transformer 7-43. The secondary side of transformer 7-43 is coupled to thyristor 7-46 so as to activate the thyristor when transformer 7-43 receives a pulse. Activation of thyristor 7-46 allows generation of 120 volt AC output signals.

It should be noted that the "BUSY", "FORM BUSY", "PAPER OUT", and "BELL" signals may be applied to either a 24 volt DC output module 330 or a 120 volt AC output module 332.

The clocking information 334 transferred to output latches 7-20, 7-21, and 7-22 is generated by stored data selector 64. The information relating to the MOTOR DRIVER, PAPER FEED, MOTOR ON, BUSY, FORM BUSY, PAPER OUT, and BELL signals is generated by microprocessor 20 and transferred to print drive output status lines interface 46 via print drive information 34 and output status information 36.

As can best be seen in FIG. 5, stored data selector 64 comprises a group of integrated circuits. The demultiplexer 336 (Texas Instruments, Part No. SN74155) demultiplexes stored data address information 62 generated by microprocessor 20. The outputs of demultiplexer 336 provide the clocking information used in print drive and output status lines interface 46 as well as the clocking information used in output latches (Texas Instruments, Part No. 74174) 338, 340, and 342. The outputs of output latches 338 and 340 combine to form the chip address 158 of the selected programmable "read only" memory chip 98. The output of output latch 342 is applied to demultiplexer 344 (Texas Instruments, Part No. 74155). One of the outputs of demultiplexer 344 is activated, corresponding to the desired programmable "read only" memory chip to be activated in the programmable "read only" memory 21. The nine outputs of demultiplexer 344 combine to form the chip selector outputs 157.

Finally, regulated power supply 35 encompasses state of the art techniques for converting 110 volt AC 60 cycle electromotive energy into direct current sources with voltages of −12, −10, +5, +10, and +12 volts DC. These voltages are applied to all the remaining functional blocks of programmable printer 19 so as to provide the necessary voltage sources.

Thus what has been described is a novel apparatus and method for producing display information incorporating stored data with external data, wherein the stored data is capable of commanding the retrieval of the external data. It should be noted that although the description utilized a print mechanism for the display of the desired data, other visual enunciating devices such as cathode ray tubes, light emitting diodes, and liquid crystals could be utilized to produce the desired display of the data.

It will thus be seen that the objects set forth above, among those made apparent from the preceding description, are efficiently attained and, since certain changes may be made in the above system apparatus and methods without departing from the scope of the invention, it is intended that all matter contained in the above description or shown in the accompanying drawings will be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention, what is claimed is:

1. An apparatus for visually displaying at least a portion of stored data in combination with at least a portion of external data from an external device, comprising:
   A. a multi address memory means for storing said stored data;
   B. a stored data selector interconnected with said multi address memory means for selecting said stored data in response to stored data address information;
   C. a data interface interconnected with said multi address memory means and said external device for receiving, processing and transferring said external data and said selected stored data;
   D. a visual display means for producing a visually readable character display;

E. an output interface interconnected with said visual display means and said external device for amplifying and transferring display data to said visual display means and amplifying and transferring a first type of command data representing the request for external data to said external device; and F. a central processor interconnected with said stored data selector and said data and output interfaces incorporating first means for generating stored data address information; second means for receiving and processing said transferred selected stored data from the data interface into display data and command data so that said processed display data is received by the output interface for display and said first type of processed command data is received by the output interface for transferral to said external device for requesting the retrieval of external data; and third means for processing and transferring at least a portion of said retrieved external data into display data; whereby at least a portion of the selected stored data is displayed and at least a portion of the remaining portion of the selected stored data requests the retrieval of external data, of which at least a portion of the retrieved external data is displayed with the displayed stored data.

2. An apparatus as defined in claim 1 wherein said visual display means further incorporates means for selectively producing characters in two distinct orientations that are 180 degrees displaced from each other.

3. An apparatus as defined in claim 1 wherein the output interface further comprises means for monitoring operating conditions of the apparatus.

4. An apparatus as defined in claim 3, wherein said monitoring means indicates the displaying of stored and external data.

5. An apparatus as defined in claim 3, wherein said monitoring means incorporates means for generating alternating voltage monitoring condition operating signals for interconnection with external devices.

6. An apparatus as defined in claim 3, wherein said monitoring means incorporates means for generating direct voltage monitoring condition operating signals for interconnection with external devices.

7. An apparatus as defined in claim 1, wherein said data interface and said output interface further comprise means for electrically isolating said interconnected external device.

8. An apparatus as defined in claim 1, wherein said display data is alphanumeric.

9. An apparatus as defined in claim 1, further comprising a command interface interconnected with said central processor, output interface, and said external device for receiving command signals from said external device and wherein said central processor further incorporates a fourth means for retrieving and processing said command signals.

10. An apparatus as defined in claim 1, wherein said external data is in a BCD code.

11. An apparatus as defined in claim 1, wherein said external and stored data are in an ASCII code.

12. An apparatus as defined in claim 1, wherein said external data is in a BCD code and said stored data is in an ASCII code.

13. An apparatus as defined in claim 1, further comprising a housing for enclosing said multiaddress memory means, said data interface and output interface, said central processor, said stored data selector, and said visual display means.

14. An apparatus as defined in claim 1, wherein said data interface incorporates means for receiving alternating voltage external data.

15. An apparatus as defined in claim 1, wherein said data interface incorporates means for receiving direct voltage external data.

16. An apparatus as defined in claim 1, wherein the central processor is a microprocessor.

17. An apparatus as defined in claim 16, wherein said microprocessor comprises input memory buffers, output latches, a central processing unit, a fixed, specially programmed memory interconnected with the central processing unit, an addressing means interconnected between the programmed memory and the central processing unit, an output interface interconnected with the programmed memory, the output latches, the central processing unit, and the input memory buffers, and a random access memory interconnected with the central processing unit.

18. An apparatus as defined in claim 1, wherein a second type of command data represents that the apparatus is displaying stored data in combination with external data.

19. A programmable printer for printing at least a portion of stored data in combination with at least a portion of external data from an external device, said external data incorporating external display data, address data, and command signals, said programmable printer comprising:
A. a multi-address memory means for storing said stored data;
B. a stored data selector interconnected with said multi-address memory means for selecting said stored data in response to stored data address information;
C. a data interface interconnected with said multi-address memory means and said external device for receiving, processing and transferring said external display data, said address data, and said selected stored data;
D. a printer for producing a readable character printout and printer operating command signals;
E. a command interface interconnected with said external device for receiving, processing, and transferring said command signals;
F. an output interface interconnected with said external device for amplifying and transferring output signals to said external device, a first type of said output signals representing the request for external data, and interconnected with said printer for amplifying and transferring print drive information to said printer;
G. a printer logic interface interconnected between said printer and said command interface for amplifying and transferring display data to said printer and for amplifying and transferring printer operating command signals from said printer to the command interface; and
H. a central processor interconnected with said stored data selector and said data, output, printer logic, and command interfaces, incorporating first means for interrogating said command interface and for receiving and processing therefrom external and printer operating command signals, second means for interrogating the data interface and for receiving and processing address data into stored data address information, third means for receiving and processing said transferred selected stored data from the data interface and sorting said stored data into display data and output signals and transferring said processed display data to the printer logic interface and for generating and transferring said first type of output signal to the output interface for transferral to said external device for requesting the retrieval of external data, fourth means for processing and transferring to the printer logic interface at least a portion of said retrieved external display data, and fifth means for generating print drive information;

whereby at least a portion of the selected stored data is displayed and at least a portion of the remaining portion of the selected stored data requests the retrieval of external data, of which at least a portion of the retrieved external data is displayed with the displayed stored data.

20. A programmable printer as defined in claim 19, wherein said printer incorporates a plurality of sets of raised line segments mounted to the periphery of a printing drum, each set of raised line segments capable of printing all the characters of the font of said printer.

21. A programmable printer as defined in claim 19, wherein said printer further incorporates means for selectively producing characters in two distinct orientations that are 180 degrees displaced from each other and wherein a first of said external command signals represents either of said two distinct orientations.

22. A programmable printer as defined in claim 19, wherein a second type of output signals of the output interface monitor the operating conditions of the programmable printer.

23. A programmable printer as defined in claim 22, wherein one of the second type of output signals of the output interface indicates when the unused paper of the printer is less than a predetermined amount.

24. A programmable printer as defined in claim 22, wherein said output interface incorporates means for generating alternating voltage output signals.

25. A programmable printer as defined in claim 22, wherein said output interface incorporates means for generating direct voltage output signals.

26. A programmable printer as defined in claim 19, wherein said data, command and output interfaces comprise means for electrically isolating said interconnected external device.

27. A programmable printer as defined in claim 19, wherein the printer operating command signals generated by the printer include timing information.

28. A programmable printer as defined in claim 19, wherein the printer operating command signals generated by the printer include paper sensing information.

29. A programmable printer as defined in claim 28, wherein the first means of said central processor incorporates means for terminating the functions of the second, third, fourth and fifth means of said central processor when said paper sensing information indicates that the paper of said printer is jammed.

30. A programmable printer as defined in claim 28, wherein the first means of said central processor incorporates means for terminating the functions of the second, third, fourth and fifth means of said central processor when said paper sensing information indicates that the unused paper of said printing means is less than a predetermined amount.

31. A programmable printer as defined in claim 19, wherein said display data is alphanumeric.

32. A programmable printer as defined in claim 19, wherein said display data is in an ASCII code.

33. A programmable printer as defined in claim 19, wherein said external data is in a BCD code.

34. A programmable printer as defined in claim 19, wherein said external data is in a BCD code and said stored data is in an ASCII code.

35. An apparatus as defined in claim 19, further comprising a housing for enclosing said multiaddress memory means, said data, output and command interfaces, said central processor, said stored data selector, and said printer.

36. An apparatus as defined in claim 19, wherein said data interface incorporates means for receiving alternating voltage external data.

37. An apparatus as defined in claim 19, wherein said data interface incorporates means for receiving direct voltage external data.

38. A programmable printer as defined in claim 19, wherein the central processor is a microprocessor.

39. A programmable printer as defined in claim 38, wherein said microprocessor comprises input memory buffers, output latches, a central processing unit, a fixed, specially programmed memory interconnected with the central processing unit, an addressing means interconnected between the programmed memory and the central processing unit, an output interface interconnected with the programmed memory, the output latches, the central processing unit, and the input memory buffers, and a random access memory interconnected with the central processing unit.

40. A programmable printer for printing at least a portion of stored data in combination with at least a portion of external data from an external device, said external data incorporating external display data, address data, and command signals, said programmable printer comprising:

A. a multi-address memory means for storing said stored data;

B. a stored data selector interconnected with said multi-address memory means for selecting said stored data in response to stored data address information;

C. a data interface interconnected with said multi-address memory means and said external device for receiving, processing and transferring said external display data, said address data, and said selected stored data;

D. a printer for producing a readable character printout and printer operating command signals;

E. a command interface interconnected with said external device for receiving, processing, and transferring said command signals;

F. an output interface interconnected with said external device for amplifying and transferring output signals to said external device, a first type of output signal representing the receipt of stored data address information, a second type of output signal representing the request for external data, and a third type of output signal representing the aborting of the printing operation, said output interface also interconnected with said printer for amplifying and transferring print drive information to said printer;

G. a printer logic interface interconnected between said printer and said command interface for amplifying and transferring display data to said printer and for amplifying and transferring printer operating command signals from said printer to the command interface; and H. a microprocessor interconnected with said stored data selector and said data, output, printer logic, and command interfaces, incorporating first means for interrogating said command interface and for receiving and processing therefrom external and printer operating command signals, second means for interrogating the data interface, for receiving and processing address data into stored data address information, and for generating said first type of output signal, third means for receiving and processing said transferred selected stored data from the data interface and sorting said selected stored data into display data and output signals and transferring said display data to the printer logic interface and for generating and transferring said second type of output signal to the output interface for transferral to said external device for requesting the retrieval of external data, fourth means for processing and transferring to the printer logic interface at least a portion of said retrieved external display data, fifth means for generating print drive information, and sixth means for generating said abort output signal in response to a first type of command signal;

whereby at least a portion of the selected stored data is displayed and at least a portion of the remaining portion of the selected stored data requests the retrieval of external data, of which a portion of the retrieved external data is displayed with the displayed stored data.

41. A programmable printer as defined in claim 40, wherein the printer operating command signals generated by the printer include paper sensing information and wherein said first type of command signal for causing the generation of the abort output signal is generated when the paper sensing information indicates that the printer paper is jammed or less than a predetermined amount.

42. A programmable printer as defined in claim 40, wherein said abort output signal is generated upon receipt of a CLEAR command signal from an external device.

43. A programmable printer as defined in claim 40, wherein a second type of external command signal indicates the type of external data to be received.

44. A programmable printer as defined in claim 40, wherein:
1. a second type of external command signal activates the second, third, fourth, fifth and sixth means of the microprocessor;
2. a third type of external command signal indicates the type of external data to be received;
3. a fourth type of external command signal represents the generation of a space; and
4. a fifth type of external command signal represents the retrieval of external data.

45. A method of visually displaying stored data with external data comprising the steps of:
A. receiving address information relating to a stored data location;
B. retrieving stored data located in said stored data location;
C. sorting said stored data into command data and display data;

D. commanding the retrieval of external data upon receiving a first type of stored command data;
E. retrieving said external data; and
F. displaying at least a portion of said retrieved stored display data and said retrieved external data.

46. A method of displaying data as defined in claim 45, further comprising the steps of:
G. incrementing the address information; and
H. repeating steps B) through G) until receiving a second type of command data.

47. A method of displaying data as defined in claim 46, further comprising the step of:
I. indicating to the source of external data that the displaying of stored data has terminated.

48. A method of displaying data as defined in claim 45, wherein the retrieval of stored data comprises the steps of:
1. generating an output signal related to said received address information; and
2. addressing the stored data with the first output signal.

49. A method of displaying data as defined in claim 45 wherein the retrieving of stored data comprises the steps of:
1. decoding the address information; and
2. addressing said stored data location; and wherein the sorting of stored data and the retrieval of external data further comprise the respective steps of:
3. decoding the retrieved stored data; and
4. decoding the retrieved external data.

50. A method of displaying data as defined in claim 45, wherein the commanding the retrieval of external data preliminarily comprises the steps of:
1. indicating to a source of external data that stored data address information has been received by enabling a first output line; and
2. disabling the output line upon receiving the first type of stored command data.

51. A method of displaying data as defined in claim 45, wherein the retrieving of external data comprises the steps of:
1. receiving command data from an external data source after commanding the retrieval of external data; and
2. interpreting the type of external data by the received external command data.

52. A method of displaying data as defined in claim 45, wherein the retrieving of external data further comprises the step of receiving command data from an external data source regarding the initiation of the retrieval of the external data.

53. A method of displaying data as defined in claim 45, further comprising the step of:
G. receiving, prior to Step F, information regarding the desired display orientation.

54. A method of displaying data as defined in claim 45, wherein the displaying of said stored display data and retrieved external data further comprises receiving and processing timing information so as to synchronize the displaying of said data.

55. A method of displaying data as defined in claim 45 wherein the retrieving of stored data further comprises transferring the stored data located in said stored data location to a data interface.

56. A method of displaying data as defined in claim 45, further comprising the step of:
G. generating an output signal indicating the status of the displaying process.

57. A method of displaying data as defined in claim 45, wherein the retrieving of external data further comprises electrically isolating the source of said external data.

58. A method of displaying data as defined in claim 45, wherein the displaying of data is performed by a data display incorporating arrays of indicia, each array capable of displaying all the characters of a font of said data.

59. A method of displaying data as defined in claim 45, wherein the displaying of said retrieved display data and external data comprises th steps of:
1. generating an output signal related to at least a portion of said retrieved stored display data and said retrieved external data; and
2. transferring the output signal to a visual display.

60. A method of displaying data as defined in claim 59, wherein the generating of the output signal further comprises initiating the generation of the output signal upon obtaining a predetermined amount of retrieved stored display data and retrieved external data.

61. A method of printing stored data in combination with external data, comprising the steps of:
A. receiving address information relating to a stored data location;
B. indicating to a source of external data that stored data address information has been received;
C. generating a first output signal relating to the address information;
D. addressing the stored data with the first output signal;
E. retrieving the stored data in the particular stored data location;
F. sorting the retrieved stored data into command data and display data;
G. commanding said source of external data, upon receiving a first type of said command data, that external data is desired;
H. retrieving external data from said source of external data;
I. generating a second output signal relating to at least a portion of the retrieved display and external data; and
J. transferring the second output signal to a print mechanism for printing.

62. A method of printing as defined in claim 61, further comprising the steps of:
K. incrementing the address information; and
L. repeating steps B) through K) until receiving a second type of said command data.

63. A method of printing as defined in claim 62, further comprising the step of:
M. indicating to the source of external data that the printing of stored data has terminated.

64. A method of displaying data as defined in claim 61, wherein the receiving of address information further comprises decoding the received address information, and wherein the sorting of retrieved stored data and retrieving external data further comprise the respective steps of decoding the retrieved stored data, and decoding the retrieved external data.

65. A method of printing as defined in claim 61, further comprising the step of:
K. indicating to a source of external data that external data has been received.

66. A method of printing as defined in claim 61, further comprising the step of:
K. after commanding the retrieval of external data, receiving command data from an external data source regarding the type of external data to be received.

67. A method of printing as defined in claim 61, further comprising the step of:
K. after commanding the retrieval of external data, receiving command data from an external data source regarding the initiation of the retrieval of the external data.

68. A method of printing as defined in claim 61, further comprising the step of:
K. receiving prior to Step J information regarding the desired print orientation.

69. A method of printing as defined in claim 61, wherein the displaying of said stored display data and retrieved external data further comprises receiving and processing timing information so as to synchronize the printing of data.

70. A method of printing as defined in claim 61 wherein the retrieving of stored data further comprises transferring the stored data located in said stored data location to a data interface.

71. A method of printing as defined in claim 61, further comprising the step of:
K. generating an output signal indicating the status of the printing process.

72. A method of printing as defined in claim 61, wherein the retrieving of external data further comprises electrically isolating the source of said external data.

73. A method of printing as defined in claim 61, wherein the generating of the second output signal further comprises initiating the generation of the second output signal upon obtaining a predetermined amount of retrieved stored display data and retrieved external data.

74. A method of printing as defined in claim 61, wherein said print mechanism incorporates arrays of line segments, each array capable of printing all the characters of the font of said print mechanism.

75. A method of printing as defined in claim 61, wherein the indicating that stored data address information has been received is made to a multiplicity of external data sources and the retrieving of external data is made from said multiplicity of external data sources.

* * * * *

UNITED STATES PATENT OFFICE
CERTIFICATE OF CORRECTION

Patent No. 3,959,776　　　　　　　　　　Dated May 25, 1976

Inventor(s) Richard E. Morley　　　　　　Page 1 of 2

It is certified that error appears in the above-identified patent and that said Letters Patent are hereby corrected as shown below:

Column 4, Line 24, cancel "on" and substitute therefor --or--.

Column 9, Line 22, cancel second "of" and substitute therefor --to--.

Column 10, Line 8, cancel "leter" and substitute therefor --letter--.

Column 14, Line 29, cancel "DATA" and substitute therefor --DATE--.

Column 16, Line 10, cancel "162" and substitute therefor --156--.

Column 22, line 46, cancel "exteral" and substitute therefor --external--.

Column 68, Line 23, cancel "mode" and substitute therefor --module--.

Column 68, Line 33, cancel "band" and substitute therefor --baud--.

UNITED STATES PATENT OFFICE
CERTIFICATE OF CORRECTION

Patent No. 3,959,776　　　　　　　　　　Dated May 25, 1976

Inventor(s) Richard E. Morley　　　　　　　Page 2 of 2

It is certified that error appears in the above-identified patent and that said Letters Patent are hereby corrected as shown below:

Column 70, Line 48, cancel "322" and substitute therefor --331--.

Column 79, Line 12, cancel "th" and substitute therefor --the--.

Signed and Sealed this

Twenty-fourth Day of May 1977

[SEAL]

*Attest:*

RUTH C. MASON
*Attesting Officer*

C. MARSHALL DANN
*Commissioner of Patents and Trademarks*